US010360864B2

(12) United States Patent
Nishiyama et al.

(10) Patent No.: US 10,360,864 B2
(45) Date of Patent: Jul. 23, 2019

(54) ACTIVE-MATRIX SUBSTRATE AND DISPLAY DEVICE INCLUDING THE SAME

(71) Applicant: Sharp Kabushiki Kaisha, Sakai, Osaka (JP)

(72) Inventors: Takayuki Nishiyama, Sakai (JP); Kohhei Tanaka, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 46 days.

(21) Appl. No.: 15/305,795

(22) PCT Filed: Apr. 21, 2015

(86) PCT No.: PCT/JP2015/062058
§ 371 (c)(1),
(2) Date: Oct. 21, 2016

(87) PCT Pub. No.: WO2015/163305
PCT Pub. Date: Oct. 29, 2015

(65) Prior Publication Data

US 2017/0047032 A1 Feb. 16, 2017

(30) Foreign Application Priority Data

Apr. 22, 2014 (JP) ................................ 2014-088426

(51) Int. Cl.
*G09G 3/36* (2006.01)
*G02F 1/133* (2006.01)
(Continued)

(52) U.S. Cl.
CPC ........... *G09G 3/3677* (2013.01); *G02F 1/133* (2013.01); *G02F 1/1368* (2013.01);
(Continued)

(58) Field of Classification Search
CPC .. G02F 1/133; G02F 1/136286; G02F 1/1368; G09G 3/3648; G09G 3/3655;
(Continued)

(56) References Cited

U.S. PATENT DOCUMENTS

2008/0246717 A1 10/2008 Miyake et al.
2009/0046085 A1 * 2/2009 Ino ...................... G09G 3/3648 345/208

(Continued)

FOREIGN PATENT DOCUMENTS

JP 11-184406 A 7/1999
JP 2008-040327 A 2/2008

(Continued)

OTHER PUBLICATIONS

Official Communication issued in International Patent Application No. PCT/JP2015/062058, dated Jun. 23, 2015.

*Primary Examiner* — Stacy Khoo
(74) *Attorney, Agent, or Firm* — Keating & Bennett, LLP

(57) ABSTRACT

A technique of suppressing variations in property changes of switching elements in drive circuits provided for each gate line to reduce display performance degradation is provided. An active-matrix substrate includes: a plurality of drive circuits (11) provided in a display region for each gate line, for switching the gate line to a selected state; and a signal supply unit (12*g*) for supplying control signals (GCK1, GCK2, CLR, VSS) to each of the plurality of drive circuits for each gate line. The drive circuits (11) each include a plurality of switching elements that are turned on or off in response to the control signals. At predetermined time intervals, the signal supply unit (12*g*): supplies, to at least one of the plurality of switching elements in any of the plurality of drive circuits, a stop signal that holds the switching element off; and supplies, to each of the other switching elements in the drive circuit and the plurality of (Continued)

switching elements in each of the other drive circuits, a drive signal that turns the switching element on.

17 Claims, 60 Drawing Sheets

(51) Int. Cl.
*G02F 1/1368* (2006.01)
*G02F 1/1362* (2006.01)

(52) U.S. Cl.
CPC ..... *G02F 1/136286* (2013.01); *G09G 3/3648* (2013.01); *G09G 3/3655* (2013.01); *G09G 2310/0286* (2013.01); *G09G 2310/08* (2013.01); *G09G 2320/043* (2013.01); *G09G 2330/04* (2013.01)

(58) Field of Classification Search
CPC ......... G09G 3/3677; G09G 2310/0286; G09G 2310/08; G09G 2320/043; G09G 2330/04
See application file for complete search history.

(56) References Cited

U.S. PATENT DOCUMENTS

| | | | | |
|---|---|---|---|---|
| 2010/0103339 | A1* | 4/2010 | Shimoshikiryoh | G09G 3/3648 349/39 |
| 2010/0182306 | A1 | 7/2010 | Kimura et al. | |
| 2011/0194031 | A1* | 8/2011 | Tsubata | G02F 1/136213 348/731 |
| 2012/0200544 | A1* | 8/2012 | Iwamoto | G09G 3/3685 345/204 |

FOREIGN PATENT DOCUMENTS

| | | | |
|---|---|---|---|
| JP | 2008-276849 | A | 11/2008 |
| JP | 2009-075542 | A | 4/2009 |
| JP | 2010-193434 | A | 9/2010 |
| WO | 2011/055569 | A1 | 5/2011 |

* cited by examiner

ACTIVE-MATRIX SUBSTRATE AND DISPLAY DEVICE INCLUDING THE SAME

TECHNICAL FIELD

The present invention relates to an active-matrix substrate and a display device including the same.

BACKGROUND ART

JP 2010-193434 A discloses a display device in which, outside a display region, a plurality of drive circuits are connected for each line functioning as a gate line. Each drive circuit includes a plurality of switching elements. The display device changes, at predetermined time intervals, a drive circuit to be operated in turn to shorten the operating periods of the switching elements in each drive circuit, thus suppressing the degradation of the switching elements.

DISCLOSURE OF THE INVENTION

By providing the plurality of drive circuits for each gate line and changing the drive circuit to be operated at predetermined time intervals as in JP 2010-193434 A, the degradation of the switching elements in each drive circuit can be suppressed to some extent. In the case where the drive circuits are located in a picture frame region, however, a drive circuit farther from the display region is more likely to be affected by external air and the like, and its switching elements are more likely to degrade. If the property changes of the switching elements vary depending on the position of the drive circuit, the output waveform of the signal for switching the gate line to the selected state differs between the drive circuits. This causes display performance degradation.

An object of the present invention is to provide a technique of suppressing variations in property changes of switching elements in drive circuits provided for each gate line to reduce display performance degradation.

An active-matrix substrate according to the present invention includes: a plurality of source lines; a plurality of gate lines crossing the plurality of source lines; a display region defined by the plurality of source lines and the plurality of gate lines; a drive unit including, in the display region, a plurality of drive circuits for each of the plurality of gate lines, for switching the gate line to a selected state by the plurality of drive circuits in response to a supplied control signal; and a signal supply unit for supplying the control signal to the drive unit, wherein each of the plurality of drive circuits includes a plurality of switching elements that are turned on or off in response to the control signal, and at predetermined time intervals, the signal supply unit: supplies, to at least one of the plurality of switching elements in at least one of the plurality of drive circuits, a stop signal that holds the switching element off as the control signal; and supplies, to each of the plurality of switching elements in the drive circuit other than the switching element supplied with the stop signal and the plurality of switching elements in each of the plurality of drive circuits other than the drive circuit, a drive signal that turns the switching element on as the control signal.

The structure according to the present invention suppresses variations in property changes of switching elements in drive circuits provided for each gate line to reduce display performance degradation.

EMBODIMENTS FOR CARRYING OUT THE INVENTION

Figure 1:
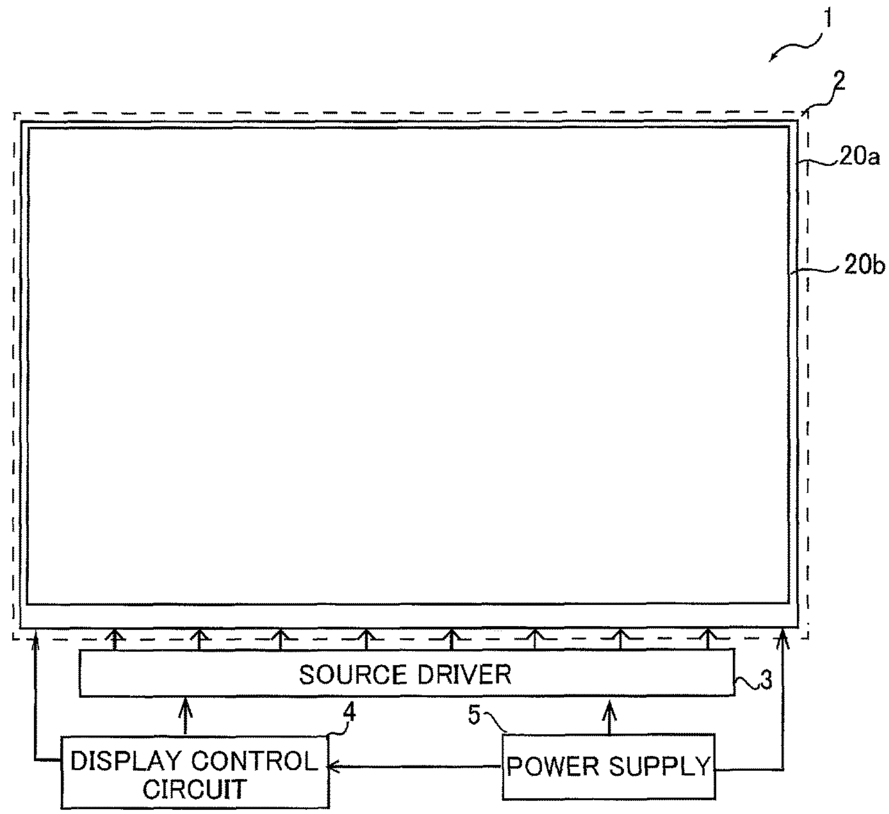
FIG. 1 is a schematic diagram illustrating the structure of a liquid crystal display device in a first embodiment.

An active-matrix substrate according to an embodiment of the present invention includes: a plurality of source lines; a plurality of gate lines crossing the plurality of source lines; a display region defined by the plurality of source lines and the plurality of gate lines; a drive unit including, in the display region, a plurality of drive circuits for each of the plurality of gate lines, for switching the gate line to a selected state by the plurality of drive circuits in response to a supplied control signal; and a signal supply unit for supplying the control signal to the drive unit, wherein each of the plurality of drive circuits includes a plurality of switching elements that are turned on or off in response to the control signal, and at predetermined time intervals, the signal supply unit: supplies, to at least one of the plurality of switching elements in at least one of the plurality of drive circuits, a stop signal that holds the switching element off as the control signal; and supplies, to each of the plurality of switching elements in the drive circuit other than the switching element supplied with the stop signal and the plurality of switching elements in each of the plurality of drive circuits other than the drive circuit, a drive signal that turns the switching element on as the control signal (first structure).

With the first structure, for each gate line, the plurality of drive circuits for switching the gate line to the selected state are arranged in the display region of the active-matrix substrate. Such drive circuits are unlikely to be affected by external air and the like, as compared with the case where the drive circuits are arranged in the picture frame region. Moreover, at least one of the plurality of switching elements in at least one of the drive circuits provided for each gate line is supplied with the stop signal that holds the switching element off, and each of the other switching elements in the drive circuit and the switching elements in each of the other drive circuits is supplied with the drive signal that turns the switching element on, at predetermined time intervals. This shortens the time during which the at least one switching element is on, as compared with the case of supplying the drive signal to the switching elements in all drive circuits provided for the gate line. As a result, the degradation of the switching elements in each drive circuit is distributed, so that display performance degradation due to property changes of switching elements can be reduced.

In a second structure, starting from the first structure, the signal supply unit may change the drive circuit supplied with the stop signal, between the plurality of drive circuits provided for the gate line.

With the second structure, the time during which the switching elements are on is distributed between the plurality of drive circuits provided for the gate line. Variations in switching element degradation between the drive circuits can thus be reduced.

In a third structure, starting from the first structure, N drive circuits may be provided for each of the plurality of gate lines, where N is a natural number such that $N \geq 3$, and at the predetermined time intervals, the signal supply unit may supply the drive signal to the plurality of switching elements in each of n drive circuits out of the N drive circuits, where n is a natural number such that $2 \leq n < N$.

With the third structure, the gate line is switched to the selected state by the n drive circuits at predetermined time intervals. This reduces the load on each drive circuit for switching the gate line to the selected state.

In a fourth structure, starting from any one of the first to third structures, the drive signal may be a signal whose potential alternates between H level and L level every 2 m horizontal scan intervals, where m is a natural number such that $m \geq 1$, and the drive signal to the plurality of drive circuits provided for one gate line and the drive signal to the plurality of drive circuits provided for another gate line adjacent to the gate line may be out of phase with each other by ¼m period.

With the fourth structure, the drive signal whose potential alternates between H level and L level every 2 m horizontal scan intervals is supplied to any of the plurality of drive circuits provided for one gate line, and the drive signal that is out of phase with the drive signal to the plurality of drive circuits provided for the gate line by ¼m period is supplied to the plurality of drive circuits provided for another gate line adjacent to the gate line. This decreases the drive signal frequency as compared with the case where a drive signal whose potential alternates between H level and L level every horizontal scan interval is supplied to the plurality of drive circuits provided for one gate line, and so contributes to lower power consumption.

In a fifth structure, starting from the first structure, the plurality of switching elements may include a switching element whose duty ratio is not less than a predetermined value and a switching element whose duty ratio is less than the predetermined value, and the signal supply unit may supply the stop signal to the switching element whose duty ratio is not less than the predetermined value and supply the drive signal to the switching element whose duty ratio is less than the predetermined value, from among the plurality of switching elements in each of the plurality of drive circuits provided for the gate line.

With the fifth structure, the plurality of switching elements include the switching element whose duty ratio is not less than the predetermined value and the switching element whose duty ratio is less than the predetermined value. In each drive circuit provided for the gate line, the switching element whose duty ratio is not less than the predetermined value is turned off and the switching element whose duty ratio is less than the predetermined value is turned on, at predetermined time intervals. Thus, the time during which the switching element whose duty ratio is not less than the predetermined value is on in each drive circuit provided for the gate line is adjusted to reduce the degradation of the switching element.

In a sixth structure, starting from any one of the first to fifth structures, the plurality of switching elements may include a specific switching element for supplying, to the gate line, a selection voltage that switches the gate line to the selected state, each of the plurality of drive circuits may further include: an internal line connected to a gate terminal of the specific switching element and the gate line; and a circuit unit connected to the internal line for controlling a voltage of the internal line in response to a supplied potential control signal, and the circuit unit in the drive circuit supplied with the stop signal may control the voltage of the internal line to be lower than a threshold voltage of the specific switching element, and the circuit unit in each of the other drive circuits may not control the voltage of the internal line.

With the sixth structure, the plurality of switching elements include the specific switching element for supplying the selection voltage to the gate line. Each drive circuit includes the internal line connected to the gate terminal of the specific switching element and the gate line, and the circuit unit connected to the internal line for controlling the voltage of the internal line in response to the supplied potential control signal. The circuit unit in the drive circuit supplied with the stop signal controls the voltage of the internal line to be lower than the threshold voltage of the specific switching element, whereas the circuit unit in the other drive circuit supplied with the drive signal does not control the voltage of the internal line. Accordingly, even when the gate line is switched to the selected state and the potential of the gate line enters the internal line in the stopped drive circuit, the specific switching element is not turned on, and so the drive circuit is prevented from malfunctioning.

In a seventh structure, starting from the sixth structure, the circuit unit may include a first switching element having a drain terminal connected to the internal line, and the signal supply unit may: supply, to a gate terminal of the first switching element in each of the other drive circuits, a first voltage signal that turns the first switching element off as the potential control signal; and supply, to a gate terminal of the first switching element in the drive circuit supplied with the stop signal, a second voltage signal that turns the first switching element on and supply, to a source terminal of the first switching element in the drive circuit, the first voltage signal.

With the seventh structure, in the other drive circuit supplied with the drive signal, the first switching element connected to the internal line is turned off. Meanwhile, in the drive circuit supplied with the stop signal, the first switching element connected to the internal line is turned on, and the voltage of the first voltage signal supplied to the source terminal of the first switching element is applied to the internal line. Hence, the number of lines for supplying voltage signals to the first switching element can be reduced as compared with the case of separately supplying a voltage signal to the source terminal of the first switching element in the drive circuit supplied with the stop signal.

In an eighth structure, starting from the seventh structure, the plurality of switching elements may include a second switching element having a drain terminal connected to the gate line for supplying, to the gate line, a voltage that switches the gate line to a non-selected state, a voltage of the first voltage signal may be a voltage that switches the gate line to the non-selected state, and the signal supply unit may further: supply, to a gate terminal of the second switching element in each of the other drive circuits, a voltage signal that turns the second switching element on and supply, to a source terminal of the second switching element in the other drive circuit, the first voltage signal; and supply, to a gate terminal of the second switching element in the drive circuit supplied with the stop signal, a voltage signal that turns the second switching element off.

With the eighth structure, in the other drive circuit supplied with the drive signal, the second switching element connected to the gate line is turned on, and the voltage of the first voltage signal supplied to the source terminal of the second switching element is applied to the gate line. The voltage of the first voltage signal is a voltage that switches the gate line to the non-selected state, and so the gate line is switched to the non-selected state through the second switching element of the other drive circuit. Meanwhile, in the drive circuit supplied with the stop signal, the second switching element is turned off. Hence, the number of lines for supplying voltage signals to the second switching element can be reduced as compared with the case of separately supplying a voltage signal that switches the gate line to the non-selected state to the source terminal of the second switching element in the drive circuit supplied with the drive signal.

In a ninth structure, starting from any one of the first to eighth structures, the signal supply unit may include: a control signal line provided outside the display region at one end in an extending direction of the plurality of source lines, and supplied with the control signal; drive circuit connection lines for connecting the plurality of drive circuits provided for the gate line to the control signal line; and a switch unit for selecting a drive circuit connection line to be brought into conduction with the control signal line from among the drive circuit connection lines, in response to a supplied switch signal.

With the ninth structure, the signal supply unit includes the control signal line, the drive circuit connection lines, and the switch unit. The control signal line is provided outside the display region at one end in the extending direction of the source lines, and supplied with the control signal. The drive circuit connection lines connect the respective drive circuits provided for the gate line to the control signal line. The switch unit switches the drive circuit connection line to be brought into conduction with the control signal line, in response to the supplied switch signal. Since the number of control signal lines is reduced as compared with the case where the control signal line is provided for each of the plurality of drive circuits, the picture frame region in which the signal supply unit is located can be reduced in size.

A display device according to an embodiment of the present invention includes: the active-matrix substrate according to any one of the first to ninth structures; a counter substrate having a color filter; and a liquid crystal layer sandwiched between the active-matrix substrate and the counter substrate (tenth structure).

Embodiments of the present invention are described in detail below with reference to the drawings. The same or corresponding components in the drawings are given the same reference signs and their description is not repeated.

First Embodiment

Structure of Liquid Crystal Display Device

FIG. 1 is a schematic diagram illustrating the structure of a liquid crystal display device in this embodiment. A liquid crystal display device 1 includes a display panel 2, a source driver 3, a display control circuit 4, and a power supply 5. The display panel 2 includes an active-matrix substrate 20*a*, a counter substrate 20*b*, and a liquid crystal layer (not illustrated) sandwiched between these substrates. A pair of polarizers sandwich the active-matrix substrate 20*a* and the counter substrate 20*b*, although not illustrated in FIG. 1. A black matrix, red (R), green (G), and blue (B) color filters, and a common electrode (all not illustrated) are formed in the counter substrate 20*b*.

As illustrated in FIG. 1, the active-matrix substrate 20*a* is electrically connected to the source driver 3 formed on a flexible substrate. The display control circuit 4 is electrically connected to the display panel 2, the source driver 3, and the power supply 5. The display control circuit 4 provides control signals to the source driver 3 and the below-mentioned drive circuits (hereinafter referred to as gate drivers) arranged in the active-matrix substrate 20*a*. The power supply 5 is electrically connected to the display panel 2, the source driver 3, and the display control circuit 4, and supply power supply voltage signals to these components.

(Structure of Active-Matrix Substrate)

Figure 2:
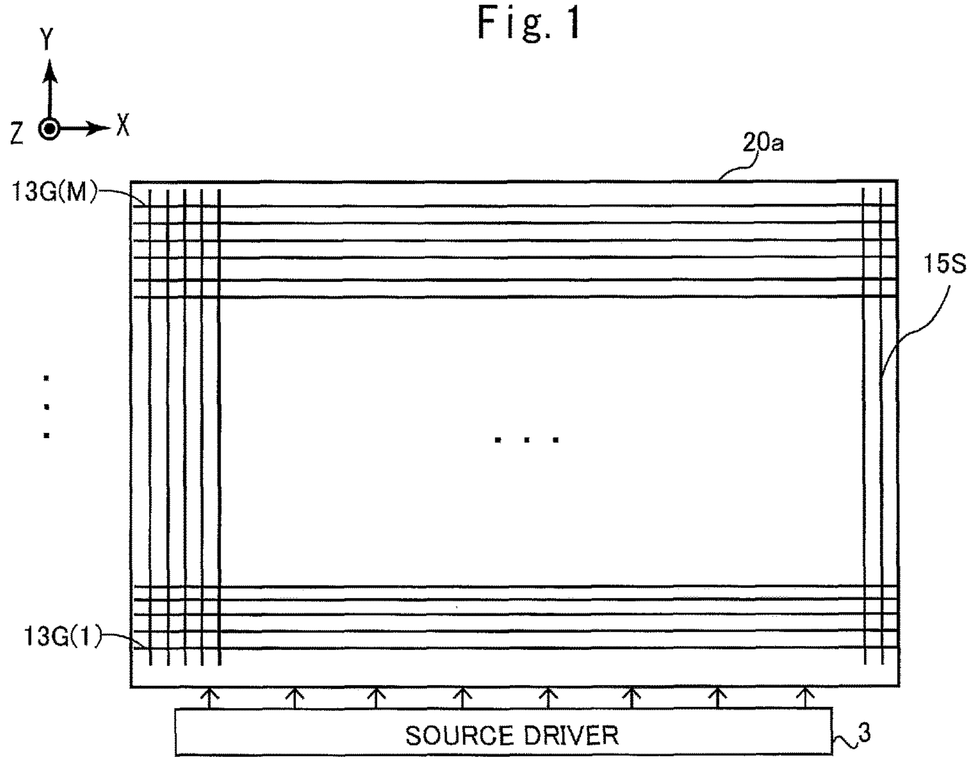
FIG. 2 is a schematic diagram illustrating the structure of an active-matrix substrate illustrated in FIG. 1.

FIG. 2 is a schematic diagram illustrating the structure of the active-matrix substrate 20*a*. M gate lines 13G(1) to 13G(M) (M is a natural number) extend from one end to the other end of the active-matrix substrate 20*a* in the X-direction, substantially in parallel with each other at regular intervals. In the case of not distinguishing the gate lines from each other, the gate lines are referred to as gate lines 13G. A plurality of source lines 15S cross the gate lines 13G in the active-matrix substrate 20*a*. Each of the regions defined by the gate lines 13G and the source lines 15S forms one pixel, which corresponds to one of the colors of the color filters.

Figure 3:
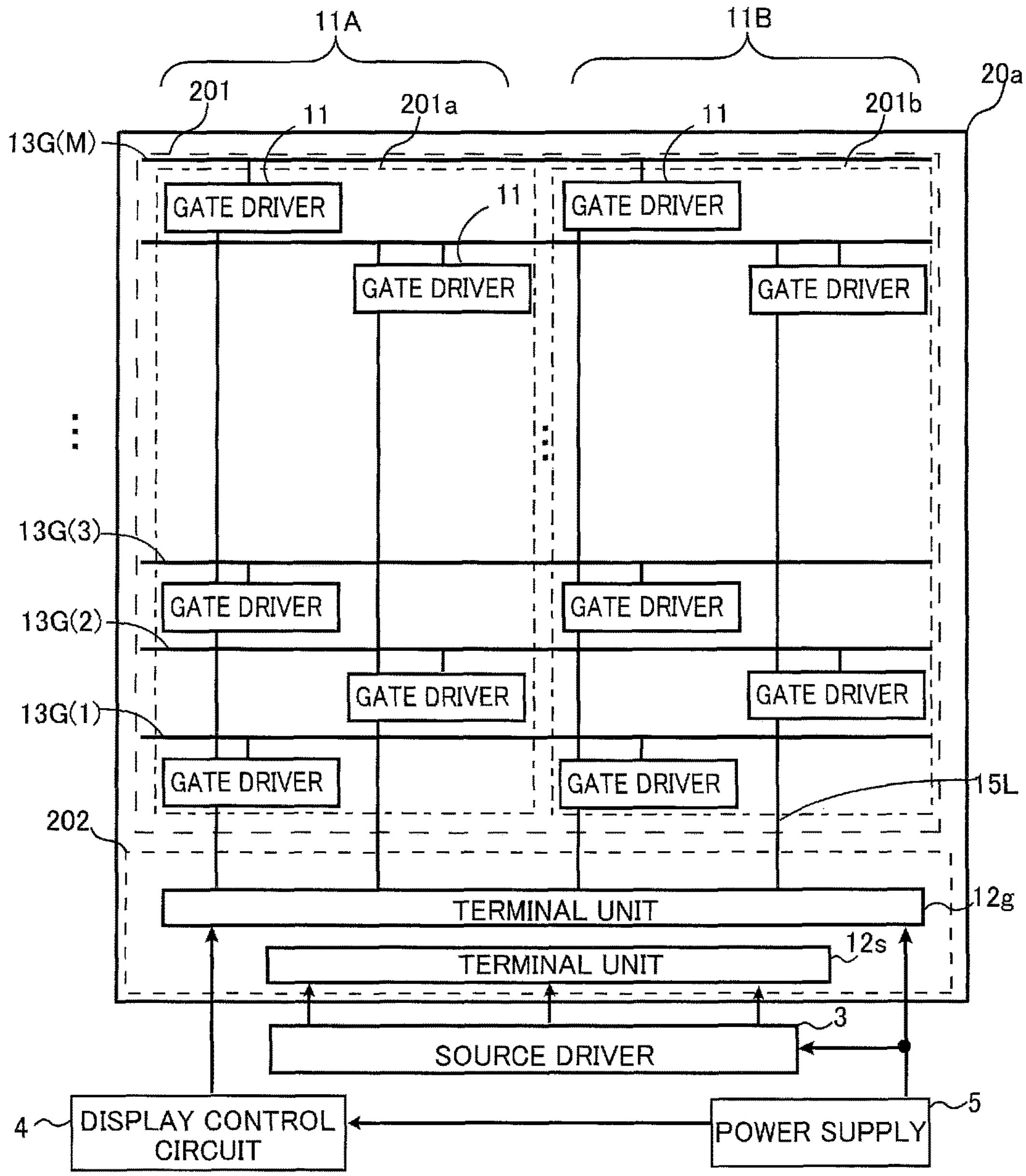
FIG. 3 is a schematic diagram illustrating the structure of the active-matrix substrate illustrated in FIG. 1.

FIG. 3 is a schematic diagram illustrating the structure of the active-matrix substrate 20*a* without the source lines 15S and the components connected to the active-matrix substrate 20*a*. As illustrated in the example in FIG. 3, gate drivers 11 are located between the gate lines 13G in a display region 201. In this example, two gate drivers 11 are provided for each gate line 13G. One of the two gate drivers 11 is situated in a region 201*a* of the display region 201, and the other gate driver 11 is situated in a region 201*b* of the display region 201. Agate driver group made up of the gate drivers 11 in the region 201*a* is hereafter referred to as a gate driver group 11A, and a gate driver group made up of the gate drivers 11 in the region 201*b* as a gate driver group 11B.

In the active-matrix substrate 20*a* in FIG. 3, a terminal unit 12*g* is provided in a picture frame region 202 on the side where the source driver 3 is situated. The terminal unit 12*g* is connected to the display control circuit 4 and the power supply 5. The terminal unit 12*g* receives signals such as control signals and power supply voltage signals from the display control circuit 4 and the power supply 5. The signals such as control signals and power supply voltage signals received by the terminal unit 12*g* are supplied to the gate drivers 11 via lines 15L. Each gate driver 11, in response to the supplied signal, supplies a voltage signal (selection voltage) indicating one of the selected state and the non-selected state to the connected gate line 13G. In the following description, the selected state of the gate line 13G is referred to as driving the gate line 13G.

A terminal unit 12*s* connecting the source driver 3 to source lines 15S (see FIG. 2) is also provided in the picture frame region 202 of the active-matrix substrate 20*a*. The source driver 3, in response to control signals received from the display control circuit 4, supplies data signals to the source lines 15S.

Figure 4:
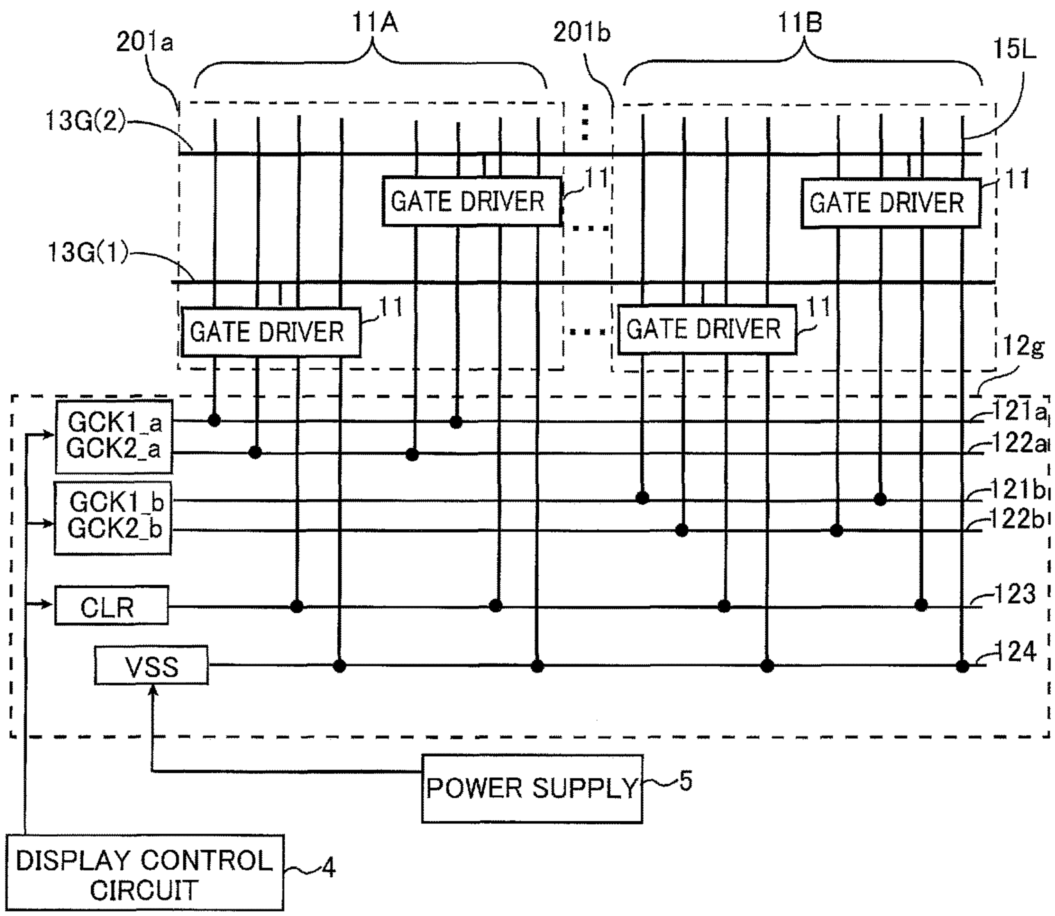
FIG. 4 is a schematic diagram illustrating an example of the structure of a terminal unit in the active-matrix substrate illustrated in FIG. 3.

The terminal unit 12*g* is described below. FIG. 4 is a schematic diagram illustrating the structure of the terminal unit 12*g*. As illustrated in FIG. 4, the terminal unit 12*g* has lines 121*a*, 122*a*, 121*b*, 122*b*, and 123 that are connected to the display control circuit 4 and supplied respectively with control signals GCK1_*a*, GCK2_*a*, GCK1_*b*, GCK2_*b*, and CLR. The terminal unit 12*g* also has a line 124 that is connected to the power supply 5 and supplied with a power supply voltage signal (VSS).

The gate driver group 11A is connected to the lines 121*a*, 122*a*, 123, and 124 via lines 15L. The gate driver group 11B is connected to the lines 121*b*, 122*b*, 123, and 124 via lines 15L. In this example, the regions 201*a* and 201*b* are obtained by dividing the display region 201 along the extending direction of the source lines 15S.

The display control circuit 4 supplies, as the control signals GCK1_*a* and GCK2_*a* and the control signals GCK1_*b* and GCK2_*b*, drive signals (hereafter, clock signals) CKA and CKB that alternate between H level and L level every horizontal scan interval or a signal (hereafter, an operation stop signal) of the same potential as L level of the clock signals, to the lines 121*a*, 122*a*, 121*b*, and 122*b*. The display control circuit 4 also supplies, as the control signal CLR, a control signal (hereafter, a reset signal) of the same potential as H level of the clock signals, to the line 123.

Figure 5:
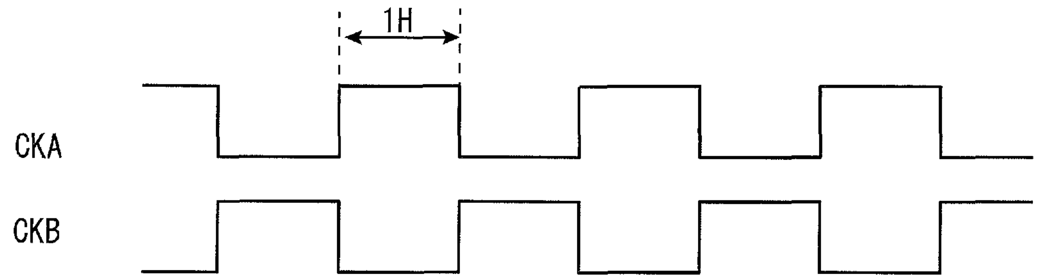
FIG. 5 is a schematic diagram illustrating an example of the waveforms of clock signals in the first embodiment.

FIG. 5 is a diagram illustrating an example of the waveforms of the clock signals CKA and CKB. As illustrated in FIG. 5, the clock signals CKA and CKB are clock signals of two phases that are phase-inverted every horizontal scan interval (1H).

Figure 6:
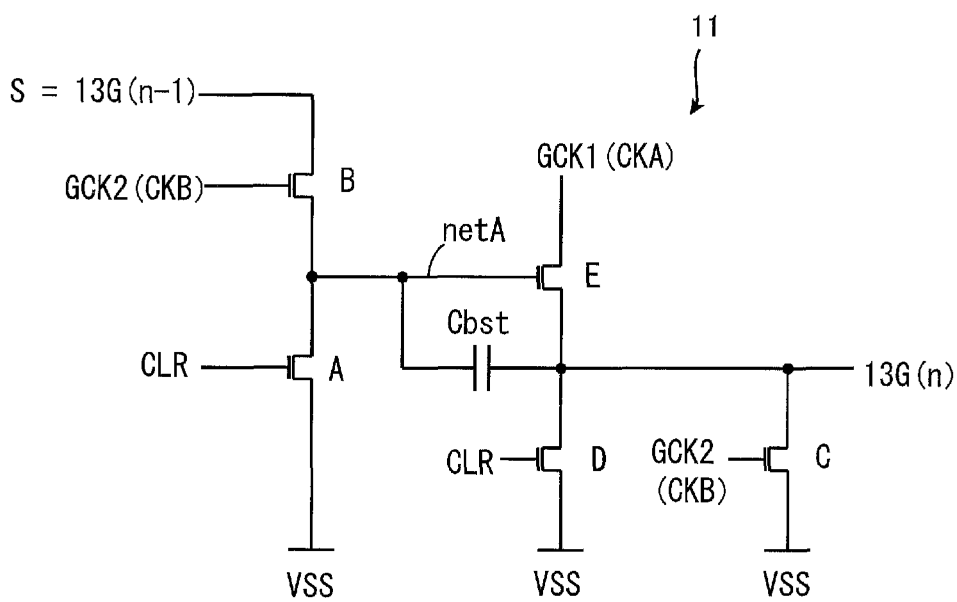
FIG. 6 is a diagram illustrating an example of an equivalent circuit of a gate driver in the first embodiment.

The following describes the structure of each gate driver 11 in this embodiment. FIG. 6 is a diagram illustrating an example of an equivalent circuit of a gate driver 11 (hereafter, gate driver 11(*n*)) located between gate lines 13G(n−1) and 13G(n) for driving the gate line 13G(n). Since the gate drivers 11 in the gate driver group 11A and gate driver group 11B have the same structure, the gate driver 11(*n*) in the gate driver group 11A is described as an example below.

As illustrated in FIG. 6, the gate driver 11(*n*) includes thin-film transistors (TFTs) designated as A to E (hereafter, TFT-A to TFT-E) as switching elements, and a capacitor Cbst. In FIG. 6, netA is an internal line of the gate driver 11(*n*). The netA connects the source terminal of the TFT-B, the drain terminal of the TFT-A, the gate terminal of the TFT-E, and one electrode of the capacitor Cbst.

The TFT-A has a gate terminal supplied with the reset signal CLR, a drain terminal connected to the netA, and a source terminal supplied with the power supply voltage signal VSS.

The TFT-B has a gate terminal supplied with the control signal GCK2_*a*, a drain terminal connected to the gate line 13G(n−1) preceding by one row, and a source terminal connected to the netA. The TFT-B receives a set signal S from the gate line 13G(n−1). The TFT-B in the gate driver 11 for driving the gate line 13G(1) receives a gate start pulse signal from the display control circuit 4, as the set signal S.

The capacitor Cbst has one electrode connected to the netA, and the other electrode connected to the gate line 13G(n). The internal line (netA) in the gate driver 11 is thus connected to the gate line 13G via the capacitor Cbst.

The TFT-C has a gate terminal supplied with the control signal GCK2_*a*, a drain terminal connected to the gate line 13G(n), and a source terminal supplied with the power supply voltage signal VSS.

The TFT-D has a gate terminal supplied with the reset signal CLR, a drain terminal connected to the gate line 13G(n), and a source terminal supplied with the power supply voltage signal VSS.

The TFT-E has a gate terminal connected to the netA, a drain terminal supplied with the control signal GCK1_*a*, and a source terminal connected to the gate line 13G(n).

(Overall Layout of Gate Drivers)

Figure 7:
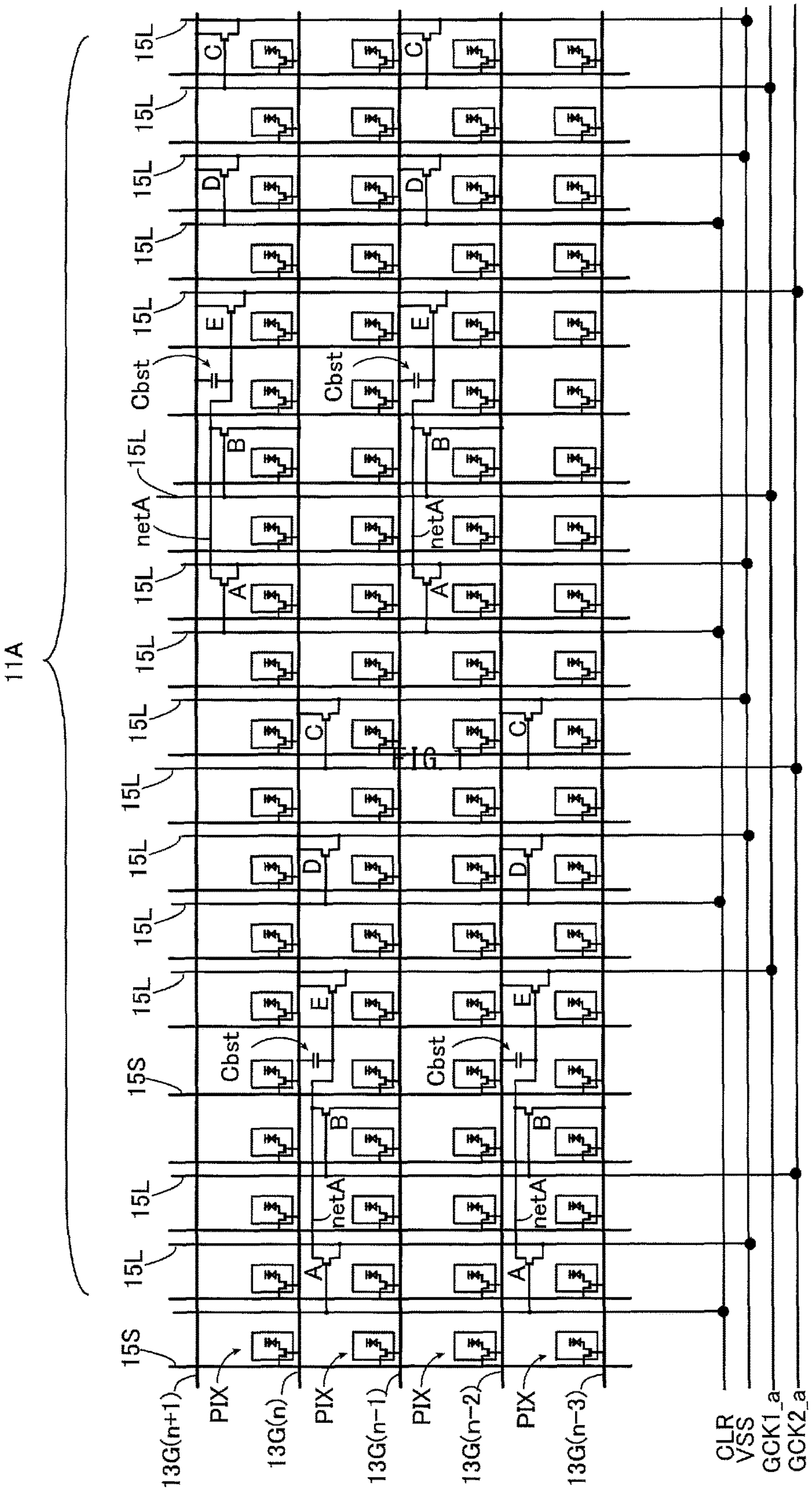
FIG. 7 is a schematic diagram illustrating an example of the arrangement and wiring of gate drivers illustrated in FIG. 6 in a display region.

The following describes the arrangement of the elements of the gate drivers 11. FIG. 7 is a schematic diagram illustrating some of the gate drivers 11 of the gate driver group 11A in the region 201*a*. Although only the alphabet letters A to E are shown without "TFT-" in FIG. 7 for the sake of convenience, A to E correspond to TFT-A to TFT-E in FIG. 6.

As illustrated in FIG. 7, the elements constituting one gate driver 11 are distributed between adjacent gate lines 13G. In FIG. 7, the elements of the gate driver 11 (hereafter, gate driver 11(*n*−2)) between the gate lines 13G(n−3) and 13G(n−2) and the elements of the gate driver 11(*n*) between the gate lines 13G(n−1) and 13G(n) are located in pixels PIX in the same column.

The TFT-A to TFT-E in the gate driver 11(*n*) and the TFT-A to TFT-E in the gate driver 11(*n*−2) are connected via lines 15L. The TFT-B and TFT-C in these gate drivers 11 are connected to the line 122*a* of the terminal unit 12*g* via lines 15L, and supplied with the control signal GCK2_*a*. The TFT-E in the gate drivers 11(*n*) and 11(*n*−2) are connected to the line 121*a* of the terminal unit 12*g* via a line 15L, and supplied with the control signal GCK1_*a*.

The lines 15L are substantially in parallel with the source lines 15S, in a source layer in which the source lines 15S are formed in the active-matrix substrate 20*a*. The netA in the gate drivers 11 are substantially in parallel with the gate lines 13G, in a gate layer in which the gate lines 13G are formed.

The gate driver 11(*n*−2) drives the gate line 13G(n−2) in response to the control signals GCK1_*a* and GCK2_*a*. The gate driver 11(*n*) drives the gate line 13G(n) in response to the control signals GCK1_*a* and GCK2_*a*.

The elements of the gate driver 11 (hereafter, gate driver 11(*n*−1)) between the gate lines 13G(n−2) and 13G(n−1) and the elements of the gate driver 11 (hereafter, gate driver 11(*n*+1)) between the gate lines 13G(n) and 13G(n+1) are located in pixels PIX in the same column.

The TFT-A to TFT-E in the gate driver 11(*n*−1) and TFT-A to TFT-E in the gate driver 11(*n*+1) are connected via lines 15L. The TFT-B and TFT-C in the gate drivers 11(*n*−1) and 11(*n*+1) are connected to the line 121*a* of the terminal unit 12*g* via lines 15L, and supplied with the control signal GCK1_*a*. The TFT-E in the gate drivers 11(*n*−1) and 11(*n*+1) are connected to the line 122*a* of the terminal unit 12*g* via a line 15L, and supplied with the control signal GCK2_*a*.

The gate driver 11(*n*−1) drives the gate line 13G(n−1) in response to the control signals GCK1_*a* and GCK2_*a*. The gate driver 11(*n*+1) drives the gate line 13G(n+1) in response to the control signals GCK1_*a* and GCK2_*a*.

As described above, the gate drivers 11(*n*) and 11(*n*−2) and the gate drivers 11(*n*−1) and 11(*n*+1) are supplied with clock signals of opposite phases to each other in the operating period. In other words, the gate drivers located in adjacent rows in the same region 201*a* are supplied with clock signals of opposite phases to each other in the operating period.

The gate drivers 11 in the gate driver group 11B differ from the gate drivers 11 in the gate driver group 11A in that the control signals GCK1_*b* and GCK2_*b* are supplied instead of the control signals GCK1_*a* and GCK2_*a*, but have the same arrangement of elements as in FIG. 7.

(Operation of Gate Driver 11)

Figure 8:
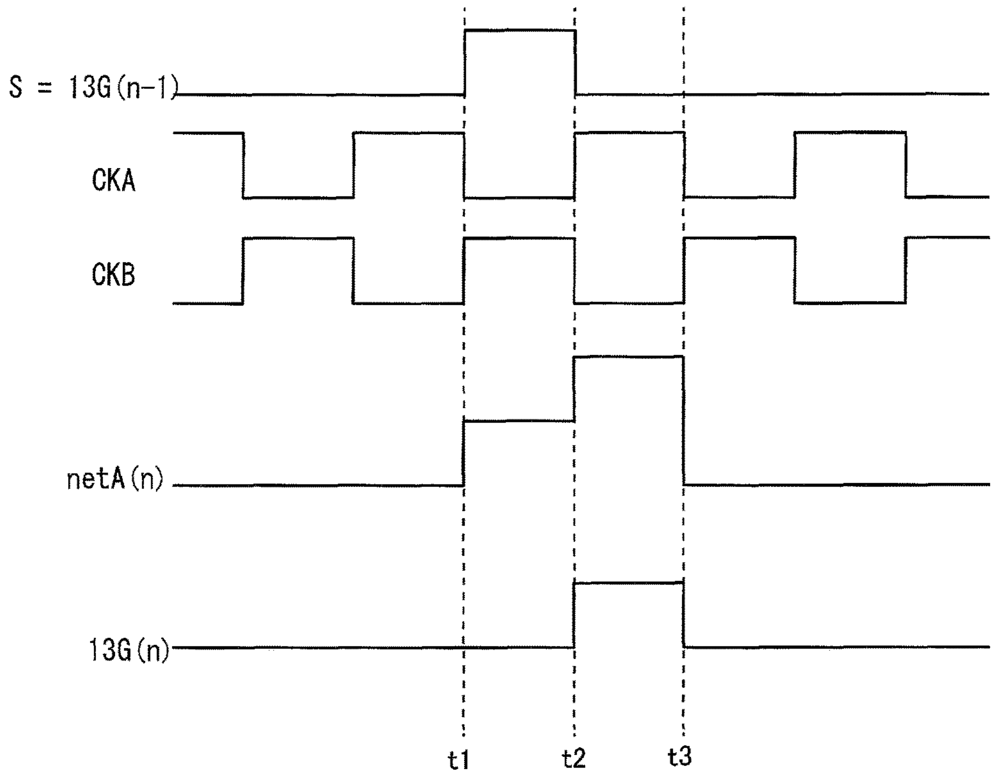
FIG. 8 is a timing chart illustrating the timings of driving a gate line by a gate driver illustrated in FIG. 6.

The following describes the operation of one gate driver 11 with reference to FIGS. 6 and 8. FIG. 8 is a timing chart when the gate driver 11(*n*) drives the gate line 13G(n). The operation of the gate driver 11(*n*) in the gate driver group 11A is described as an example below.

The clock signals CKA and CKB that are phase-inverted every horizontal scan interval (1H) are supplied from the display control circuit 4 to the gate driver 11(*n*). Moreover, the reset signal CLR that goes to H (high) level every vertical scan interval and remains H level for a predetermined period of time is supplied from the display control circuit 4 to each gate driver 11, although not illustrated in FIG. 8. When the reset signal CLR is supplied, the potentials of the netA in each gate driver 11 and each gate line 13G transition to L (low) level.

The period from time t1 to t2 in FIG. 8 is a period during which the gate line 13G(n−1) is selected. From time t1 to t2, the H level potential when the gate line 13G(n−1) is switched to the selected state is supplied to the drain terminal of the TFT-B in the gate driver 11(*n*) as the set signal S.

Meanwhile, the H level potential of the clock signal CKB is supplied to the gate terminal of the TFT-B in the gate driver 11(*n*). As a result, the TFT-B is turned on, and the netA (hereafter, netA(n)) in the gate driver 11(*n*) is precharged to a potential that is ((H level potential)−(threshold voltage of TFT-B)). Here, the L level potential of the clock signal CKA is supplied to the drain terminal of the TFT-E in the gate driver 11(*n*). As a result, the TFT-E is turned on, and the L level potential of the clock signal CKA is supplied to the gate line 13G(n). Moreover, the H level potential of the clock signal CKB is supplied to the drain terminal of the TFT-C in the gate driver 11(*n*). As a result, the TFT-C is turned on, and the potential (L level) of the power supply voltage VSS is supplied to the gate line 13G(n).

Next, at time t2, the L level potential of the gate line 13G(n−1) is supplied to the drain terminal of the TFT-B in the gate driver 11(*n*). Moreover, the L level potential of the clock signal CKB is supplied to the gate terminal of the TFT-B, as a result of which the TFT-B is turned off. The H level potential of the clock signal CKA is supplied to the drain terminal of the TFT-E in the gate driver 11(*n*). With an increase in potential of the gate line 13G(n) via the TFT-E, the netA(n) is charged to a potential higher than the H level potential of the clock signal CKA by the capacitor Cbst connected between the netA(n) and the gate line 13G(n).

Meanwhile, the L level potential of the clock signal CKB is supplied to the gate terminal of the TFT-C in the gate driver 11(*n*), as a result of which the TFT-C is turned off. The H level potential (selection voltage) of the clock signal CKA is thus supplied to the gate line 13G(n), to switch the gate line 13G(n) to the selected state. The potential of the gate line 13G(n) is then supplied to the gate driver 11(*n*+1) as the set signal S.

Next, at time t3, the H level potential of the clock signal CKB is supplied to the gate terminal of the TFT-B in the gate driver 11(*n*), and the L level potential of the gate line 13G(n−1) is supplied to the drain terminal of the TFT-B. As a result, the netA(n) is charged to L level potential.

Meanwhile, the L level potential of the clock signal CKA is supplied to the drain terminal of the TFT-E in the gate driver 11(*n*). Moreover, the H level potential of the clock signal CKB is supplied to the gate terminal of the TFT-C in the gate driver 11(*n*). As a result, the gate line 13G(n) is charged to L level potential, and switched to the non-selected state.

The following describes the method of driving each gate line 13G in this embodiment. In this embodiment, any one of the gate driver groups 11A and 11B that are connected to each of the gate lines 13G(1) to 13G(M) is used to drive the gate line 13G. In other words, the gate driver groups 11A and 11B are operated alternately at predetermined time intervals. The gate line 13G is thus switched to the selected state by the gate driver 11 in either gate driver group.

Figure 9:
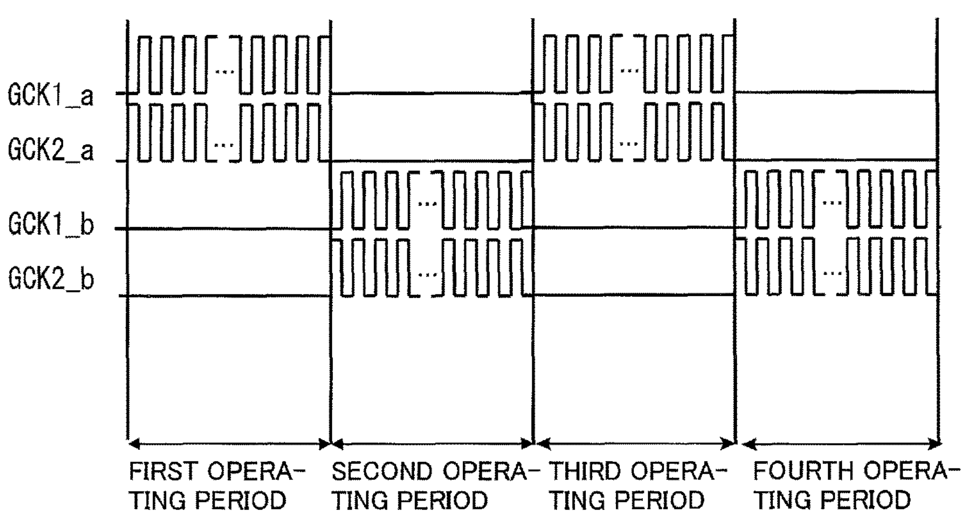
FIG. 9 is a diagram illustrating a method of driving gate driver groups in the first embodiment.

In detail, for example as illustrated in FIG. 9, the display control circuit 4 supplies the clock signals CKA and CKB to the gate driver group 11A as the control signals GCK1_*a* and GCK2_*a*, in a first operating period. The display control circuit 4 also supplies the operation stop signal whose potential is L level to the gate driver group 11B as the control signals GCK1_*b* and GCK2_*b*, in the first operating period.

In a second operating period which follows, the display control circuit 4 supplies the operation stop signal whose potential is L level to the gate driver group 11A as the control signals GCK1_*a* and GCK2_*a*, and supplies the clock signals CKA and CKB to the gate driver group 11B as the control signals GCK1_*b* and GCK2_*b*. A third and subsequent operating periods are the same as the first and second operating periods, and so their description is omitted. Thus, the control signals are supplied to the gate driver groups 11A and 11B so that the gate driver groups 11A and 11B operate alternately.

As described above, the display control circuit 4 supplies the clock signals to the gate driver group to be operated and supplies the operation stop signal to the gate driver group to be stopped, for each operating period. In other words, the display control circuit 4 supplies the gate driver to be operated with such a control signal that turns the TFT on and supplies the other gate driver with such a control signal that holds the TFT off to stop operation, for each operating period.

The operating period mentioned here may be a period of one frame or a period of a plurality of frames, or may be any predetermined time. The operating period may be a period during which the power of the liquid crystal display device 1 is on.

Figure 10:
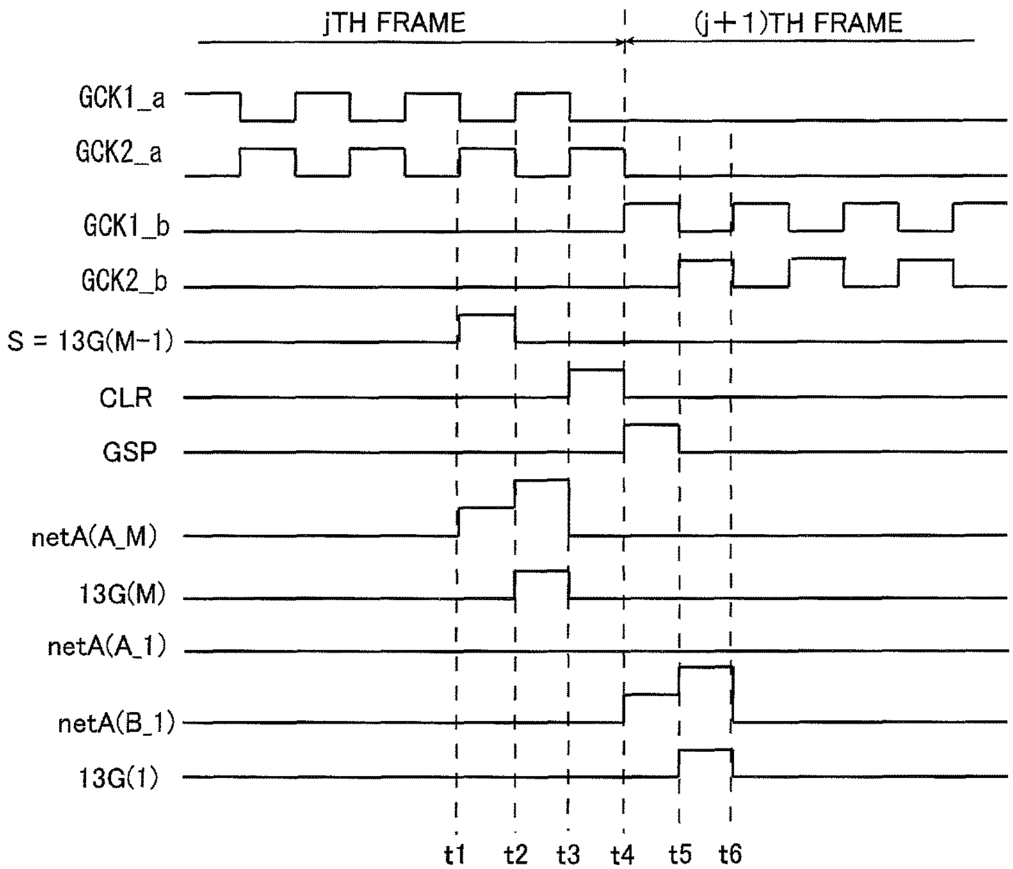
FIG. 10 is a timing chart when driving gate lines using the driving method illustrated in FIG. 9.

FIG. 10 is a timing chart when, assuming one operating period to be one frame, alternately operating the gate driver groups 11A and 11B every frame. The following describes an example where the gate lines 13G(1) to 13G(M) are driven by the gate driver group 11A in the jth frame and the 13G(1) to 13G(M) are driven by the gate driver group 11B in the (j+1)th frame.

In this example, the TFT-B and TFT-C in the gate driver 11 (hereafter, gate driver 11(M)) for driving the gate line 13G(M) are connected to the line 122*a* or 122*b* illustrated in FIG. 4, and supplied with the control signal GCK2_*a* or GCK2_*b*. The TFT-E in the gate driver 11(M) is connected to the line 121*a* or 121*b*, and supplied with the control signal GCK1_*a* or GCK1_*b*. The TFT-B and TFT-C in the gate driver 11 (hereafter, gate driver 11(1)) for driving the gate line 13G(1) are connected to the line 121*a* or 121*b* illustrated in FIG. 4, and supplied with the control signal GCK1_*a* or GCK1_*b*. The TFT-E in the gate driver 11(1) is connected to the line 122*a* or 122*b* illustrated in FIG. 4, and supplied with the control signal GCK2_*a* or GCK2_*b*.

In the jth frame, the display control circuit 4 supplies the clock signals CKA and CKB to the gate driver group 11A as the control signals GCK1_*a* and GCK2_*a*, and supplies the operation stop signal whose potential is L level to the gate driver group 11B as the control signals GCK1_*b* and GCK2_*b*.

The gate driver group 11A accordingly switches the gate lines 13G to the selected state one by one starting from the gate line 13G(1). From time t1 to t2, when the gate line 13G(M−1) is switched to the selected state, the H level potential of the gate line 13G(M−1) is supplied to the TFT-B in the gate driver 11(M) (hereafter, gate driver 11(A_M)) in the gate driver group 11A as the set signal S. As a result, the netA (hereafter, netA(A_M)) in the gate driver 11(A_M) is precharged to a potential that is ((H level potential)−(threshold voltage of TFT-B)).

Next, at time t2, the gate line 13G(M−1) is switched to the non-selected state. The L level potential of the control signal GCK2_*a* (CKB) is supplied to the gate terminal of the TFT-B in the gate driver 11(A_M), and the L level potential of the gate line 13G(M−1) is supplied to the drain terminal of the TFT-B. As a result, the TFT-B is turned off. Moreover, the H level potential of the control signal GCK1_*a* (CKA) is supplied to the drain terminal of the TFT-E in the gate driver 11(A_M). The netA(A_M) is then charged to a potential higher than the H level potential of the clock signal CKA by the capacitor Cbst connected between the netA (A_M) and the gate line 13G(M). Here, the L level potential of the control signal GCK2_*a* (CKB) is supplied to the gate terminal of the TFT-C in the gate driver 11(A_M). As a result, the TFT-C is turned off. The gate line 13G(M) is thus switched to the selected state.

At time t3, the display control circuit 4 supplies the reset signal CLR of H level to the gate driver groups 11A and 11B via the line 123. The reset signal CLR is supplied to the gate terminals of the TFT-A and TFT-D in each gate driver 11. The potentials of the netA in each gate driver 11 and the gate lines 13G(1) to 13G(M) accordingly transition to the power supply voltage VSS (L level).

At start time t4 of the (j+1)th frame, the display control circuit 4 starts supplying the operation stop signal whose potential is L level to the gate driver group 11A as the control signals GCK1_*a* and GCK2_*a*. At time t4, the display control circuit 4 also starts supplying the clock signals CKA and CKB to the gate driver group 11B as the control signals GCK1_*b* and GCK2_*b*. At time t4, the display control circuit 4 further supplies the gate start pulse signal GSP to the gate driver 11(1) (hereafter, gate driver 11(B_1)) in the gate driver group 11B as the set signal S.

Hence, GCK1_*b* (CKA) of H level and the gate start pulse signal GSP are supplied respectively to the gate terminal and drain terminal of the TFT-B in the gate driver 11(B_1). As a result, the netA (hereafter, netA(B_1)) in the gate driver 11(B_1) is precharged to a potential that is ((H level potential)−(threshold voltage of TFT-B)).

Next, at time t5, the gate start pulse signal GSP of L level and the L level potential of the clock signal CKA are supplied respectively to the drain terminal and gate terminal of the TFT-B in the gate driver 11(B_1). As a result, the TFT-B is turned off. Meanwhile, the H level potential of the control signal GCK2_*b* is supplied to the drain terminal of the TFT-E in the gate driver 11(B_1), and so the netA(B_1) is charged to a potential higher than the H level potential of the clock signal CKB by the capacitor Cbst.

Here, the L level potential of the clock signal CKA is supplied to the gate terminal of the TFT-C in the gate driver 11(B_1). As a result, the TFT-C is turned off. The gate line 13G(1) is thus switched to the selected state, and the potential of the gate line 13G(1) is supplied to the gate driver 11 in the gate driver group 11B for driving the gate line 13G(2) as the set signal S. In the (j+1)th frame, after the gate line 13G(1) is driven, the gate line 13G(2) to 13G(M) are sequentially driven by the gate driver group 11B in the same way as above.

Thus, the liquid crystal display device 1 sequentially drives the gate lines 13G(1) to 13G(M) by the gate driver group 11A or 11B connected to the gate lines 13G(1) to 13G(M), at predetermined time intervals. In the period during which the gate lines 13G(1) to 13G(M) are selected, a data signal is supplied to each source line 15S by the source driver 3 to display an image on the display panel 2.

Figure 11:
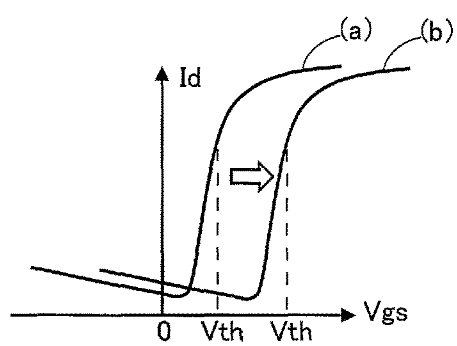
FIG. 11 is a diagram illustrating a property change of a switching element in a gate driver.

FIG. 11 is a diagram illustrating the relationship between the gate-source voltage Vgs and drain current Id of a TFT in the gate driver 11. For example, when the time during which a voltage exceeding a threshold voltage Vth is applied between the gate and source of the TFT having the property of (a) in FIG. 11 is longer, the property changes to the property of (b) in FIG. 11. In detail, the threshold voltage Vth of the TFT shifts in the positive direction, and the TFT degrades. In the gate driver 11, especially the TFT-B and TFT-C each of which has a gate terminal supplied with a clock signal tend to degrade because a positive bias is applied with a duty ratio of 50%.

In the first embodiment described above, any one of the plurality of gate drivers 11 connected to the gate line 13G is operated to drive the gate line 13G while stopping the operation of the other gate driver(s) 11, at predetermined time intervals. With such a structure, the time during which each TFT in each gate driver 11 is on is shortened as compared with the case of operating all gate drivers 11 to drive the gate line 13G. TFT degradation can thus be reduced.

Figure 12:
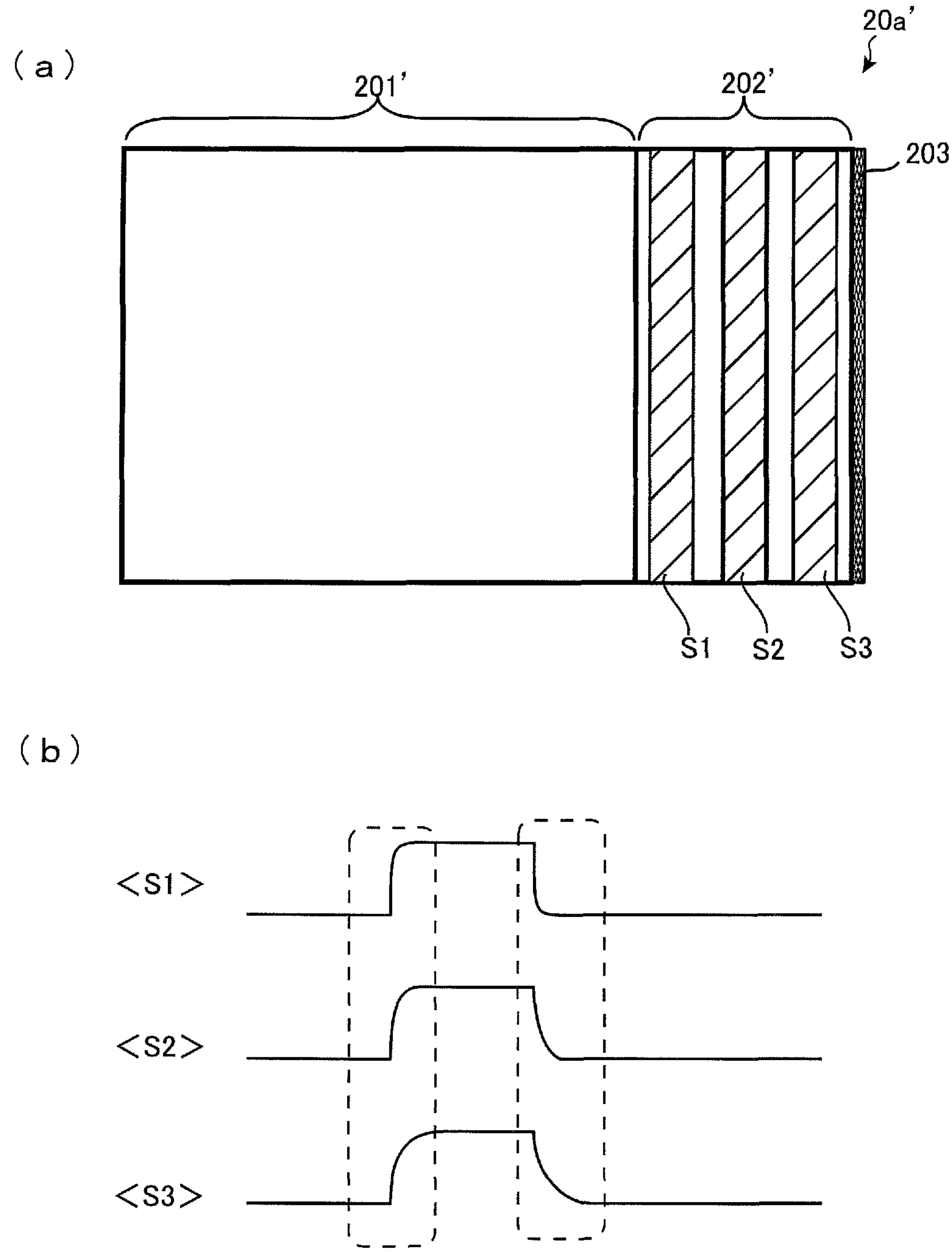
FIG. 12 is a schematic diagram illustrating an example of a conventional arrangement of gate drivers and output waveforms.

In a conventional structure of arranging gate drivers in a picture frame region 202' of an active-matrix substrate 20*a*' illustrated in (a) in FIG. 12, when the gate drivers are located in regions S1, S2, and S3, a gate driver nearer a seal region 203 in which a seal member for attaching the counter substrate (not illustrated) and the active-matrix substrate 20*a*' to each other is provided is more likely to be affected by external air and the like. This causes variations in gate driver degradation depending on the position of the gate driver.

(b) in FIG. 12 is a schematic diagram illustrating the drive waveform of a gate line by each of the gate drivers arranged in the regions S1, S2, and S3. The period of H level in each drive waveform illustrated in (b) in FIG. 12 is a period during which the gate line is selected. As illustrated in (b) in FIG. 12, the drive waveform of the gate line by the gate driver in the region S3 is duller. When the gate drivers arranged in the regions S1, S2, and S3 are operated in turn at predetermined time intervals, the selection voltage applied to the gate line differs among the gate drivers and the brightness in the display region varies at predetermined time intervals.

In the first embodiment described above, the gate drivers 11 are provided in the display region 201, away from the seal region (not illustrated) for attaching the counter substrate 20*b* and the active-matrix substrate 20*a* to each other. The TFTs in such gate drivers 11 are less likely to degrade due to external air and the like. Hence, when operating any of the gate drivers 11 connected to the gate line 13G while stopping the operation of the other gate driver(s) 11 at predetermined time intervals as mentioned above, the properties of the TFTs in these gate drivers 11 change substantially uniformly, so that display performance degradation due to property changes of TFTs can be reduced.

Second Embodiment

The foregoing first embodiment describes an example where clock signals of two phases (CKA and CKB) are supplied to each of the two gate driver groups. This embodiment describes an example where clock signals of four phases are supplied to each of the two gate driver groups. In the following description, the same components as in the first embodiment are given the same reference signs as in the first embodiment.

In this embodiment, the display control circuit 4 supplies, as control signals GCK1, GCK2, GCK3, and GCK4, clock signals CKA[1], CKA[2], CKB[1], and CKB[2] that alternate between H level and L level every two horizontal scan intervals (2H) or the operation stop signal whose potential is L level, to each of the gate driver groups 11A and 11B.

Figure 13:
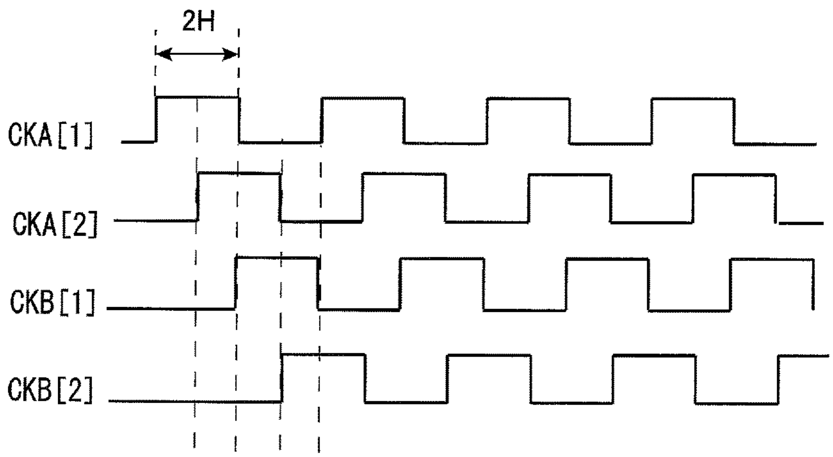
FIG. 13 is a schematic diagram illustrating an example of the waveforms of clock signals in a second embodiment.

FIG. 13 is a diagram illustrating the waveforms of the clock signals CKA[1], CKA[2], CKB[1], and CKB[2]. The clock signals CKA[1] and CKB[1] are opposite in phase to each other, and the clock signals CKA[2] and CKB[2] are opposite in phase to each other. The clock signals CKA[1] and CKA[2] are out of phase with each other by ¼ period, and the clock signals CKB[1] and CKB[2] are out of phase with each other by ¼ period.

In this embodiment, the terminal unit 12*g* has four lines for supplying the control signals GCK1, GCK2, GCK3, and GCK4 to each of the gate driver groups 11A and 11B.

In the following description, in the case of distinguishing the control signals supplied to the gate driver group 11A and the control signals supplied to the gate driver group 11B from each other, the control signals to the gate driver group 11A are referred to as control signals GCK1_*a*, GCK2_*a*, GCK3_*a*, and GCK4_*a*, and the control signals to the gate driver group 11B as control signals GCK1_*b*, GCK2_*b*, GCK3_*b*, and GCK4_*b*. In the case of distinguishing the clock signals supplied to the gate driver group 11A and the clock signals supplied to the gate driver group 11B from each other, the clock signals to the gate driver group 11A are referred to as clock signals CKA[1]_a, CKA[2]_a, CKB[1]_a, and CKB[2]_a, and the clock signals to the gate driver group 11B as clock signals CKA[1]_b, CKA[2]_b, CKB[1]_b, and CKB[2]_b.

Figure 14:
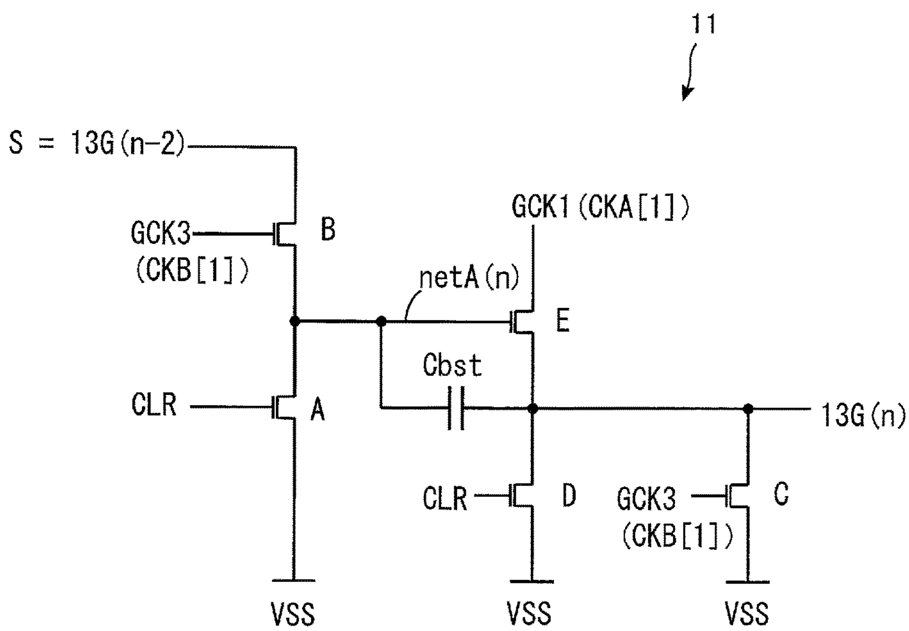
FIG. 14 is a diagram illustrating an example of an equivalent circuit of a gate driver in the second embodiment.

FIG. 14 is a diagram illustrating an equivalent circuit of the gate driver 11(*n*) in this embodiment. In the foregoing first embodiment, the potential of the gate line 13G(n−1) is supplied to the drain terminal of the TFT-B as the set signal S. This embodiment differs from the first embodiment in that the potential of the gate line 13G(n−2) is supplied.

Figure 15A:
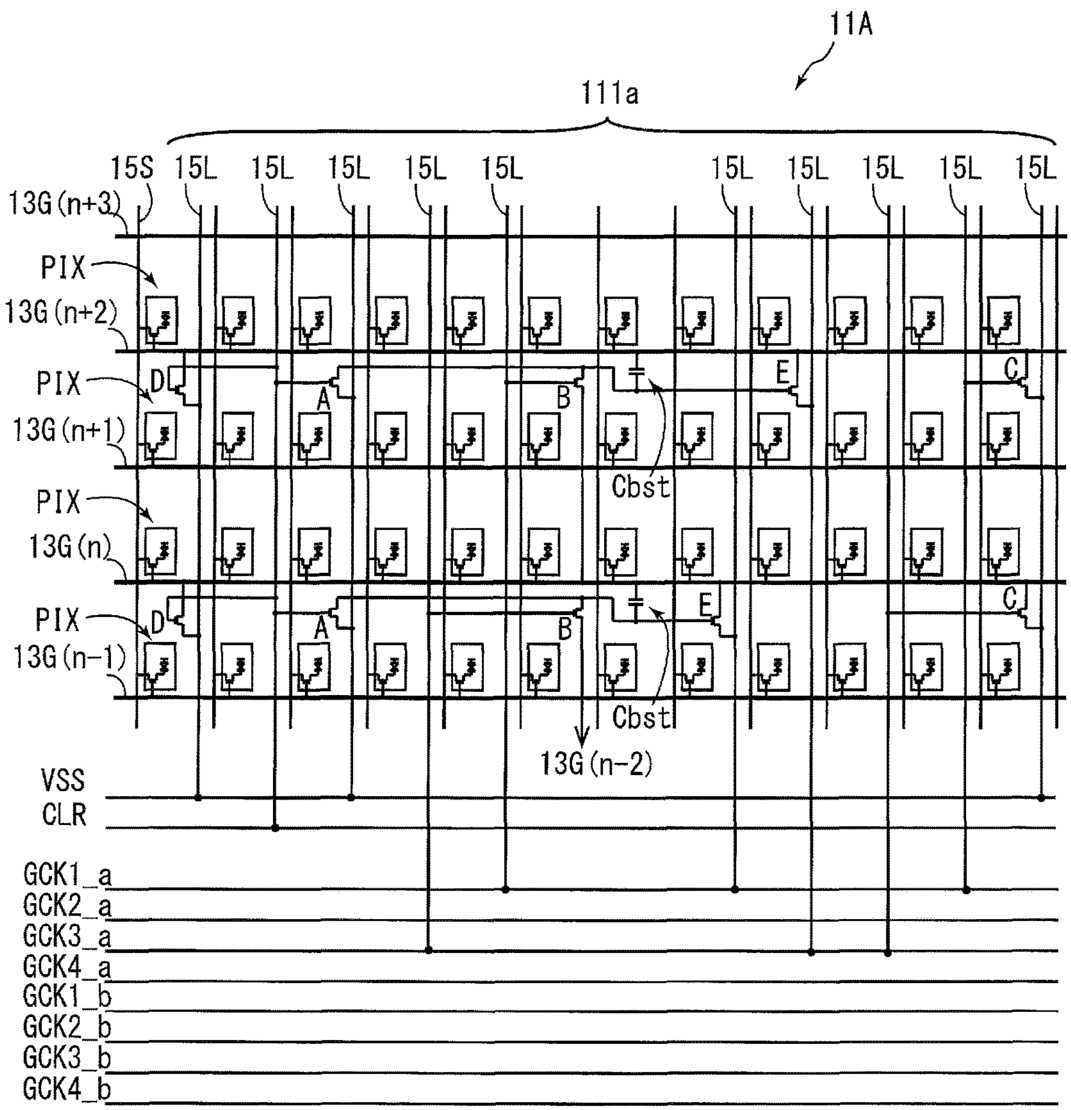
FIG. 15A is a schematic diagram illustrating an example of the arrangement and wiring of gate drivers illustrated in FIG. 14 in a display region.
Figure 15B:
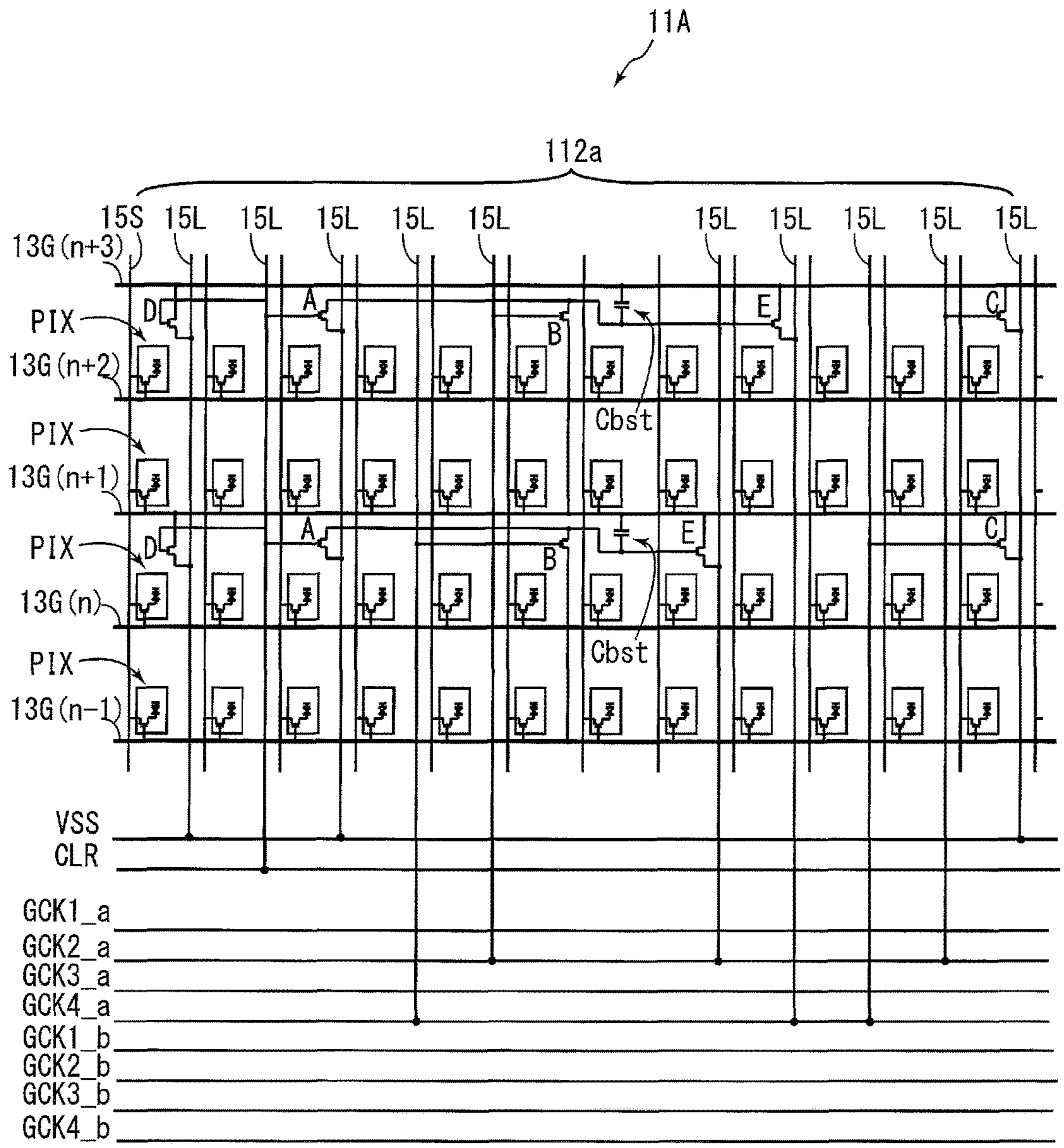
FIG. 15B is a schematic diagram illustrating an example of the arrangement and wiring of gate drivers illustrated in FIG. 14 in a display region.

The following describes an example of the arrangement of the gate driver groups 11A and 11B in the display region in this embodiment. FIGS. 15A and 15B are each a schematic diagram illustrating an example of the arrangement of the gate driver group 11A in this embodiment. The gate driver group 11A has two sub-gate driver groups 111*a* and 112*a*. The gate drivers 11 in the sub-gate driver group 111*a* drive the gate lines 13G(n) and 13G(n+2). The gate drivers 11 in the sub-gate driver group 112*a* drive the gate lines 13G(n+1) and 13G(n+3).

In detail, in FIG. 15A, the drain terminal of the TFT-B in the gate driver 11(*n*) for driving the gate line 13G(n) is connected to the gate line 13G(n−2) (not illustrated), and receives the set signal S from the gate line 13G(n−2). The drain terminal of the TFT-B in the gate driver 11(*n*+2) for driving the gate line 13G(n+2) is connected to the gate line 13G(n), and receives the set signal S from the gate line 13G(n). The gate terminals of the TFT-B and TFT-C in the gate driver 11(*n*) are supplied with the control signal GCK3_*a* (CKB[1]). The gate terminals of the TFT-B and TFT-C in the gate driver 11(*n*+2) are supplied with the control signal GCK1_*a* (CKA[1]). The clock signals CKA[1] and CKB[1] are clock signals opposite in phase to each other.

In FIG. 15B, the drain terminal of the TFT-B in the gate driver 11(*n*+1) for driving the gate line 13G(n+1) is connected to the gate line 13G(n−1), and receives the set signal S from the gate line 13G(n−1). The drain terminal of the TFT-B in the gate driver 11(*n*+3) for driving the gate line 13G(n+3) is connected to the gate line 13G(n+1), and receives the set signal S from the gate line 13G(n+1). The gate terminals of the TFT-B and TFT-C in the gate driver 11(*n*+1) are supplied with the control signal GCK4_*a* (CKB[2]). The gate terminals of the TFT-B and TFT-C in the gate driver 11(*n*+3) are supplied with the control signal GCK2_*a* (CKA[2]). The clock signals CKA[2] and CKB[2] are clock signals opposite in phase to each other.

In this embodiment, the gate drivers in adjacent rows are supplied with clock signals out of phase with each other by ¼ period. In the operating period, each of the sub-gate driver groups 111*a* and 112*a* receives the set signal S from the gate line 13G preceding by two rows, and switches the gate line 13G to the selected state in response to the supplied clock signals CKA[1]_a and CKB[1]_a.

Figure 15C:
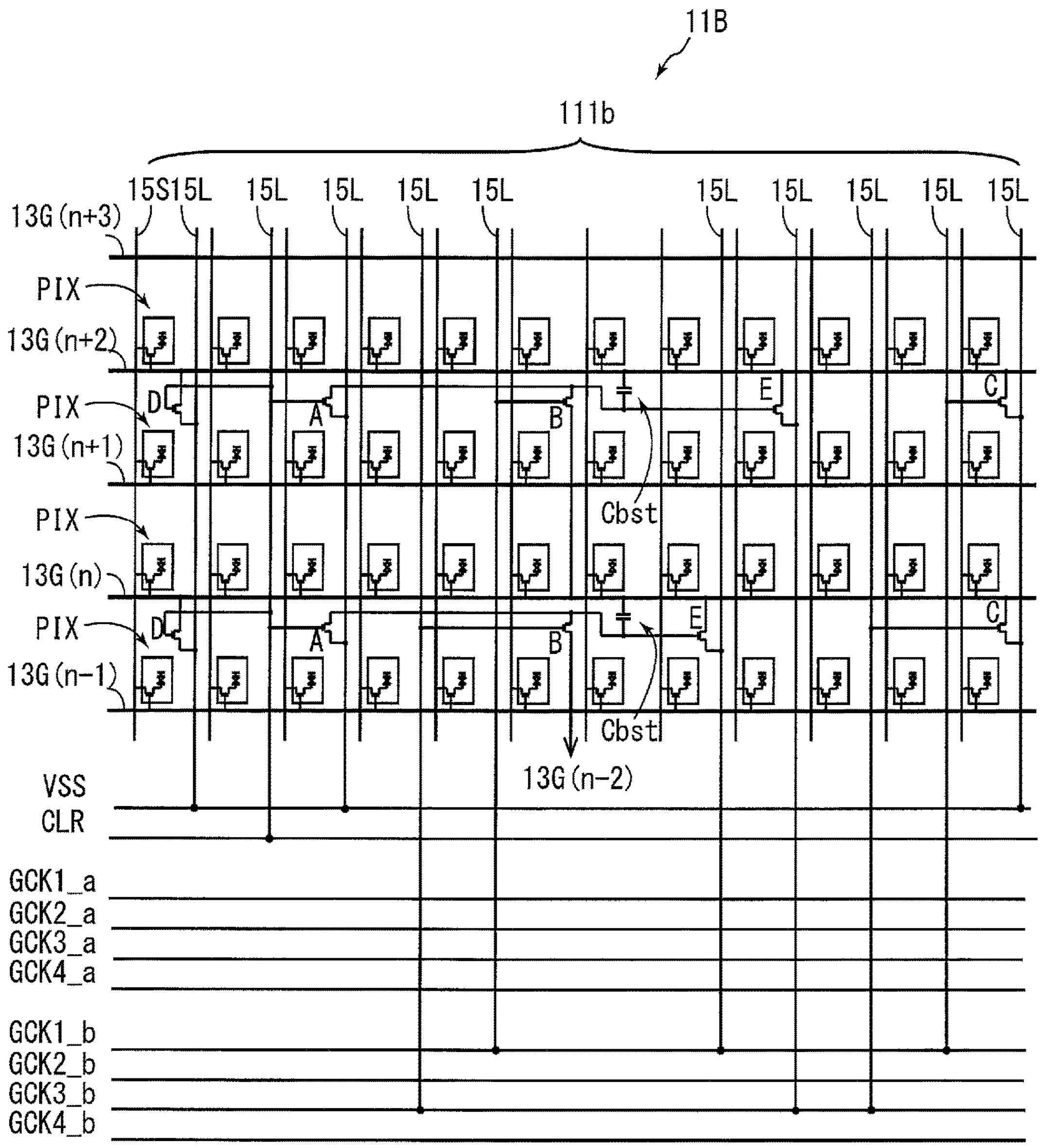
FIG. 15C is a schematic diagram illustrating an example of the arrangement and wiring of gate drivers illustrated in FIG. 14 in a display region.
Figure 15D:
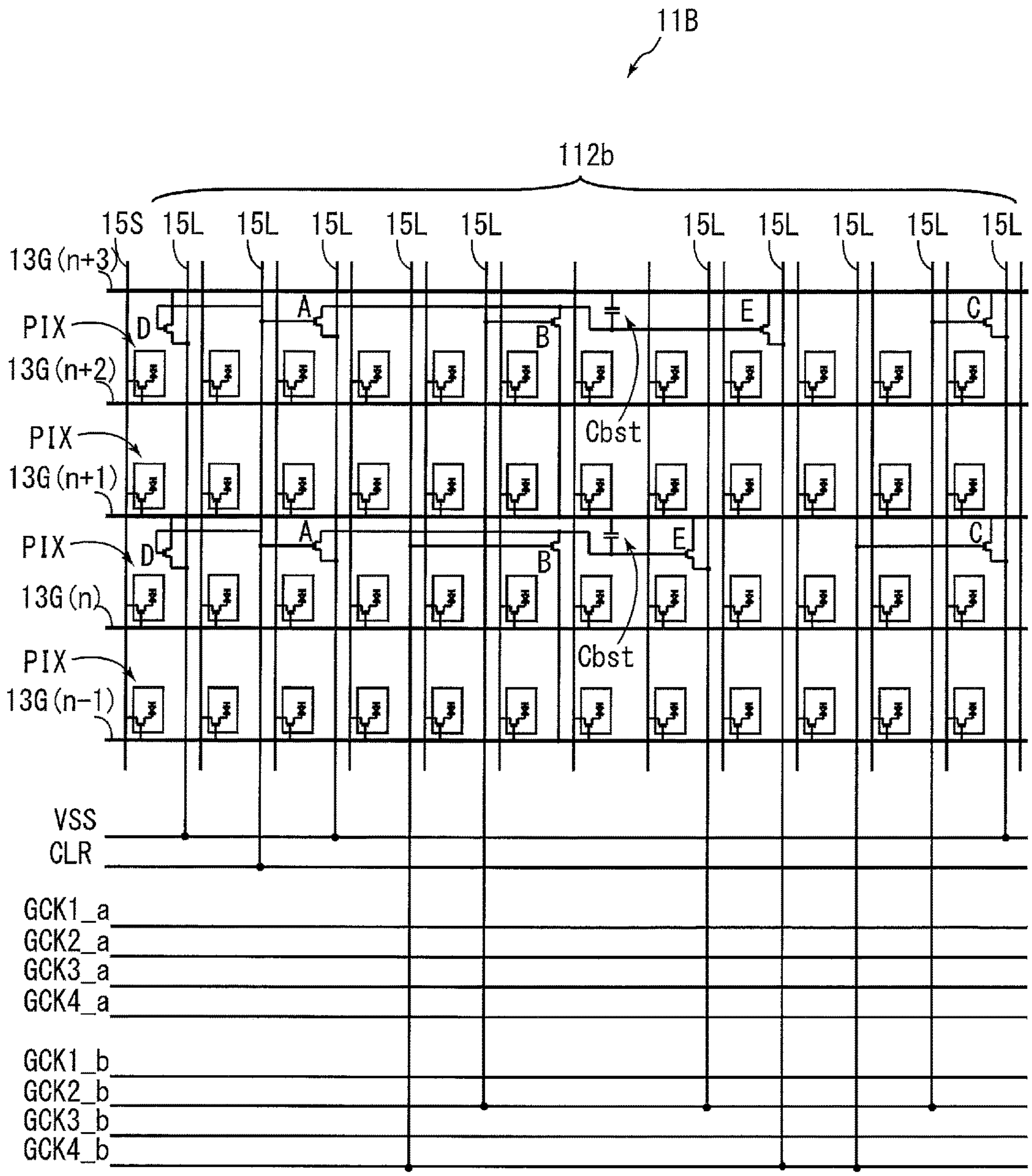
FIG. 15D is a schematic diagram illustrating an example of the arrangement and wiring of gate drivers illustrated in FIG. 14 in a display region.

FIGS. 15C and 15D are each a schematic diagram illustrating an example of the arrangement of the gate driver group 11B in this embodiment. In this embodiment, the gate driver group 11B has two sub-gate driver groups 111*b* and 112*b*. The sub-gate driver group 111*b* drives the gate lines 13G(n) and 13G(n+2), as with the aforementioned sub-gate driver group 111*a*. The sub-gate driver group 112*b* drives the gate lines 13G(n+1) and 13G(n+3), as with the aforementioned sub-gate driver group 112*a*. The differences from the gate driver group 11A are described below.

The sub-gate driver group 111*b* illustrated in FIG. 15C is supplied with the same control signals GCK1_*b* and GCK3_*b* (CKA[1] and CKB[1]) as the sub-gate driver group 111*a*, via lines different from those for the sub-gate driver group 111*a*. The sub-gate driver group 112*b* illustrated in FIG. 15D is supplied with the same control signals GCK2_*b* and GCK4_*b* (CKA[2] and CKB[2]) as the sub-gate driver group 112*a*, via lines different from those for the sub-gate driver group 112*a*.

The gate terminal of the TFT-B in the gate driver 11(1) in each of the gate driver groups 11A and 11B is supplied with the gate start pulse signal GSP (hereafter, GSP(1)) as the set signal S, as in the first embodiment. In this embodiment, the gate terminal of the TFT-B in the gate driver 11(2) for driving the gate line 13G(2) is supplied with a gate start pulse signal GSP(2) from the display control circuit 4.

The following describes the method of driving each gate line 13G. In this embodiment, the gate driver groups 11A and 11B are operated alternately at predetermined time intervals to drive each gate line 13G, as in the first embodiment.

Figure 16A:
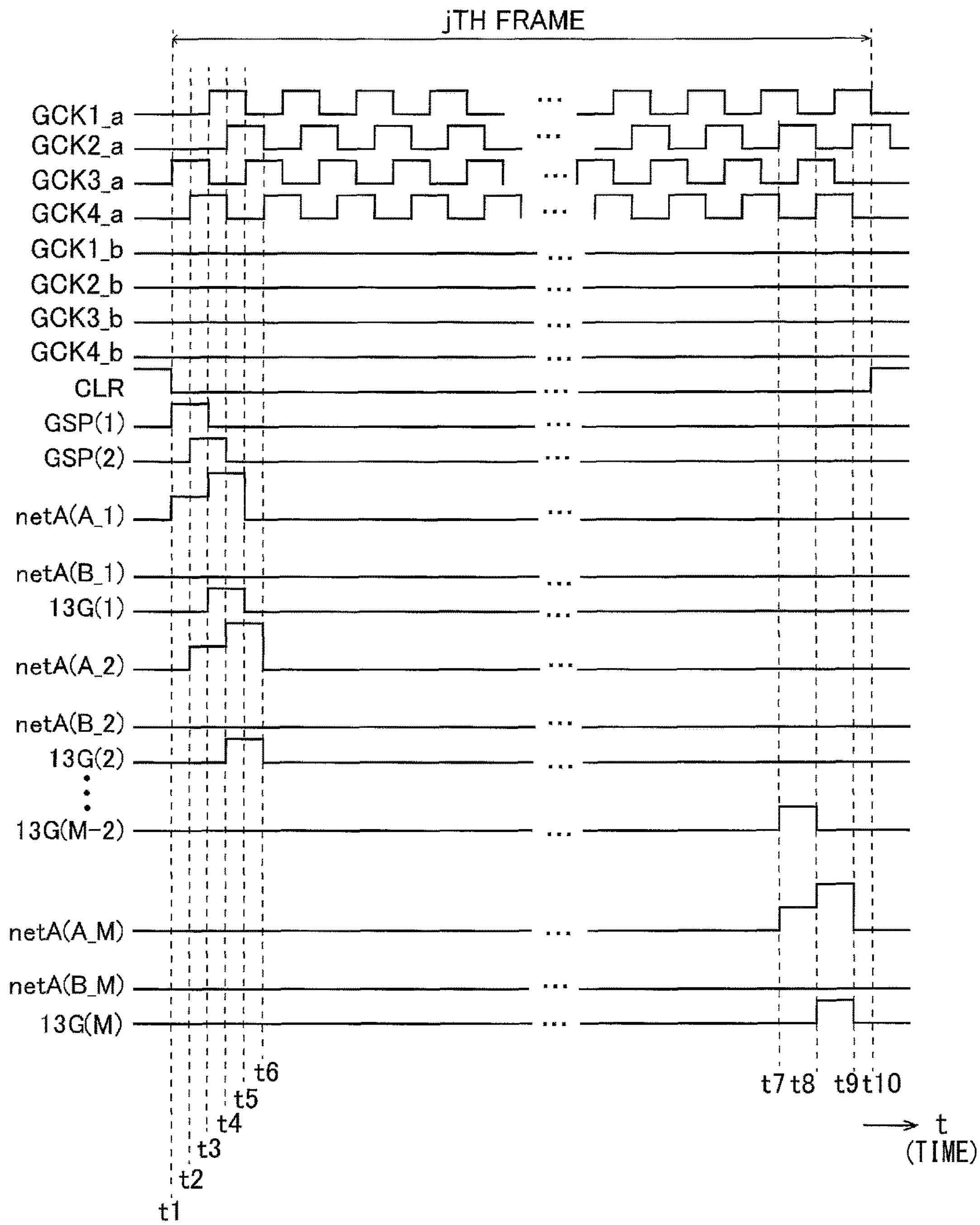
FIG. 16A is a timing chart illustrating the timings of driving gate lines by gate drivers in the second embodiment.
Figure 16B:
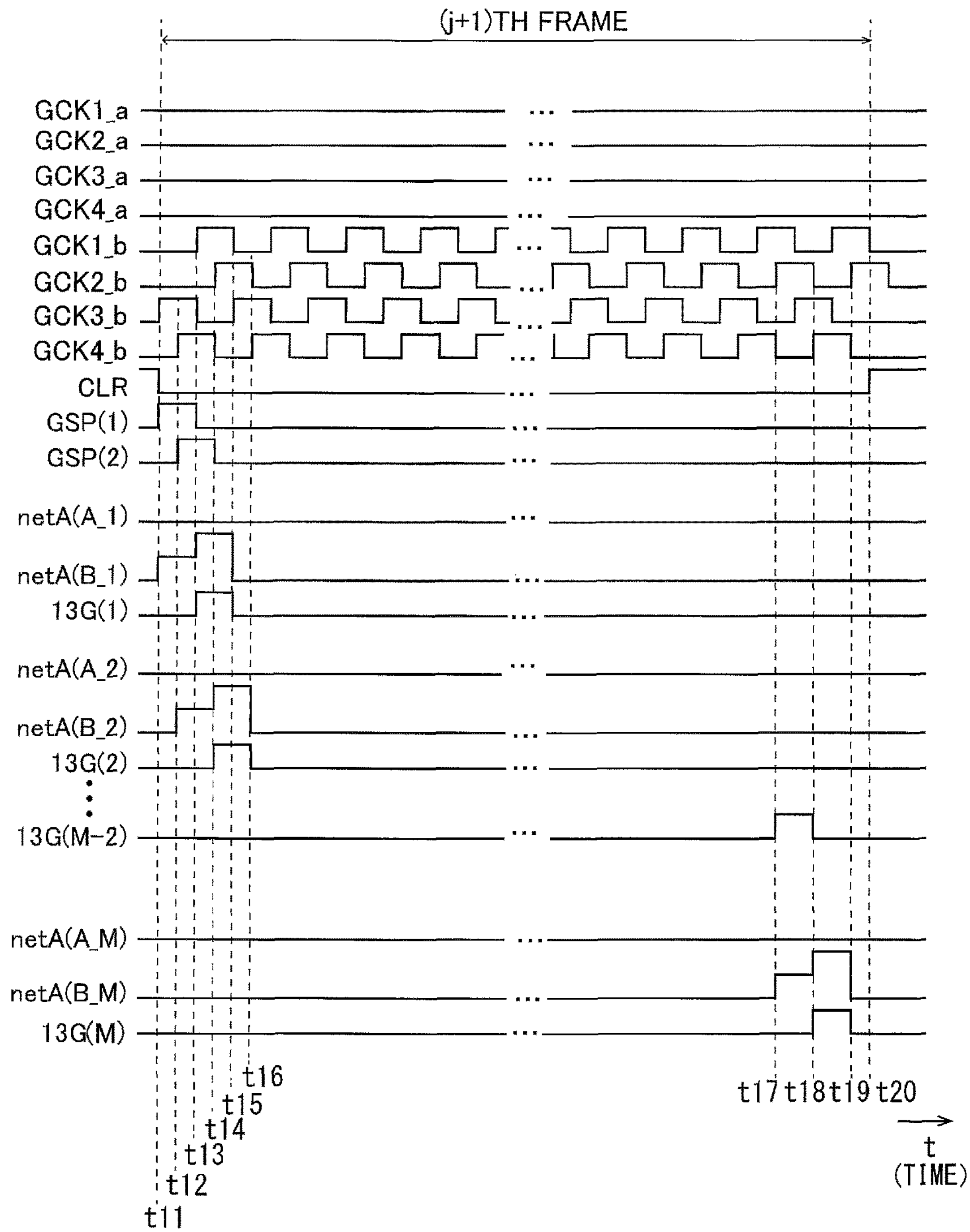
FIG. 16B is a timing chart illustrating the timings of driving gate lines by gate drivers in the second embodiment.

FIGS. 16A and 16B are each a timing chart when alternately operating the gate driver groups 11A and 11B every frame to drive the gate lines 13G(1) to 13(M).

In this example, it is assumed that, in the operating period, the clock signal CKB[1] is supplied to the gate terminals of the TFT-B and TFT-C and the clock signal CKA[1] is supplied to the drain terminal of the TFT-E in the gate driver 11(1) in each of the gate driver groups 11A and 11B. It is also assumed that, in the operating period, the clock signal CKA[2] is supplied to the gate terminals of the TFT-B and TFT-C and the clock signal CKB[2] is supplied to the drain terminal of the TFT-E in the gate driver 11(M) for driving the gate line 13G(M) in each of the gate driver groups 11A and 11B.

Before start time t1 of the jth frame, the reset signal CLR of H level is supplied from the display control circuit 4 to the gate driver groups 11A and 11B, and the potentials of the netA in each gate driver 11 and each gate lines 13G transition to L level. Following this, at time t1, the display control circuit 4 starts supplying the clock signals CKA[1]_a, CKA[2]_a, CKB[1]_a, and CKB[2]_a to the TFT-B, TFT-C, and TFT-E in each gate driver 11 in the gate driver group 11A, as control signals. The display control circuit 4 also supplies the gate start pulse signal GSP(1) to the gate terminal of the TFT-B in the gate driver 11(1) in the gate driver group 11A.

As result of the gate driver 11(1) in the gate driver group 11A receiving the gate start pulse signal GSP(1) and the control signal GCK3_*a* (CKB[1]_a) of H level, the netA (A_1) in the gate driver 11(1) is precharged at time t1. Moreover, at time t2, the display control circuit 4 supplies the gate start pulse signal GSP(2) to the gate terminal of the TFT-B in the gate driver 11(2) in the gate driver group 11A. The gate driver 11(2) in the gate driver group 11A receives the gate start pulse signal GSP(2) and the control signal GCK4_*a* (CKB[2]_a) of H level, as a result of which the netA(A_2) in the gate driver 11(2) is precharged.

Next, at time t3, when the H level potential of the clock signal CKA[1]_a is supplied to the gate terminal of the TFT-E in the gate driver 11(1) in the gate driver group 11A, the netA(A_1) is charged to a potential higher than the control signal GCK1_*a* (CKA[1]_a). Here, since the control signal GCK3_*a* (CKB[1]_a) is L level, the TFT-C in the gate driver 11(1) is turned off, and the gate line 13G(1) is switched to the selected state. The H level potential of the gate line 13G(1) is then supplied to the drain terminal of the TFT-B in the gate driver 11 (not illustrated) for driving the gate line 13G(3), as the set signal S.

Next, at time t4, when the H level potential of the control signal GCK2_*a* (CKA[2]_a) is supplied to the drain terminal of the TFT-E in the gate driver 11(2), the netA(A_2) in the gate driver 11(2) is charged to a potential higher than the clock signal CKA[2]_a. Here, since the control signal GCK4_*a* (CKB[2]_a) is L level, the TFT-C in the gate driver 11(2) is turned off, and the gate line 13G(2) is switched to the selected state. The H level potential of the gate line 13G(2) is then supplied to the drain terminal of the TFT-B in the gate driver 11 (not illustrated) for driving the gate line 13G(4), as the set signal S.

Next, at time t5, the control signal GCK1_*a* (CKA[1]_a) transitions to L level, and the control signal GCK3_*a* (CKB[1]_a) transitions to H level. The set signal S of L level is supplied to the drain terminal of the TFT-B in the gate driver 11(1) in the gate driver group 11A, and the netA(A_1) is charged to L level potential. Meanwhile, the TFT-C in the gate driver 11(1) is turned on, and the gate line 13G(1) is switched to the non-selected state.

Next, at time t6, the control signal GCK2_*a* (CKA[2]_a) transitions to H level, and the control signal GCK4_*a* (CKB[2]_a) transitions to L level. The set signal S of L level is supplied to the drain terminal of the TFT-B in the gate driver 11(2) in the gate driver group 11A, and the netA(A_2) is charged to L level potential. Meanwhile, the TFT-C in the gate driver 11(2) is turned on, and the gate line 13G(2) is switched to the non-selected state.

Thus, the gate lines 13G(3) to 13G(M−1) are also each precharged at the timing of driving the gate line 13G preceding by two rows, and driven with a delay of ¼ period from the timing of driving the gate line 13G preceding by one row.

At time t7 when the gate line 13G(M−2) is switched to the selected state, the H level potential of the gate line 13G(M−2) and the control signal GCK2_*a* (CKA[2]_a) of H level are supplied to the TFT-B in the gate driver 11(M) in the gate driver group 11A. As a result, the netA(A_M) in the gate driver 11(M) is precharged.

Next, at time t8, when the H level potential of the control signal GCK4_*a* (CKB[2]_a) is supplied to the drain terminal of the TFT-E in the gate driver 11(M), the netA(A_M) in the gate driver 11(M) is charged to a potential higher than the clock signal CKB[2]_a. Here, since the control signal GCK2_*a* (CKA[2]_a) is L level, the gate line 13G(M) is switched to the selected state.

Next, at time t9, the control signal GCK2_*a* (CKA[2]_a) transitions to H level, and the control signal GCK4_*a* (CKB[2]_a) transitions to L level. Here, the gate line 13G (M−2) is in the non-selected state. Accordingly, the set signal S of L level is supplied to the drain terminal of the TFT-B in the gate driver 11(M), and the netA(A_M) is charged to L level potential. Meanwhile, the TFT-C in the gate driver 11(M) is turned on, and the gate line 13G(M) is switched to the non-selected state.

After the gate line 13G(M) is switched to the non-selected state, the display control circuit 4 supplies the reset signal CLR to the gate driver groups 11A and 11B at time t10, to start the process for the (j+1)th frame.

FIG. 16B is a timing chart when driving each gate line 13G in the (j+1)th frame. At time t11 in the (j+1)th frame, the display control circuit 4 supplies the operation stop signal whose potential is L level to the gate driver group 11A (see FIGS. 15A and 15B) as control signals. The display control circuit 4 also starts supplying the clock signals CKA[1]_b, CKA[2]_b, CKB[1]_b, and CKB[2]_b to the gate driver group 11B (see FIGS. 15C and 15D) as control signals.

As illustrated in FIG. 16B, at time t11 in the (j+1)th frame, the gate start pulse signal GSP(1) is supplied to the gate driver 11(1) in the gate driver group 11B and the netA(B_1) in the gate driver 11(1) is precharged, as in the jth frame. At time t12, the gate start pulse signal GSP(2) is supplied to the gate driver 11(2) in the gate driver group 11B, and the netA(B_2) in the gate driver 11(2) is precharged.

The timings of driving the gate lines 13G by the gate driver group 11B from time t13 onward are the same as the timings of driving the gate lines 13G by the gate driver group 11A from time t3 onward illustrated in FIG. 16A. In detail, as illustrated in FIG. 16B, the gate lines 13G(1) to 13G(M) are each precharged at the timing of driving the gate line 13G preceding by two rows, and driven with a delay of ¼ period from the timing of driving the gate line 13G preceding by one row, as in FIG. 16A.

In the second embodiment described above, clock signals of four phases that alternate between H level and L level every two horizontal scan intervals are supplied to either of the gate driver groups 11A and 11B at predetermined time intervals, and the gate lines 13G are sequentially driven with the timing that is shifted by ¼ period from the start of driving the gate line 13G preceding by one row. In the second embodiment, the clock signal frequency can be decreased as compared with the first embodiment. This increases the charge/discharge time of the gate lines 13G in each operating period, with it being possible to improve the operation margin of the gate drivers 11.

Third Embodiment

The foregoing first and second embodiments describe an example where one of the two gate drivers 11 connected to one gate line 13G is operated to drive the gate line 13G. This embodiment describes an example where three or more gate drivers 11 are connected to one gate line 13G, and at least two gate drivers 11 are operated synchronously to drive the gate line 13G.

Figure 17:
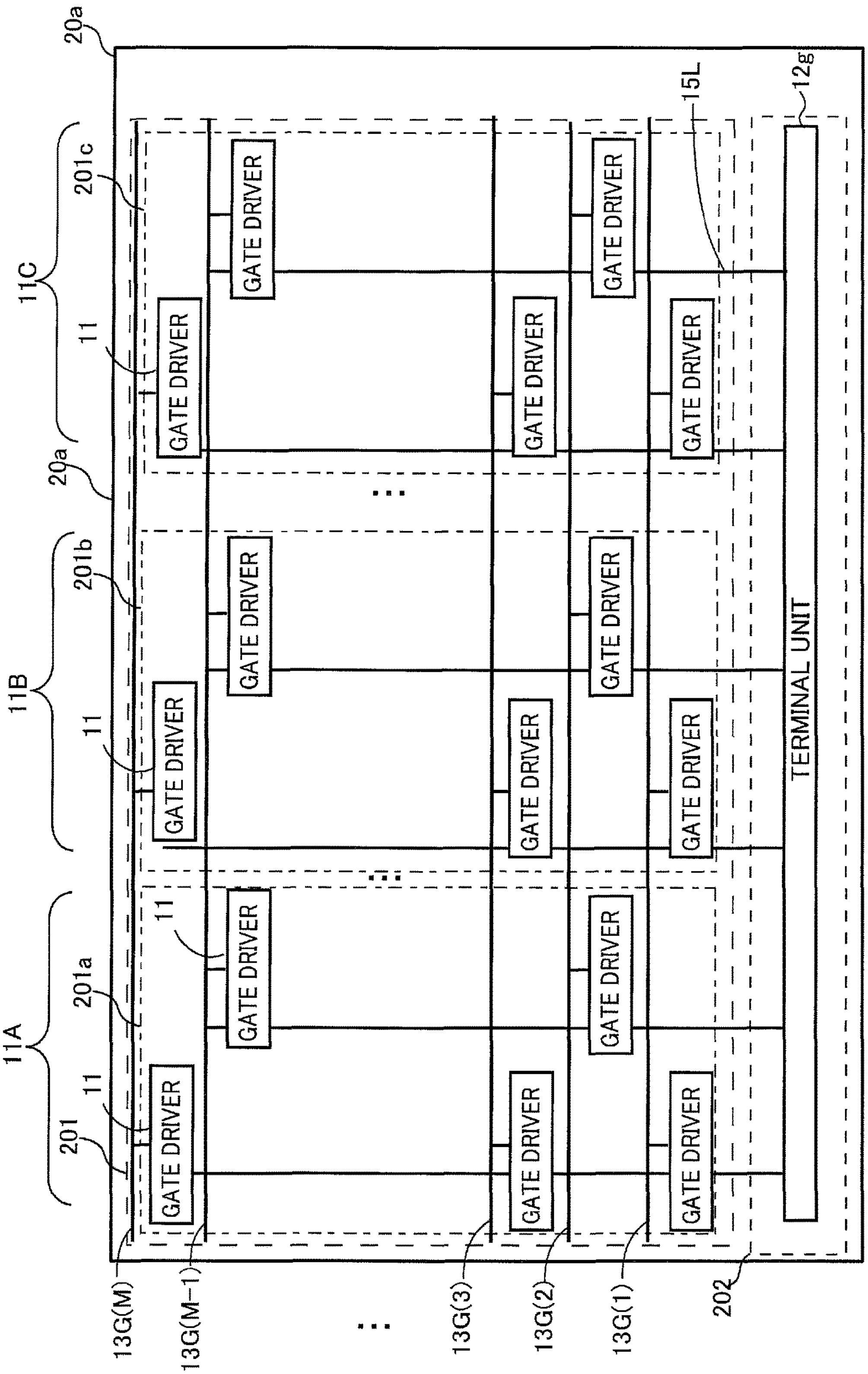
FIG. 17 is a schematic diagram illustrating the structure of an active-matrix substrate in a third embodiment.

FIG. 17 is a schematic diagram illustrating the gate drivers 11 arranged in the active-matrix substrate 20*a* in this embodiment. The source lines 15S and the terminal unit 12*s* are omitted in the illustrated example. The structure different from the first embodiment is described below.

As illustrated in FIG. 17, in this embodiment, the gate driver groups 11A and 11B (see FIG. 18) are located respectively in the regions 201*a* and 201*b* in the display region 201, as in the first embodiment. In addition, a gate driver group 11C (see FIG. 18) for driving the gate lines 13G(1) to 13G(M) is located in a region 201*c* in the display region 201. Thus, three gate drivers 11 for driving one gate line 13G are provided in the example in FIG. 17.

Figure 18:
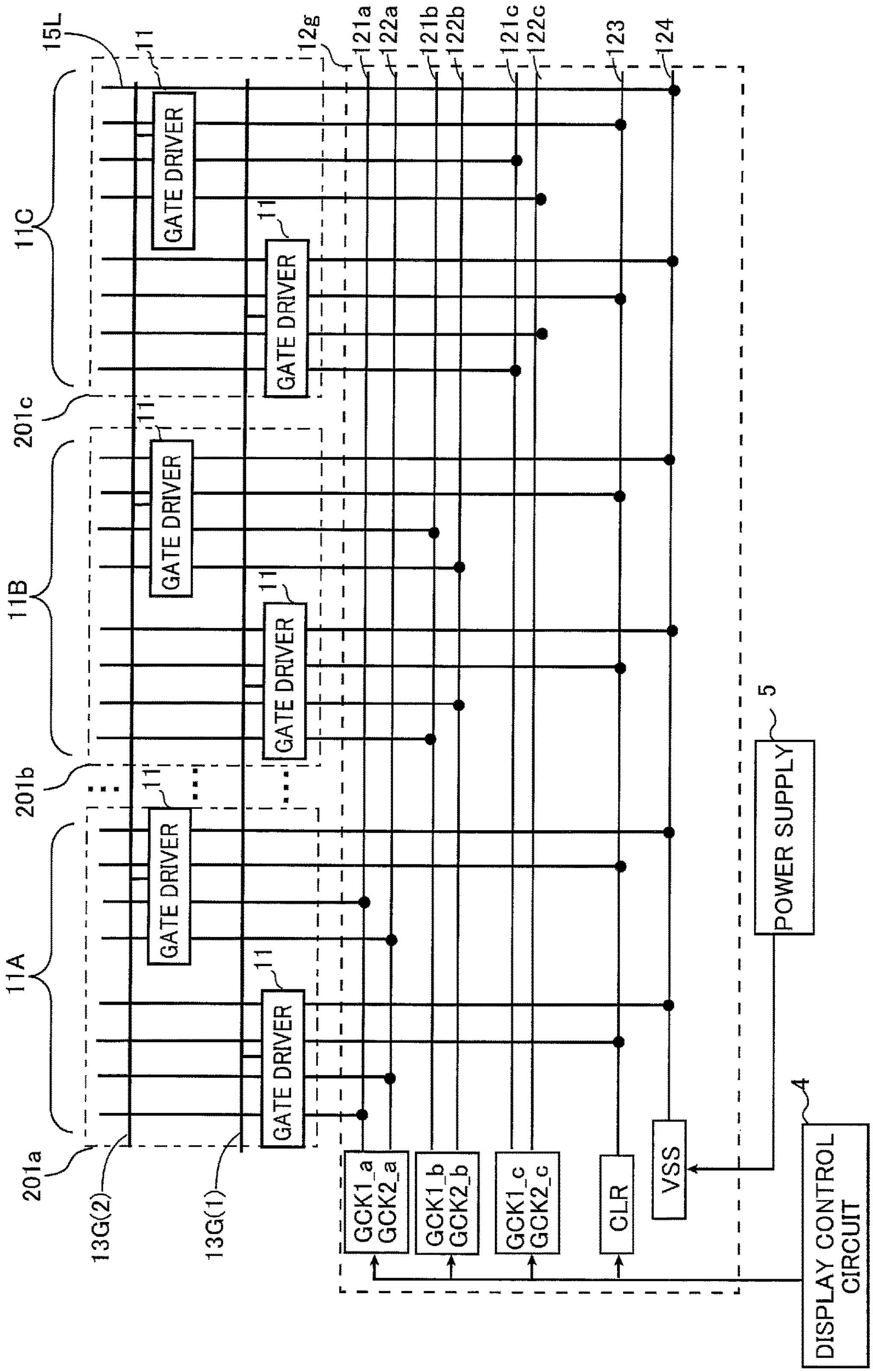
FIG. 18 is a diagram illustrating an example of the structure of a terminal unit in the active-matrix substrate illustrated in FIG. 17.

FIG. 18 is a schematic diagram illustrating an example of the structure of the terminal unit 12*g* illustrated in FIG. 17. As illustrated in FIG. 18, the terminal unit 12*g* has lines 121*c* and 122*c* for supplying control signals GCK1_*c* and GCK2_*c*, in addition to the lines 121*a* to 122*b*. The gate driver group 11C is connected to the lines 121*c* and 122*c* via lines 15L. The gate driver group 11C is also connected to the line 123 supplied with the reset signal CLR and the line 124 supplied with the power supply voltage signal VSS in the terminal unit 12*g*, via lines 15L.

The line 121*c* is supplied with the clock signal CKA illustrated in FIG. 5 or the operation stop signal whose potential is L level, as the control signal GCK1_*c*. The line 122*c* is supplied with the clock signal CKB illustrated in FIG. 5 or the operation stop signal whose potential is L level, as the control signal GCK2_*c*.

In the following description, in the case of not distinguishing the control signals GCK1_*a* and GCK2_*a*, GCK1_*b* and GCK2_*b*, and GCK1_*c* and GCK2_*c* supplied to the gate driver groups 11A to 11C from each other, the control signals are referred to as control signals GCK1 and GCK2.

The following describes the method of driving each gate line 13G in this embodiment. In this embodiment, two gate driver groups of the gate driver groups 11A to 11C are operated to drive the gate line 13G while stopping the operation of the remaining one gate driver group, at predetermined time intervals.

Figure 19:
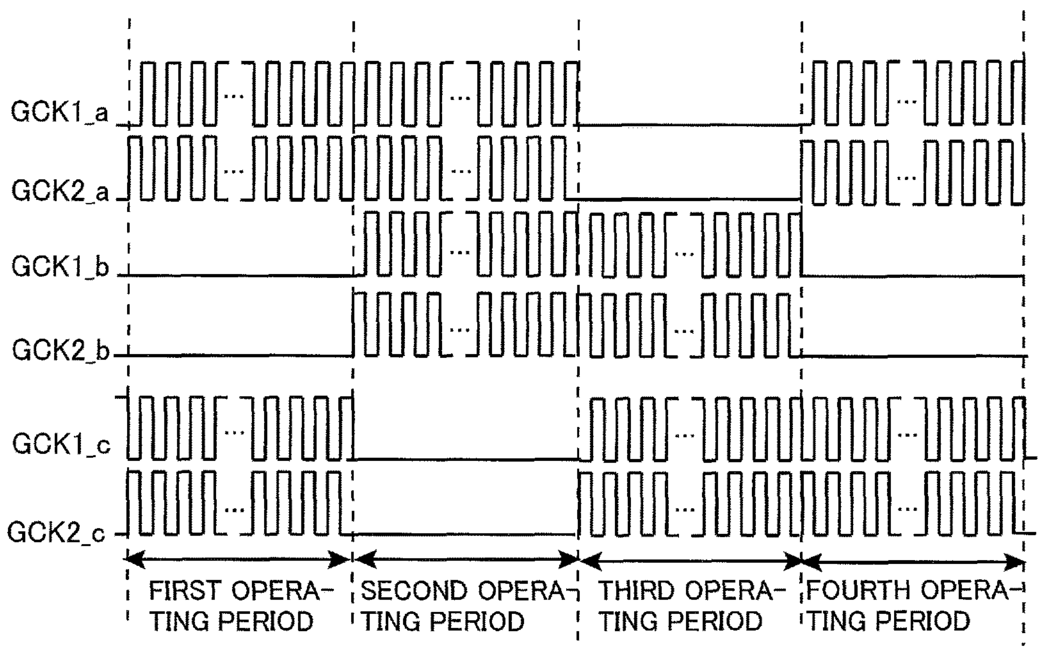
FIG. 19 is a diagram illustrating a method of driving gate driver groups in the third embodiment.

In detail, for example as illustrated in FIG. 19, the display control circuit 4 supplies the clock signals CKA and CKB to the gate driver groups 11A and 11C as control signals, in a first operating period. The display control circuit 4 also supplies the operation stop signal whose potential is L level to the gate driver group 11B as control signals, in the first operating period. In a second operating period which follows, the display control circuit 4 supplies the clock signals CKA and CKB to the gate driver groups 11A and 11B as control signals, and supplies the operation stop signal whose potential is L level to the gate driver group 11C as control signals. In a third operating period which follows, the display control circuit 4 supplies the operation stop signal whose potential is L level to the gate driver group 11A as control signals, and supplies the clock signals CKA and CKB to the gate driver groups 11B and 11C as control signals. Thus, in this embodiment, two gate driver groups are operated synchronously in one operating period, and each gate driver group stops operation after every two operating periods.

Figure 20:
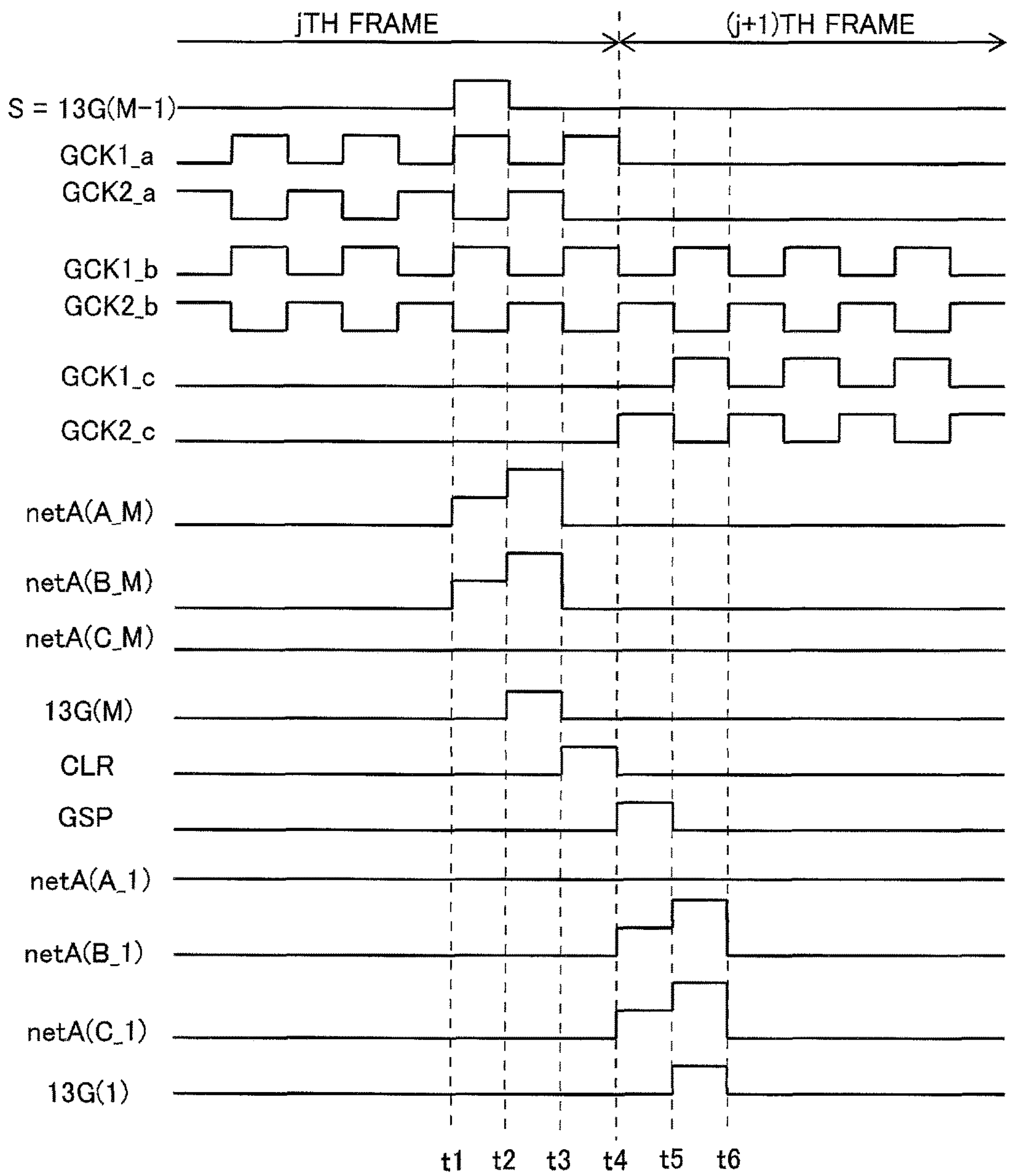
FIG. 20 is a timing chart when driving gate lines using the driving method illustrated in FIG. 19.

FIG. 20 is a timing chart when, assuming one operating period to be one frame, operating two gate driver groups every frame to drive each gate line 13G. In this example, the gate lines 13G(1) to 13G(M) are driven by the gate driver groups 11A and 11B while stopping the operation of the gate driver group 11C in the jth frame, and the gate lines 13G(1) to 13G(M) are driven by the gate driver groups 11B and 11C while stopping the operation of the gate driver group 11A in the next (j+1)th frame.

In this example, the TFT-B and TFT-C in the gate driver 11(M) in each of the gate driver groups 11A to 11C are supplied with the clock signal CKB as the control signal GCK2 and the TFT-E in the gate driver 11(M) is supplied with the clock signal CKA as the control signal GCK1, in the operating period. Moreover, the TFT-B and TFT-C in the gate driver 11(1) in each of the gate driver groups 11A to 11C are supplied with the clock signal CKA as the control signal GCK1 and the TFT-E in the gate driver 11(1) is supplied with the clock signal CKB as the control signal GCK2, in the operating period.

In the jth frame, the display control circuit 4 supplies the clock signals CKA and CKB to the gate driver groups 11A and 11B as control signals, and supplies the operation stop signal whose potential is L level to the gate driver group 11C.

The gate driver groups 11A and 11B accordingly switch the gate lines 13G to the selected state one by one starting from the gate line 13G(1). From time t1 to t2, when the gate line 13G(M−1) is switched to the selected state, the H level potential of the gate line 13G(M−1) is supplied to the TFT-B in each of the respective gate drivers 11(M) (hereafter, gate drivers 11(A_M) and 11(B_M)) in the gate driver groups 11A and 11B as the set signal S. As a result, the netA(A_M) in the gate driver 11(A_M) and the netA(B_M) in the gate driver 11(B_M) are precharged to a potential that is ((H level potential)−(threshold voltage of TFT-B)).

Next, at time t2, the gate line 13G(M−1) is switched to the non-selected state. The L level potential of the clock signal CKB is supplied to the gate terminal of the TFT-B in each of the gate drivers 11(A_M) and 11(B_M), and the L level potential of the gate line 13G(M−1) is supplied to the drain terminal of the TFT-B. As a result, the TFT-B in each of the gate drivers is turned off. Meanwhile, the H level potential of the clock signal CKA is supplied to the drain terminal of the TFT-E in each of the gate drivers 11(A_M) and 11(B_M). The netA(A_M) and netA(B_M) are then charged to a potential higher than the H level potential of the clock signal CKA by the respective capacitors Cbst in the gate drivers 11(A_M) and 11(B_M). Here, the L level potential of the clock signal CKB is supplied to the gate terminal of the TFT-C in each of the gate drivers 11(A_M) and 11(B_M). The gate line 13G(M) is thus switched to the selected state.

At time t3, the display control circuit 4 supplies the reset signal CLR of H level to the gate driver groups 11A to 11C. As a result, the potentials of the netA in each gate driver 11 in the gate driver groups 11A to 11C and the gate lines 13G(1) to 13G(M) transition to the power supply voltage VSS (L level).

At start time t4 of the (j+1)th frame, the display control circuit 4 starts supplying the operation stop signal whose potential is L level to the gate driver group 11A, and also supplies the clock signals CKA and CKB to the gate driver groups 11B and 11C. At time t4, the display control circuit 4 also supplies the gate start pulse signal GSP to the respective gate drivers 11(1) (hereafter, gate drivers 11(B_1) and 11(C_1)) in the gate driver groups 11B and 11C as the set signal S.

Hence, the H level potential of the clock signal CKA and the gate start pulse signal GSP are supplied respectively to the gate terminal and drain terminal of the TFT-B in each of the gate drivers 11(B_1) and 11(C_1). As a result, the netA (hereafter, netA(B_1) and netA(C_1)) in each of the gate drivers 11(B_1) and 11(C_1) is precharged to a potential that is ((H level potential)−(threshold voltage of TFT-B)).

Next, at time t5, the gate start pulse signal GSP of L level and the L level potential of the clock signal CKA are supplied respectively to the drain terminal and gate terminal of the TFT-B in each of the gate drivers 11(B_1) and 11(C_1). As a result, the TFT-B is turned off. Meanwhile, the H level potential of the clock signal CKB is supplied to the drain terminal of the TFT-E in each of the gate drivers 11(B_1) and 11(C_1). As a result, the netA(B_1) and netA (C_1) are charged to a potential higher than the H level potential of the clock signal CKB by the respective capacitors Cbst.

Here, the L level potential of the clock signal CKA is supplied to the gate terminal of the TFT-C in each of the gate drivers 11(B_1) and 11(C_1). As a result, the TFT-C is turned off. The gate line 13G(1) is thus switched to the selected state, and the potential of the gate line 13G(1) is supplied to the gate driver 11 for driving the gate line 13G(2) in each of the gate driver groups 11B and 11C as the set signal S.

In the (j+1)th frame, after the gate line 13G(1) is driven, the gate lines 13G(2) to 13G(M) are sequentially driven by the gate driver groups 11B and 11C in the same way as above.

In the third embodiment described above, of N gate drivers 11 connected to one gate line 13G (N is a natural number such that N≥3), two or more and less than N gate drivers 11 are operated synchronously to drive the gate line 13G while stopping the operation of each TFT in the other gate driver(s) 11. Of the TFTs in each gate driver 11, especially the TFT-E functions as an output buffer for outputting the selection voltage to the gate line 13G. The output buffer particularly needs to have a greater channel width than the other TFTs, and is desirably composed of a plurality of TFTs. In the third embodiment described above, the load of the output buffer for driving one gate line 13G is distributed. Therefore, the number of TFTs functioning as the output buffer can be reduced as compared with the case of driving one gate line 13G by one gate driver 11.

Fourth Embodiment

The foregoing first to third embodiments describe an example where the TFTs in each gate driver 11 are each composed of one TFT. This embodiment describes the case where at least one of the TFTs in each gate driver 11 is composed of a plurality of TFTs.

Figure 21:
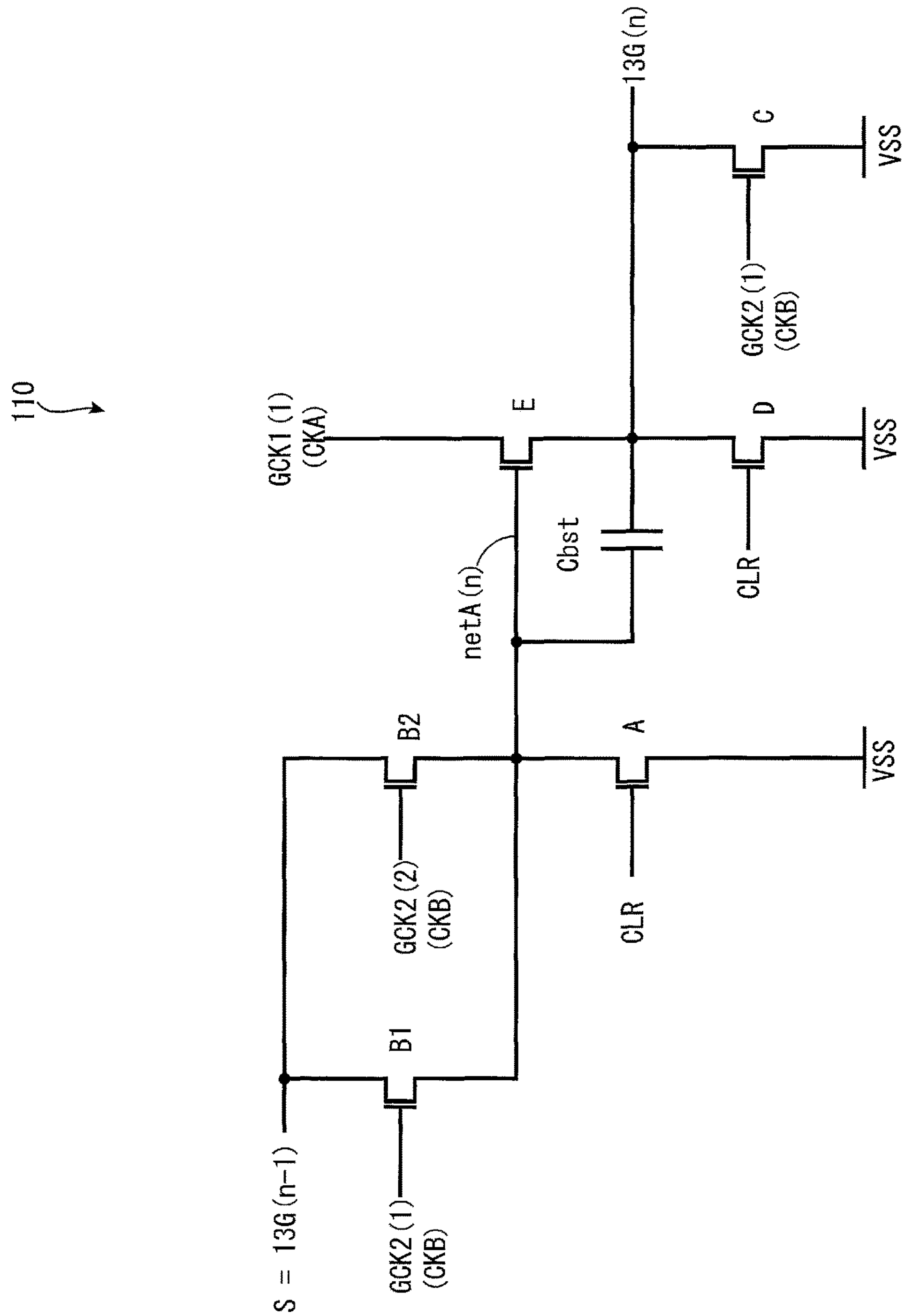
FIG. 21 is a diagram illustrating an example of an equivalent circuit of a gate driver in a fourth embodiment.

FIG. 21 is a diagram illustrating an equivalent circuit of a gate driver in this embodiment. As illustrated in FIG. 21, TFTs designated as B1 and B2 (hereafter, TFT-B1 and TFT-B2) are connected in parallel in a gate driver 110 in this embodiment, unlike the TFT-B in the gate driver 11. The structure different from the first embodiment is described below.

The control signal GCK2 or GCK1 is supplied to the gate terminal of each of the TFT-B1 and TFT-B2 in the gate driver 110. In the following description, in the case of distinguishing the control signal GCK1 or GCK2 supplied to the TFT-B1 and the control signal GCK1 or GCK2 supplied to the TFT-B2 from each other, the control signal to the TFT-B1 is referred to as GCK1(1) or GCK2(1), and the control signal to the TFT-B2 as GCK1(2) or GCK2(2).

Figure 22A:
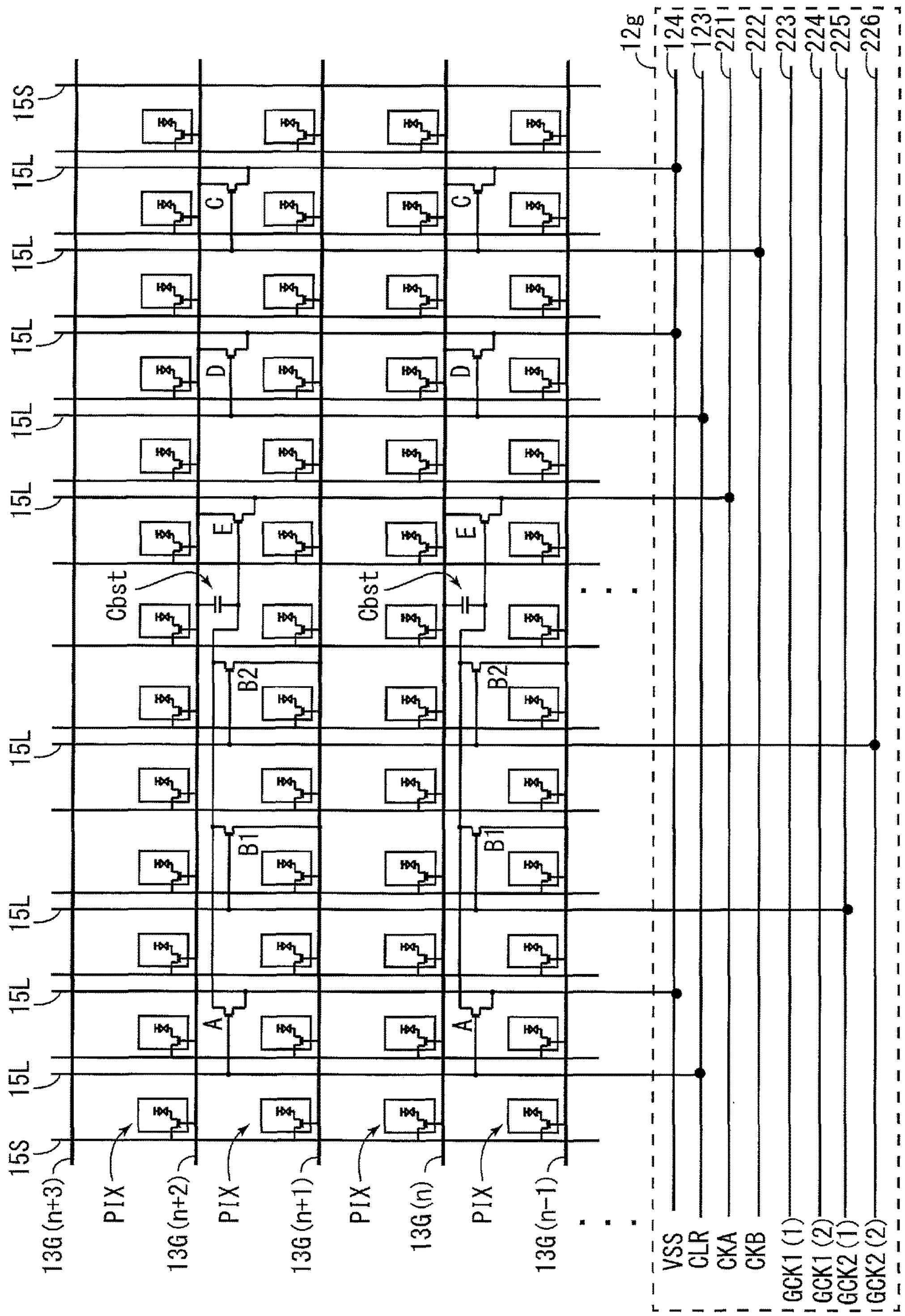
FIG. 22A is a schematic diagram illustrating an example of the arrangement and wiring of gate drivers illustrated in FIG. 21 in a display region.
Figure 22B:
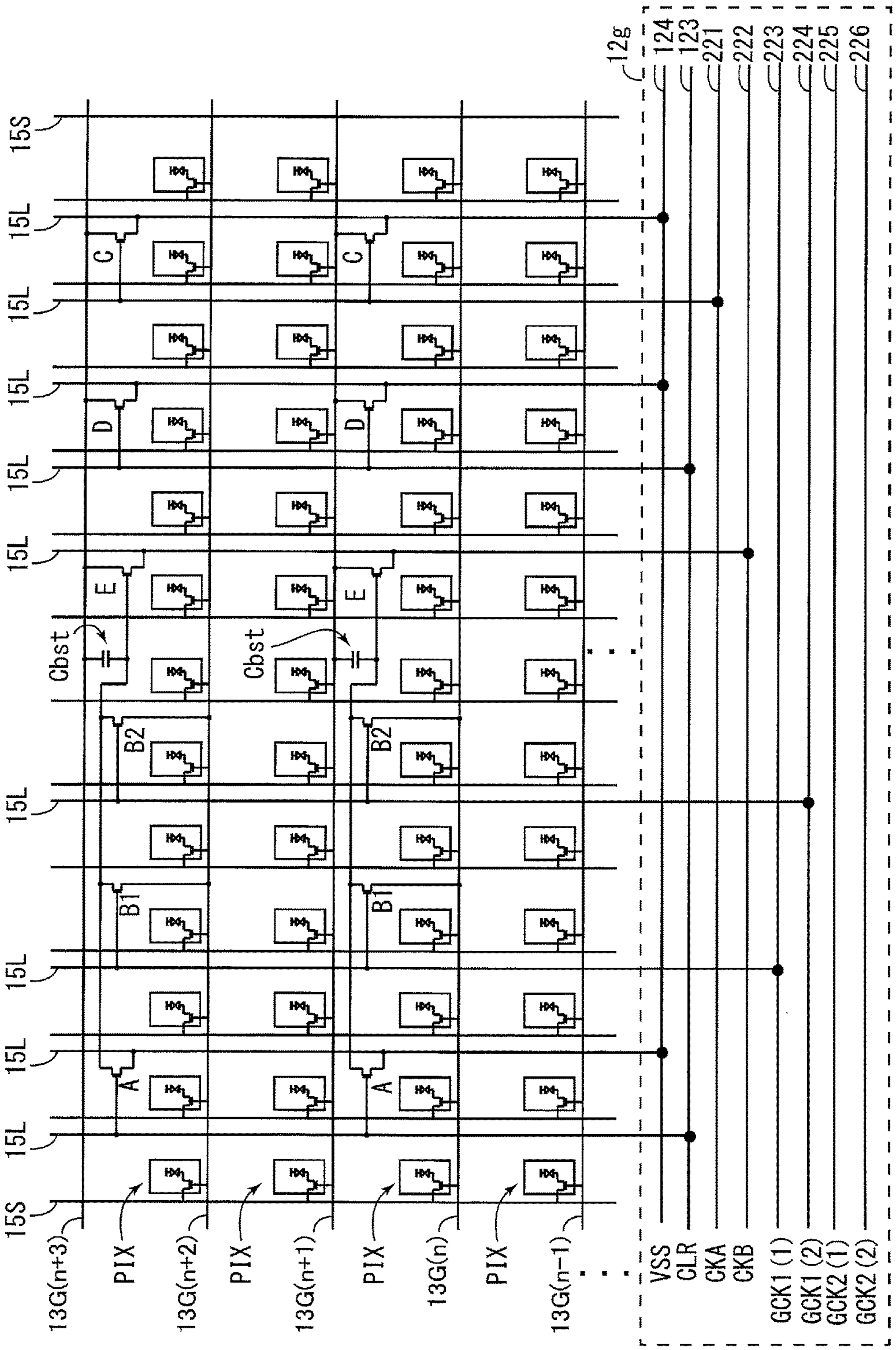
FIG. 22B is a schematic diagram illustrating an example of the arrangement and wiring of gate drivers illustrated in FIG. 21.

FIGS. 22A and 22B are each a schematic diagram illustrating an example of the arrangement of gate drivers 110 in the display region. Although "TFT-" is omitted in FIGS. 22A and 22B for the sake of convenience, A to E correspond to TFT-A to TFT-E in FIG. 21.

FIG. 22A illustrates an example of the arrangement of the respective gate drivers 110 (hereafter, gate drivers 110(*n*) and 110(*n*+2)) for driving the gate lines 13G(n) and 13G (n+2). FIG. 22B illustrates an example of the arrangement of the respective gate drivers 110 (hereafter, gate drivers 110 (*n*+1) and 110(*n*+3)) for driving the gate lines 13G(n+1) and 13G(n+3). In this embodiment, at least one gate driver 110 is provided to drive one gate line 13G, as illustrated in FIGS. 22A and 22B.

As illustrated in FIGS. 22A and 22B, the terminal unit 12*g* has lines 221 to 226, in addition to the line 124 supplied with the power supply voltage signal VSS and the line 123 supplied with the reset signal CLR.

The lines 221 and 222 are supplied respectively with the clock signals CKA and CKB illustrated in FIG. 5 from the display control circuit 4 (see FIG. 3). The lines 223 to 226 are supplied respectively with the control signals GCK1(1), GCK1(2), GCK2(1), and GCK2(2) from the display control circuit 4 (see FIG. 3). In detail, the lines 223 and 224 are supplied with the clock signal CKA illustrated in FIG. 5 or the operation stop signal whose potential is L level, and the lines 225 and 226 are supplied with the clock signal CKB illustrated in FIG. 5 or the operation stop signal whose potential is L level.

As illustrated in FIGS. 22A and 22B, the elements constituting one gate driver 110 are distributed between adjacent gate lines 13G. In FIG. 22A, the gate terminals of the TFT-B1 and B2 in each of the gate drivers 110(*n*) and 110(*n*+2) are supplied respectively with the control signals GCK2(1) and GCK2(2) via lines 15L. The gate terminal of the TFT-C in each of the gate drivers 110(*n*) and 110(*n*+2) is supplied with the clock signal CKB via a line 15L. The drain terminal of the TFT-E in each of these gate drivers is supplied with the clock signal CKA via a line 15L.

In FIG. 22B, the gate terminals of the TFT-B1 and B2 in each of the gate drivers 110(*n*+1) and 110(*n*+3) are supplied respectively with the control signals GCK1(1) and GCK1(2) via lines 15L. The gate terminal of the TFT-C in each of the gate drivers 110(*n*+1) and 110(*n*+3) is supplied with the clock signal CKA via a line 15L. The drain terminal of the TFT-E in each of these gate drivers is supplied with the clock signal CKB via a line 15L. Thus, each gate driver 110 is supplied with a clock signal opposite in phase to another gate driver 110 located in a row adjacent to the row in which the elements of the gate driver 110 are located.

Figure 23A:
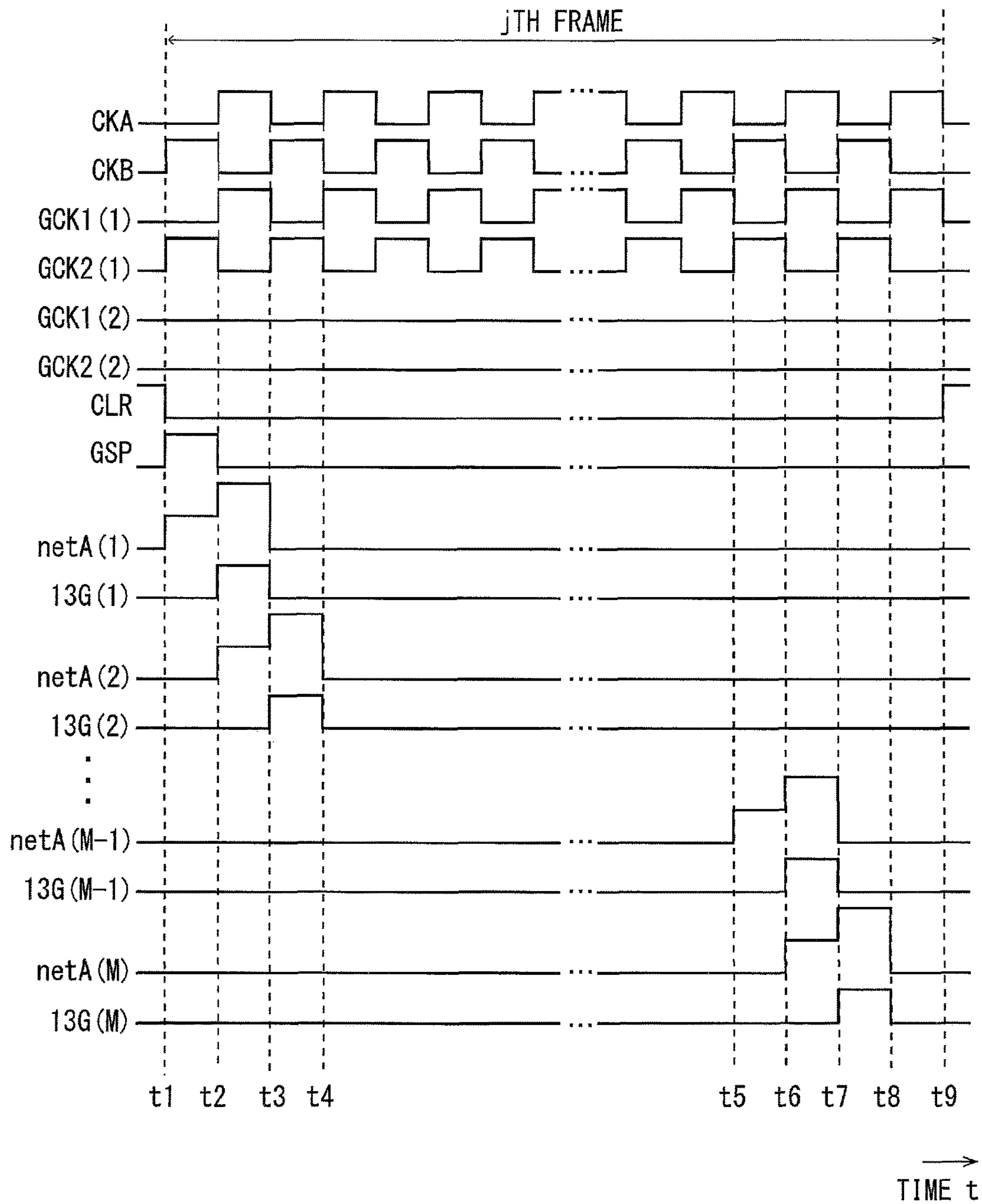
FIG. 23A is a timing chart illustrating the timings of driving gate lines by gate drivers in the fourth embodiment.
Figure 23B:
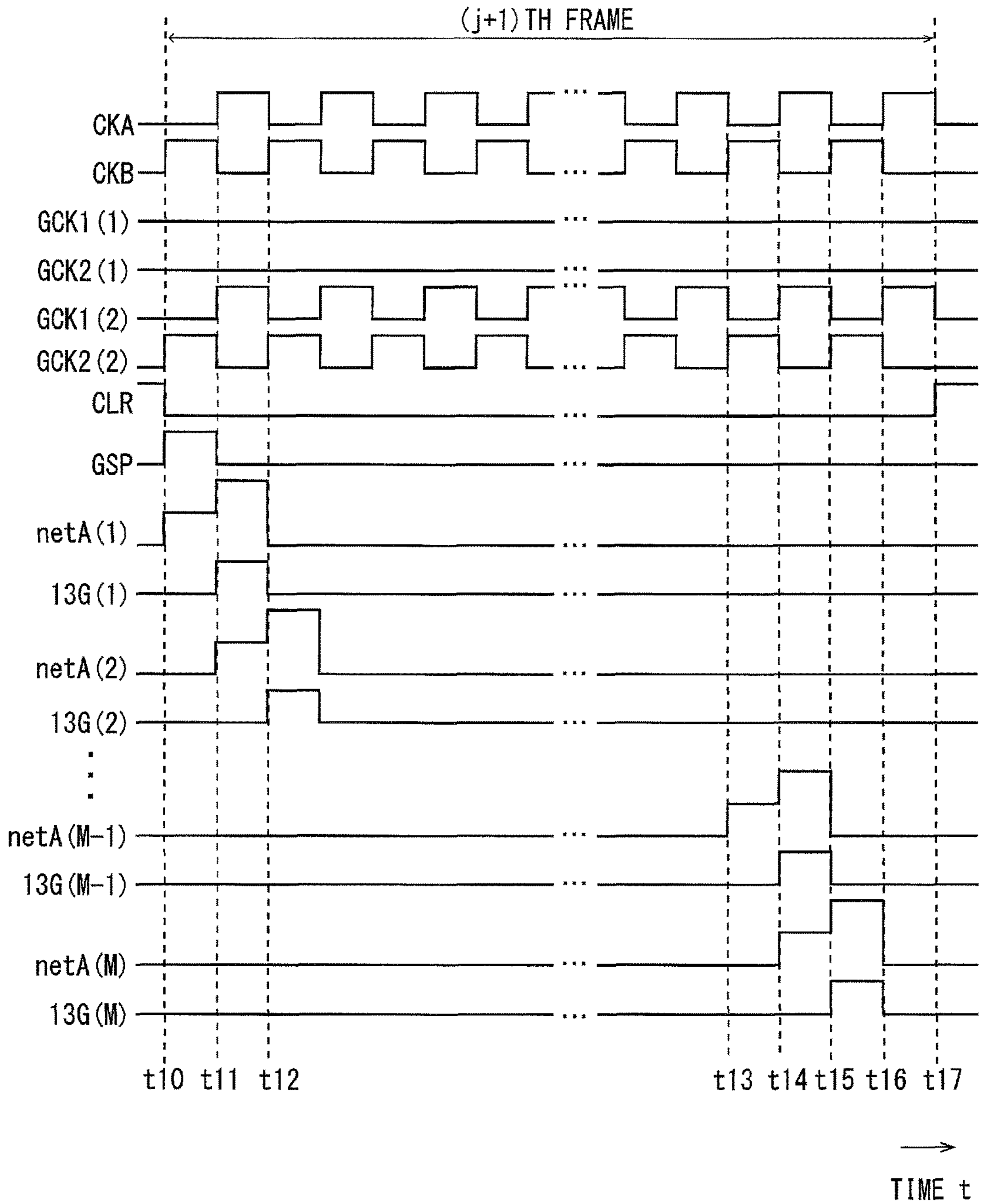
FIG. 23B is a timing chart illustrating the timings of driving gate lines by gate drivers in the fourth embodiment.

The following describes the method of driving each gate line 13G in this embodiment. FIGS. 23A and 23B are each a timing chart when driving the gate lines 13G by the gate drivers 110. In this embodiment, either one of the TFT-B1 and TFT-B2 and the other TFTs in each of the gate drivers 110 for driving the respective gate lines 13G(1) to 13G(M) are operated every frame to drive the gate line 13G. In other words, in this embodiment, the TFT-B1 and TFT-B2 in the gate driver 110 are operated alternately every frame, thus reducing the degradation of the TFT-B1 and TFT-B2.

As illustrated in FIG. 23A, at start time t1 of the jth frame, the display control circuit 4 (see FIG. 3) supplies the clock signals CKA and CKB as the control signals GCK1(1) and GCK2(1). The display control circuit 4 (see FIG. 3) also supplies the operation stop signal whose potential is L level as the control signals GCK1(2) and GCK2(2).

Thus, the TFT-C and TFT-E in each gate driver 110 for driving a different one of the gate lines 13G(1) to 13G(M) are supplied with the clock signals CKA and CKB, and the TFT-B1 is supplied with the clock signal CKB or CKA.

When the gate start pulse signal GSP is supplied from the display control circuit 4 to the drain terminal of the TFT-B1 in the gate driver 110 (hereafter, gate driver 110(1)) for driving the gate line 13G(1), the TFT-B1 in the gate driver 110(1) is turned on. As a result, the netA(1) in the gate driver 110(1) is precharged.

Next, at time t2, when the control signal GCK2(1) (CKB) transitions to L level and the control signal GCK1(1) (CKA) transitions to H level, the TFT-B1 in the gate driver 110(1) is turned off. Meanwhile, the H level potential of the clock signal CKA is supplied to the drain terminal of the TFT-E in the gate driver 11(1), and the netA(1) is charged to a potential higher than the H level potential of the clock signal CKA. Here, the TFT-C in the gate driver 110(1) is turned off, and the gate line 13G(1) is switched to the selected state. The H level potential of the gate line 13G(1) is then supplied to the drain terminal of the TFT-B1 in the gate driver 110 (hereafter, gate driver 110(2)) for driving the gate line 13G(2) as the set signal S. At time t2, the H level potential of the control signal GCK1(1) (CKA) is supplied to the gate terminal of the TFT-B1 in the gate driver 110(2). The netA(2) in the gate driver 110(2) is thus precharged.

Next, at time t3, the control signal GCK2(1) (CKB) transitions to H level, and the clock signal CKA transitions to L level. Hence, the H level potential of the control signal GCK2(1) (CKB) and the L level potential of the gate start pulse signal GSP are supplied respectively to the gate terminal and drain terminal of the TFT-B1 in the gate driver 110(1), and the netA(1) is charged to L level potential. Moreover, the TFT-C in the gate driver 110W is turned on, and the gate line 13G(1) is charged to L level potential and switched to the non-selected state. At time t3, the H level potential of the clock signal CKB is supplied to the drain terminal of the TFT-E in the gate driver 110(2). Moreover, the L level potential of the clock signal CKA is supplied to the gate terminal of the TFT-C in the gate driver 110(2). As a result, the netA(2) in the gate driver 110(2) is charged to a potential higher than the H level potential of the clock signal CKB, and the gate line 13G(2) is switched to the selected state. The H level potential of the gate line 13G(2) is then supplied to the drain terminal of the TFT-B1 in the gate driver 110 (hereafter, gate driver 110(3)) for driving the gate line 13G(3) as the set signal S. From time t4 to t8, the gate lines 13G(3) to 13G(M) are sequentially driven in the same way as above.

After the gate line 13G(M) is switched to the selected state, the display control circuit 4 (see FIG. 3) supplies the reset signal CLR to the line 123 from time t9 to start time t10 of the (j+1)th frame illustrated in FIG. 23B. As a result, the potentials of the netA in each gate driver 110 and the gate lines 13G(1) to 13G(M) transition to L level. At time t10, the display control circuit 4 supplies the operation stop signal whose potential is L level as the control signals GCK1(1) and GCK2(1). The display control circuit 4 also supplies the clock signals CKA and CKB as the control signals GCK1(2) and GCK2(2). The display control circuit 4 then supplies the gate start pulse signal GSP to the drain terminal of the TFT-B2 in the gate driver 110(1). As a result, the TFT-B2 in the gate driver 110(1) is turned on, and the netA(1) is precharged.

The same process as the jth frame described above is performed from time t10 onward except that the TFT-B2 is operated instead of the TFT-B1 in each gate driver 110, and so the detailed description of the operation from time t10 onward is omitted. In the (j+1)th frame, the clock signal CKA or CKB is supplied to the TFT-B2 and the operation stop signal whose potential is L level is supplied to the TFT-B1 in each gate driver 110. Thus, in the (j+1)th frame, the TFT-B2 in each gate driver 110 operates to sequentially drive the gate lines 13G(1) to 13G(M) from time t10 to t16.

Although the fourth embodiment describes an example where the TFT-B1 and TFT-B2 are connected in parallel in each gate driver 110 and the TFT-B1 and TFT-B2 in each gate driver 110 are operated alternately every frame, the TFT-C may be composed of a plurality of TFTs. The TFT-B and TFT-C in the gate driver 11 in the first embodiment are each likely to degrade because its duty ratio when turning on in one frame is 50%, which is higher than the other TFTs. Accordingly, each TFT whose duty ratio is not less than a predetermined value is composed of a plurality of TFTs connected in parallel, and these TFTs connected in parallel are operated alternately at predetermined time intervals. In this way, the duty ratio of each TFT in one gate driver is adjusted, with it being possible to reduce variations in TFT degradation.

Fifth Embodiment

In the foregoing fourth embodiment, a plurality of gate drivers 110 for driving one gate line 13G may be provided, with these gate drivers 110 for driving one gate line 13G being operated in turn at predetermined time intervals. The following describes this example, mainly focusing on the structure different from the fourth embodiment.

In this embodiment, each gate driver 110 for driving a different one of the gate lines 13G(1) to 13G(M) is provided in each of the regions 201*a* and 201*b* in the active-matrix substrate 20*a* illustrated in FIG. 3. A gate driver group located in the region 201*a* is hereafter referred to as a gate driver group 110A, and a gate driver group located in the region 201*b* as a gate driver group 110B.

Figure 24A:
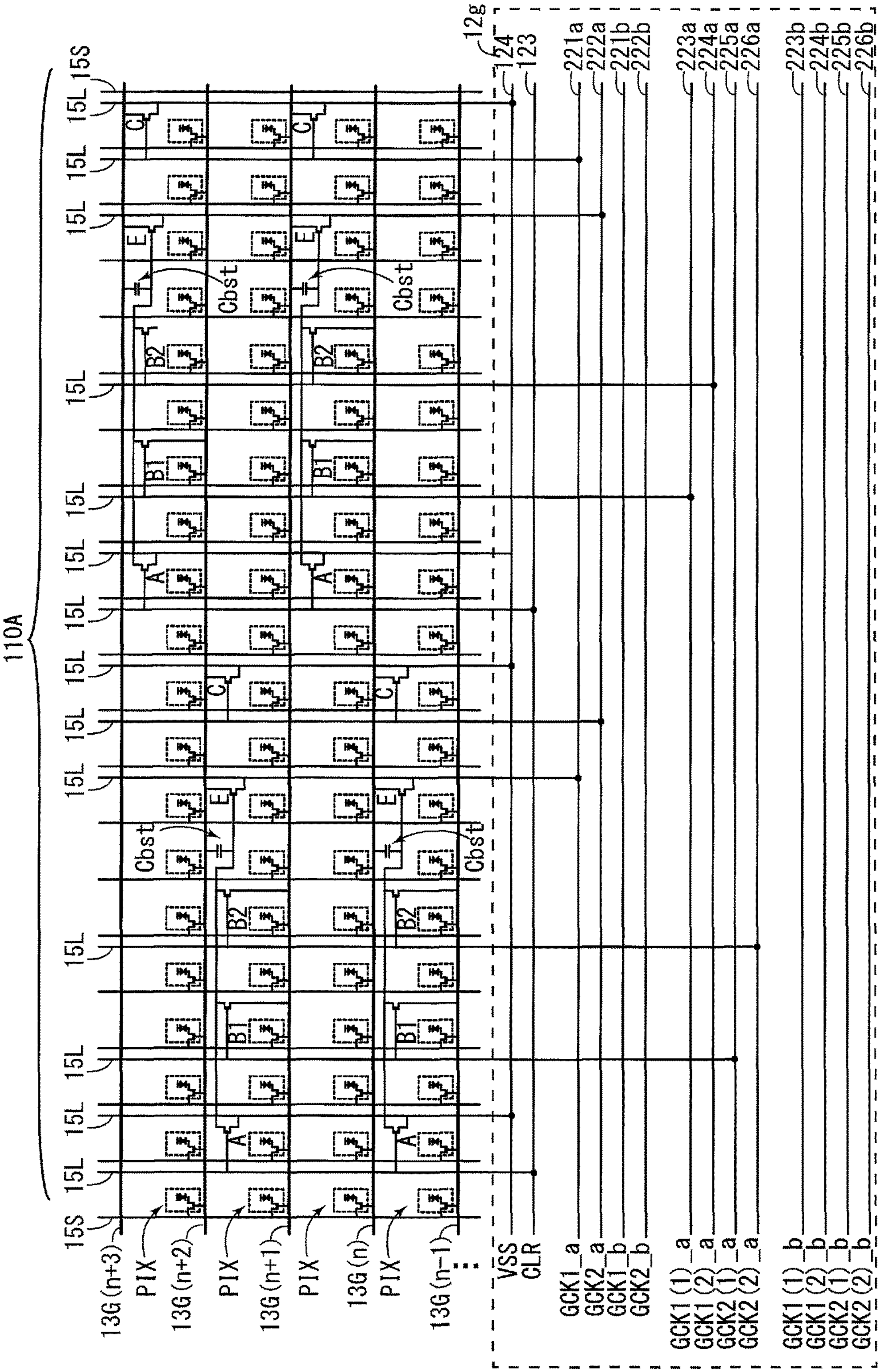
FIG. 24A is a schematic diagram illustrating an example of the arrangement and wiring of gate drivers in a display region in a fifth embodiment.
Figure 24B:
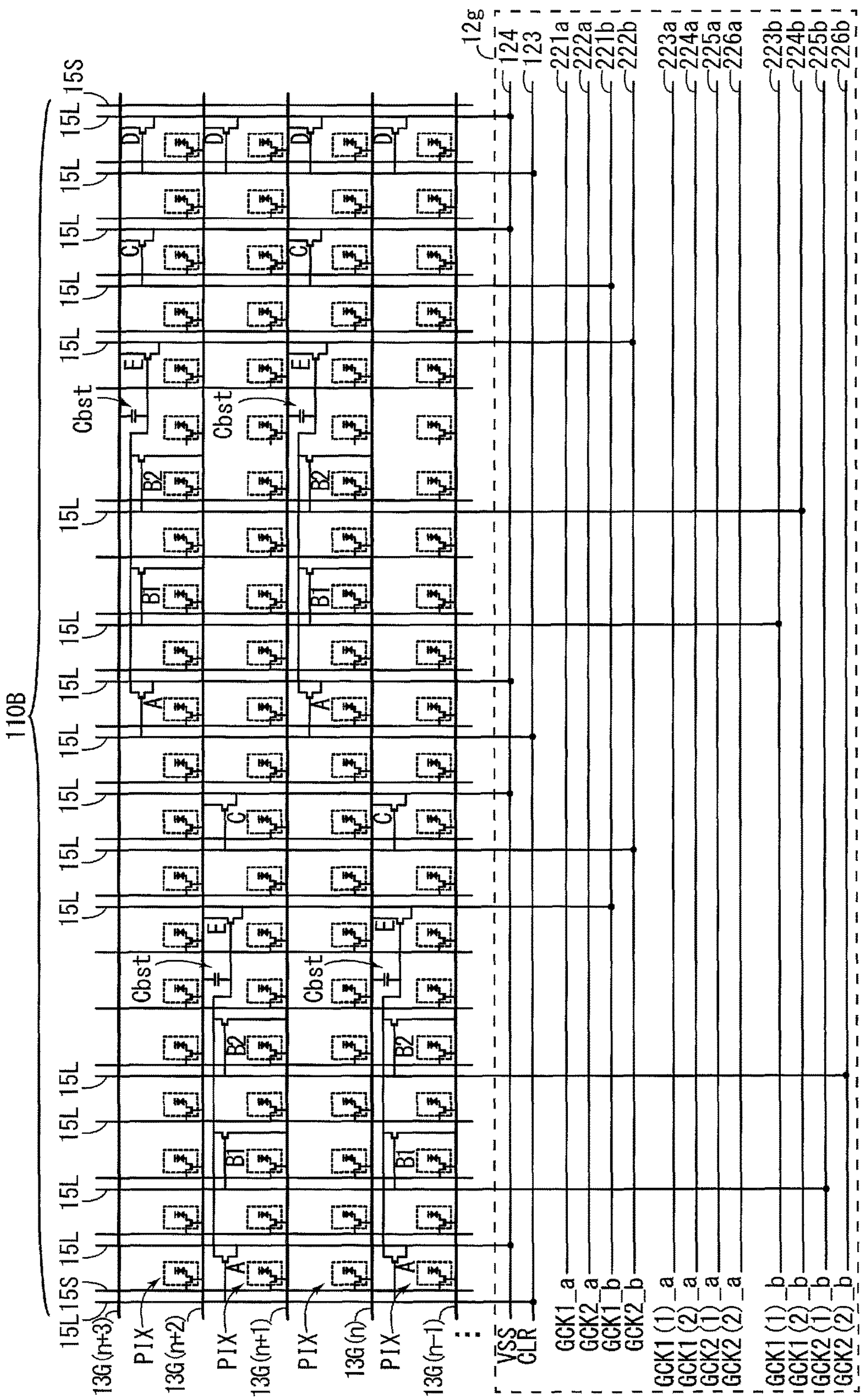
FIG. 24B is a schematic diagram illustrating an example of the arrangement and wiring of gate drivers in a display region in the fifth embodiment.

FIG. 24A is a diagram illustrating an example of the arrangement of the gate driver group 110A for driving the gate lines 13G(n−1) to 13G(n+3) and the structure of the terminal unit 12*g*. FIG. 24B is a diagram illustrating an example of the arrangement of the gate driver group 110B for driving the gate lines 13G(n−1) to 13G(n+3) and the structure of the terminal unit 12*g*. Although the TFT-D in each gate driver 110 in the gate driver group 110A and the TFT-D in each gate driver 110 in the gate driver group 110B are illustrated together in FIG. 24B for the sake of convenience, the TFT-D is actually situated in the region in which the corresponding gate driver group is provided.

As illustrated in FIGS. 24A and 24B, the terminal unit 12*g* has lines 221*a* to 226*a* and lines 221*b* to 226*b*, in addition to the lines 123 and 124. The lines 221*a* to 226*a* are connected to the gate driver group 110A via lines 15L. The lines 221*b* to 226*b* are connected to the gate driver group 110B via lines 15L.

The lines 221*a* and 221*b* are supplied with the clock signal CKA illustrated in FIG. 5 or the operation stop signal whose potential is L level from the display control circuit 4

(see FIG. 3), as the control signals GCK1_*a* and GCK1_*b*. The lines 222*a* and 222*b* are supplied with the clock signal CKB illustrated in FIG. 5 or the operation stop signal whose potential is L level from the display control circuit 4, as the control signals GCK2_*a* and GCK2_*b*. The clock signals CKA and CKB supplied to the lines 221*a* and 222*a* are hereafter referred to as clock signals CKA_a and CKB_a, and the clock signals CKA and CKB supplied to the lines 221*b* and 222*b* as clock signals CKA_b and CKB_b.

The lines 223*a* to 226*a* and the lines 223*b* to 226*b* are supplied with the control signals GCK1(1), GCK1(2), GCK2(1), and GCK2(2) from the display control circuit 4. In detail, the lines 223*a*, 224*a*, 223*b*, and 224*b* are supplied with the clock signal CKA illustrated in FIG. 5 or the operation stop signal whose potential is L level, and the lines 225*a*, 226*a*, 225*b*, and 226*b* are supplied with the clock signal CKB illustrated in FIG. 5 or the operation stop signal whose potential is L level. The control signals supplied to the lines 223*a* to 226*a* are hereafter referred to as control signals GCK1(1)_a, GCK1(2)_a, GCK2(1)_a, and GCK2(2)_a, and the control signals supplied to the lines 223*b* to 226*b* as control signals GCK1(1)_b, GCK1(2)_b, GCK 2(1)_b, and GCK2(2)_b.

Thus, the gate terminal of the TFT-B1 in each gate driver 110 in the gate driver group 110A is supplied with one of the control signals GCK1(1)_a and GCK2(1)_a, and the gate terminal of the TFT-B2 is supplied with one of the control signals GCK1(2)_a and GCK2(2)_a. Moreover, the drain terminal of the TFT-E and the gate terminal of the TFT-C in each gate driver 110 in the gate driver group 110A are supplied with the control signal GCK1_*a* or GCK2_*a*.

The gate terminal of the TFT-B1 in each gate driver 110 in the gate driver group 110B is supplied with one of the control signals GCK1(1)_b and GCK2(1)_b, and the gate terminal of the TFT-B2 is supplied with one of the control signals GCK1(2)_b and GCK2(2)_b. Moreover, the drain terminal of the TFT-E and the gate terminal of the TFT-C in each gate driver 110 in the gate driver group 110B are supplied with the control signal GCK1_*b* or GCK2_*b*.

Figure 25A:
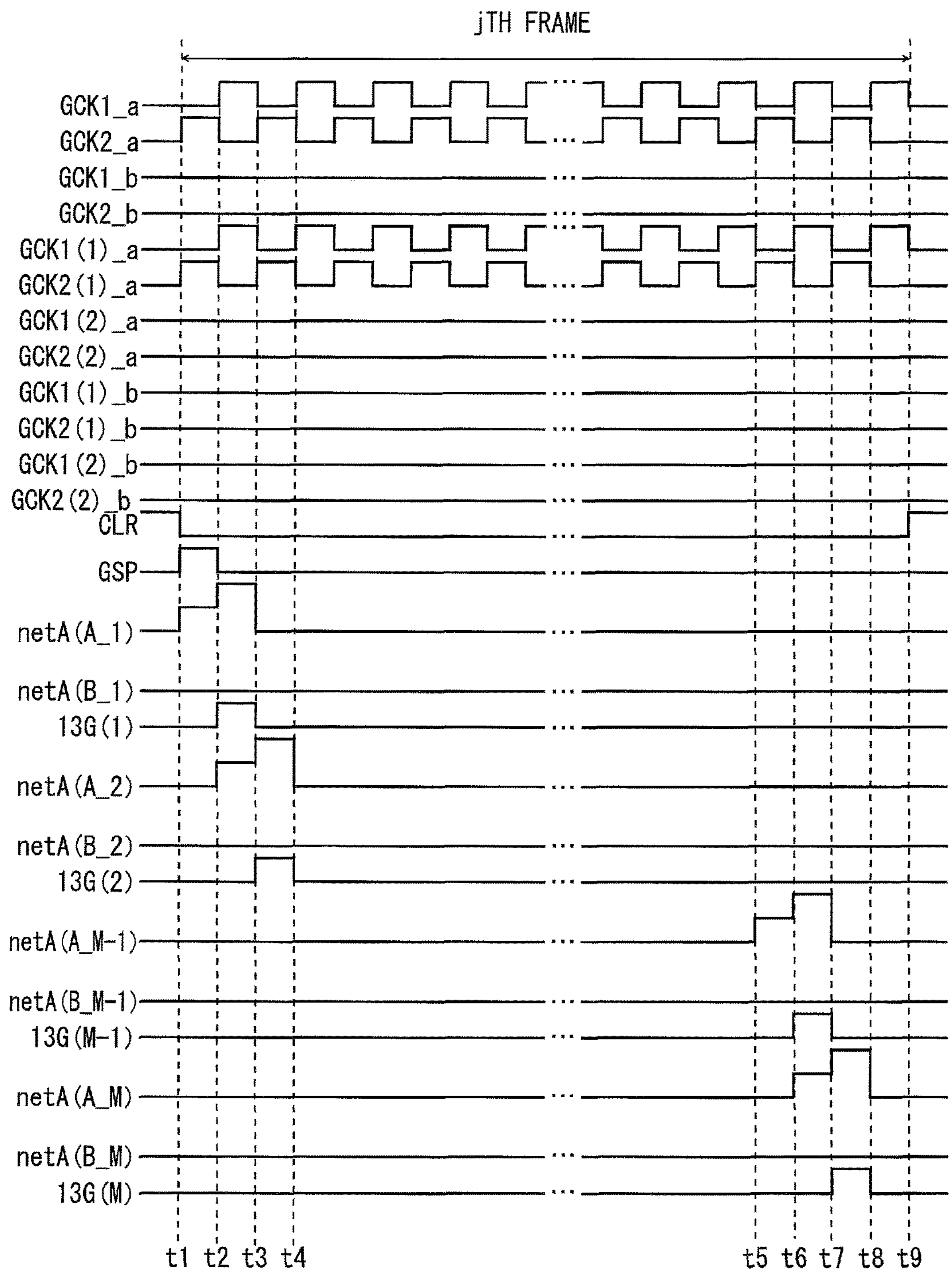
FIG. 25A is a timing chart illustrating the timings of driving gate lines by gate drivers in the fifth embodiment.

The following describes the method of driving each gate line 130 in this embodiment. FIGS. 25A to 25D are each a timing chart when driving the gate lines 130(1) to 130(M). As illustrated in FIG. 25A, at start time t1 of the jth frame, the display control circuit 4 (see FIG. 3) supplies the clock signals CKA and CKB as the control signals GCK1_*a* and GCK2_*a* and the control signals GCK1(1)_a and GCK 2(1)_a. At time t1, the display control circuit 4 also supplies the operation stop signal whose potential is L level as the control signals GCK1_*b*, GCK2_*b*, GCK1(2)_a, GCK 2(2)_a, GCK1(1)_b, GCK2(1)_b, GCK1(2)_b, and GCK2 (2)_b. At time t1, the display control circuit 4 further supplies the gate start pulse signal GSP to the drain terminal of the TFT-B1 in the gate driver 110(1) (hereafter, gate driver 110(A_1)) in the gate driver group 110A.

As a result, each gate driver 110 in the gate driver group 110B and the TFT-B2 in each gate driver 110 in the gate driver group 110A stop operation in the j-th frame. The clock signals CKA and CKB are supplied to each gate driver 110 in the gate driver group 110A, and the gate start pulse signal GSP is supplied to the drain terminal of the TFT-B1 in the gate driver 110(A_1). As a result, the netA(A_1) in the gate driver 110(A_1) is precharged. From time t2 to t8, the gate lines 130(1) to 130(M) are sequentially driven according to the operations of the TFT-B1, TFT-E, and TFT-C in each gate driver 110 in the gate driver group 110A, as in the foregoing fourth embodiment.

After the gate line 130(M) is switched to the selected state in the jth frame, the display control circuit 4 (see FIG. 3) supplies the reset signal CLR to the gate driver groups 110A and 110B at time t9. As a result, the netA in each gate driver 110 in each of the gate driver groups 110A and 110B and the gate lines 13G(1) to 13G(M) are charged to L level.

Figure 25B:
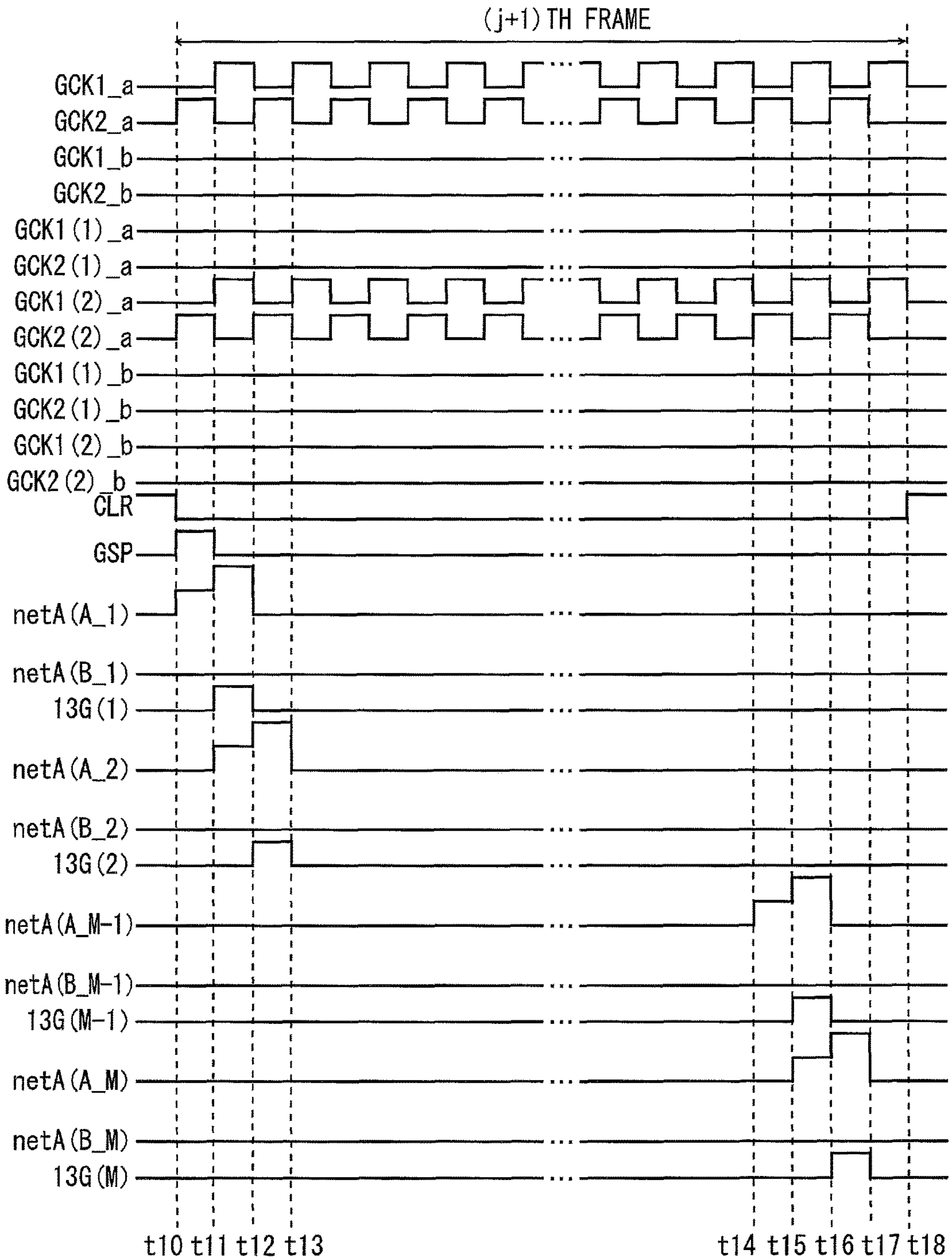
FIG. 25B is a timing chart illustrating the timings of driving gate lines by gate drivers in the fifth embodiment.

As illustrated in FIG. 25B, at start time t10 of the (j+1)th frame, the display control circuit 4 (see FIG. 3) supplies the clock signals CKA and CKB as the control signals GCK1_*a* and GCK2_*a* and the control signals GCK1(2)_a and GCK2 (2)_a. At time t10, the display control circuit 4 also supplies the operation stop signal whose potential is L level as the control signals GCK1_*b*, GCK2_*b*, GCK1(1)_a, GCK 2(1)_a, GCK1(1)_b, GCK2(1)_b, GCK1(2)_b, and GCK2 (2)_b. At time t10, the display control circuit 4 further supplies the gate start pulse signal GSP to the drain terminal of the TFT-B2 in the gate driver 110(A_1).

As a result, each gate driver 110 in the gate driver group 110B and the TFT-B1 in each gate driver 110 in the gate driver group 110A stop operation in the (j+1)th frame. The clock signals CKA and CKB are supplied to each gate driver 110 in the gate driver group 110A. When the gate start pulse signal GSP is supplied to the drain terminal of the TFT-B2 in the gate driver 110(A_1), the netA(A_1) in the gate driver 110(A_1) is precharged.

From time t11 to t17, the gate lines 13G(1) to 13G(M) are sequentially driven according to the operations of the TFT-B2, TFT-E, and TFT-C in each gate driver 110 in the gate driver group 110A, as in the foregoing fourth embodiment.

After the gate line 13G(M) is switched to the selected state in the (j+1)th frame, the display control circuit 4 (see FIG. 3) supplies the reset signal CLR to the gate driver groups 110A and 110B at time t18. As a result, the netA in each gate driver 110 in each of the gate driver groups 110A and 110B and the gate lines 13G(1) to 13G(M) are charged to L level.

Figure 25C:
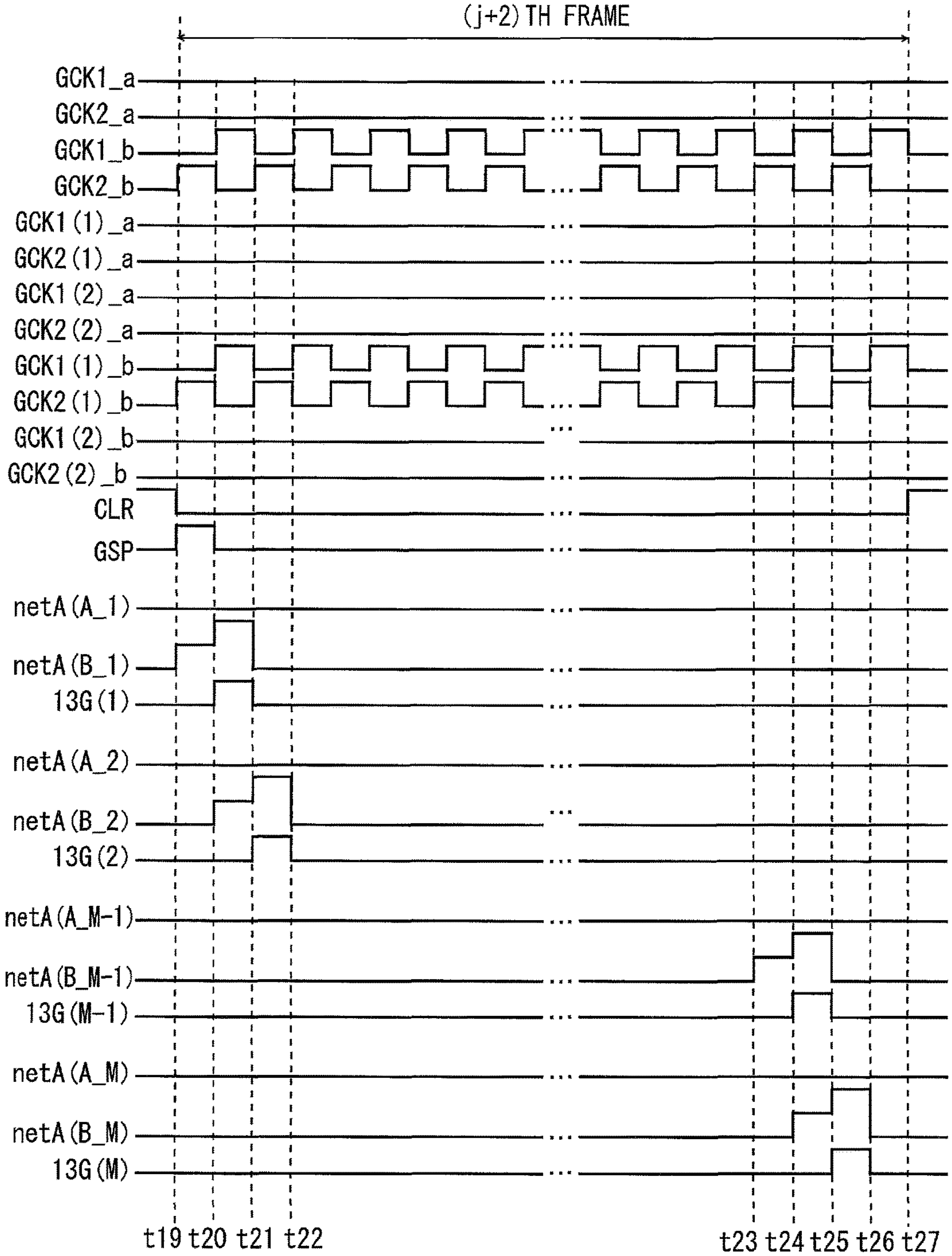
FIG. 25C is a timing chart illustrating the timings of driving gate lines by gate drivers in the fifth embodiment.

As illustrated in FIG. 25C, at start time t19 of the (j+2)th frame, the display control circuit 4 (see FIG. 3) supplies the operation stop signal whose potential is L level as the control signals GCK1_*a* and GCK2_*a*. The display control circuit 4 (see FIG. 3) also supplies the clock signals CKA and CKB as the control signals GCK1_*b* and GCK2_*b*. The display control circuit 4 also supplies the clock signals CKA and CKB as the control signals GCK1(1)_b and GCK2(1)_b. The display control circuit 4 (see FIG. 3) also supplies the operation stop signal whose potential is L level as the control signals GCK1(1)_a, GCK2(1)_a, GCK1(2)_a, GCK2(2)_a, GCK1(2)_b, and GCK2(2)_b. At time t19, the display control circuit 4 further supplies the gate start pulse signal GSP to the drain terminal of the TFT-B1 in the gate driver 110(1) (hereafter, gate driver 110(B_1)) in the gate driver group 110B.

As a result, the gate driver group 110A and the TFT-B2 in each gate driver 110 in the gate driver group 110B stop operation in the (j+2)th frame. The clock signals CKA and CKB are supplied to each gate driver 110 in the gate driver group 110B. When the gate start pulse signal GSP is supplied to the drain terminal of the TFT-B1 in the gate driver 110(B_1), the netA(B_1) in the gate driver 110(B_1) is precharged. From time t19 to t26, the gate lines 13G(1) to 13G(M) are sequentially driven according to the operations of the TFT-B1, TFT-E, and TFT-C in each gate driver 110 in the gate driver group 110B, as in the foregoing fourth embodiment.

After the gate line 13G(M) is switched to the selected state in the (j+2)th frame, the display control circuit 4 (see FIG. 3) supplies the reset signal CLR to the gate driver groups 110A and 110B at time t27. As a result, the netA in each gate driver 110 in the gate driver groups 110A and 110B and the gate lines 13G(1) to 13G(M) are charged to L level.

Figure 25D:
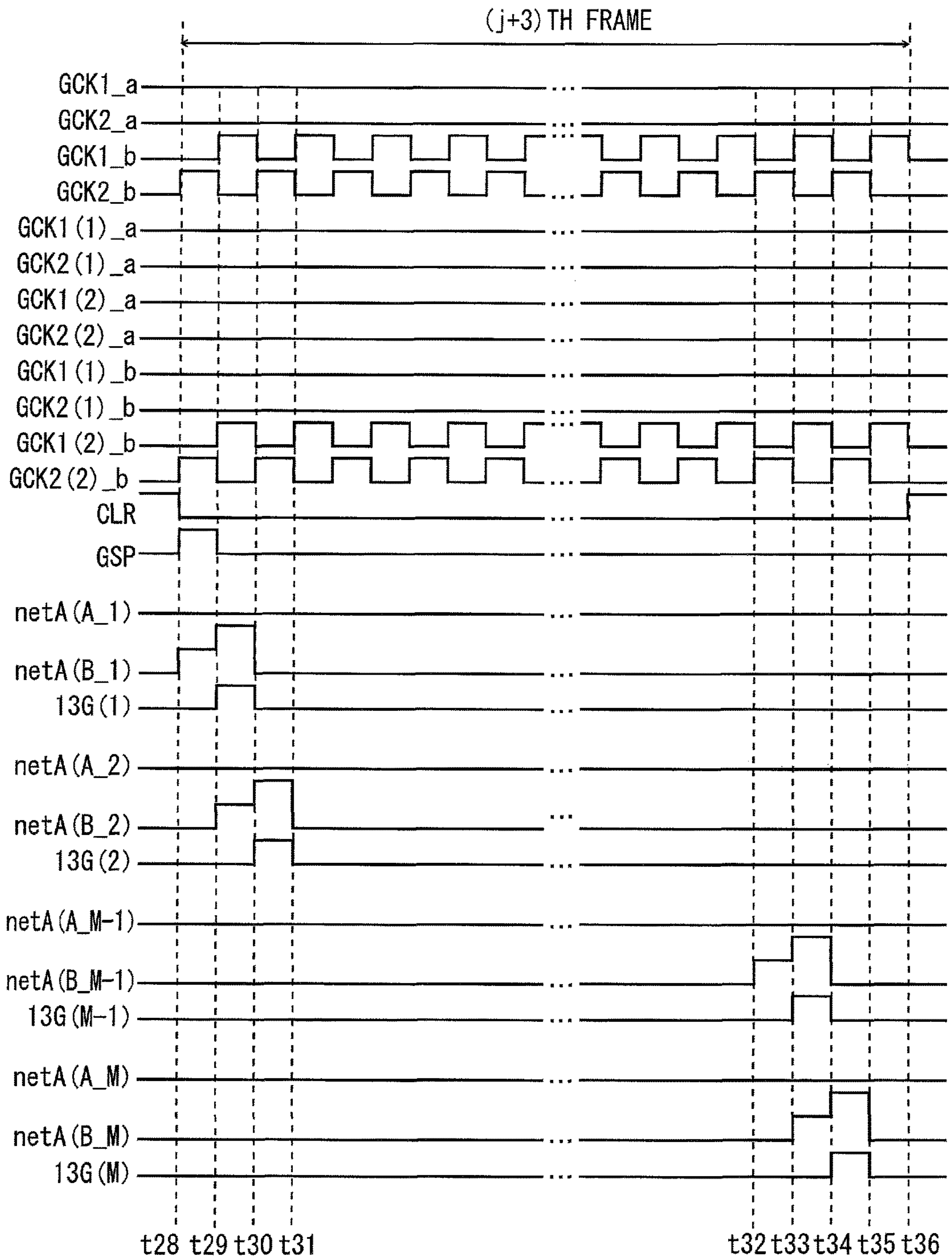
FIG. 25D is a timing chart illustrating the timings of driving gate lines by gate drivers in the fifth embodiment.

As illustrated in FIG. 25D, at start time t28 of the (j+3)th frame, the display control circuit 4 (see FIG. 3) supplies the operation stop signal whose potential is L level as the control signals GCK1_*a* and GCK2_*a*. The display control circuit 4 (see FIG. 3) also supplies the clock signals CKA and CKB as the control signals GCK1_*b* and GCK2_*b*. The display control circuit 4 also supplies the clock signals CKA and CKB as the control signals GCK1(2)_b and GCK2(2)_b. The display control circuit 4 (see FIG. 3) also supplies the operation stop signal whose potential is L level as the control signals GCK1(1)_a, GCK2(1)_a, GCK1(2)_a, GCK2(2)_a, GCK1(1)_b, and GCK2(1)_b. At time t28, the display control circuit 4 further supplies the gate start pulse signal GSP to the drain terminal of the TFT-B2 in the gate driver 110(B_1).

As a result, the gate driver group 110A and the TFT-B1 in each gate driver 110 in the gate driver group 110B stop operation in the (j+3)th frame. The clock signals CKA and CKB are supplied to each gate driver 110 in the gate driver group 110B. When the gate start pulse signal GSP is supplied to the drain terminal of the TFT-B2 in the gate driver 110(B_1), the netA(B_1) in the gate driver 110(B_1) is precharged. From time t28 to t35, the gate lines 13G(1) to 13G(M) are sequentially driven according to the operations of the TFT-B2, TFT-E, and TFT-C in each gate driver 110 in the gate driver group 110B, as in the foregoing fourth embodiment.

In the fifth embodiment described above, any of the gate drivers 110 for driving one gate line 13G is operated and also the TFT-B1 and TFT-B2 connected in parallel in the gate driver 110 to be operated are operated alternately, at predetermined time intervals. This decreases the duty ratio of the TFT in each gate driver 110 as compared with the fourth embodiment, and thus reduces TFT degradation.

Sixth Embodiment

In the foregoing first embodiment, there is a possibility that, when driving the gate line 13G, the potential of the gate line 13G enters the gate driver which has stopped operation and causes the gate driver to malfunction. This embodiment prevents the stopped gate driver from malfunctioning due to noise caused by driving the gate line 13G.

Figure 26:
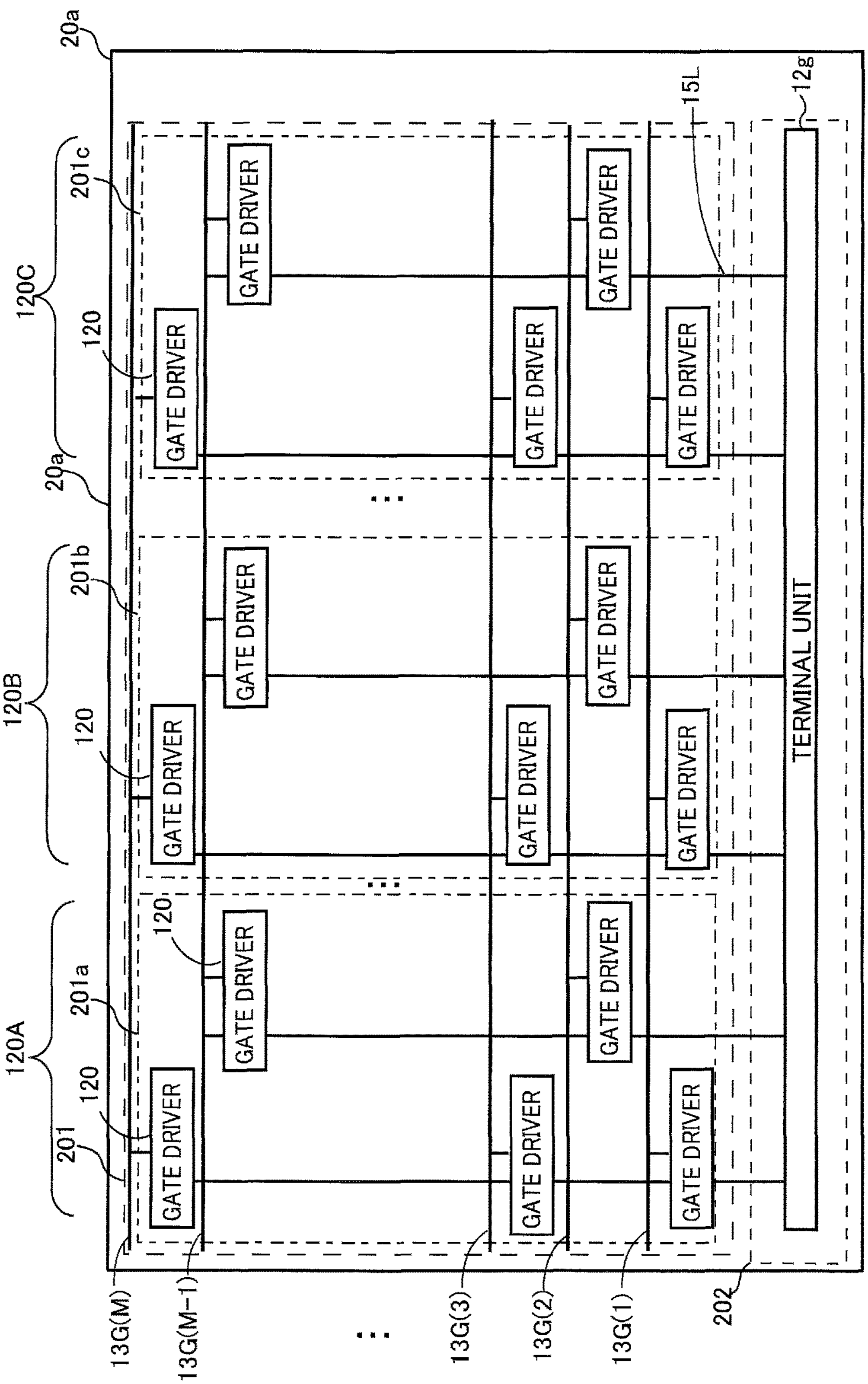
FIG. 26 is a schematic diagram illustrating the structure of an active-matrix substrate in a sixth embodiment.

FIG. 26 is a schematic diagram illustrating the active-matrix substrate 20*a* in which gate drivers are arranged in this embodiment. The source lines 15S and the terminal unit 12*s* are omitted in the illustrated example. The structure different from the first embodiment is described below.

As illustrated in FIG. 26, gate drivers 120 for driving the gate lines 13G(1) to 13G(M) are arranged in each of the regions 201*a*, 201*b*, and 201*c* in this embodiment. A gate driver group made up of the gate drivers 120 in the region 201*a* is hereafter referred to as a gate driver group 120A, a gate driver group made up of the gate drivers 120 in the region 201*b* as a gate driver group 120B, and a gate driver group made up of the gate drivers 120 in the region 201*c* as a gate driver group 120C.

Figure 27:
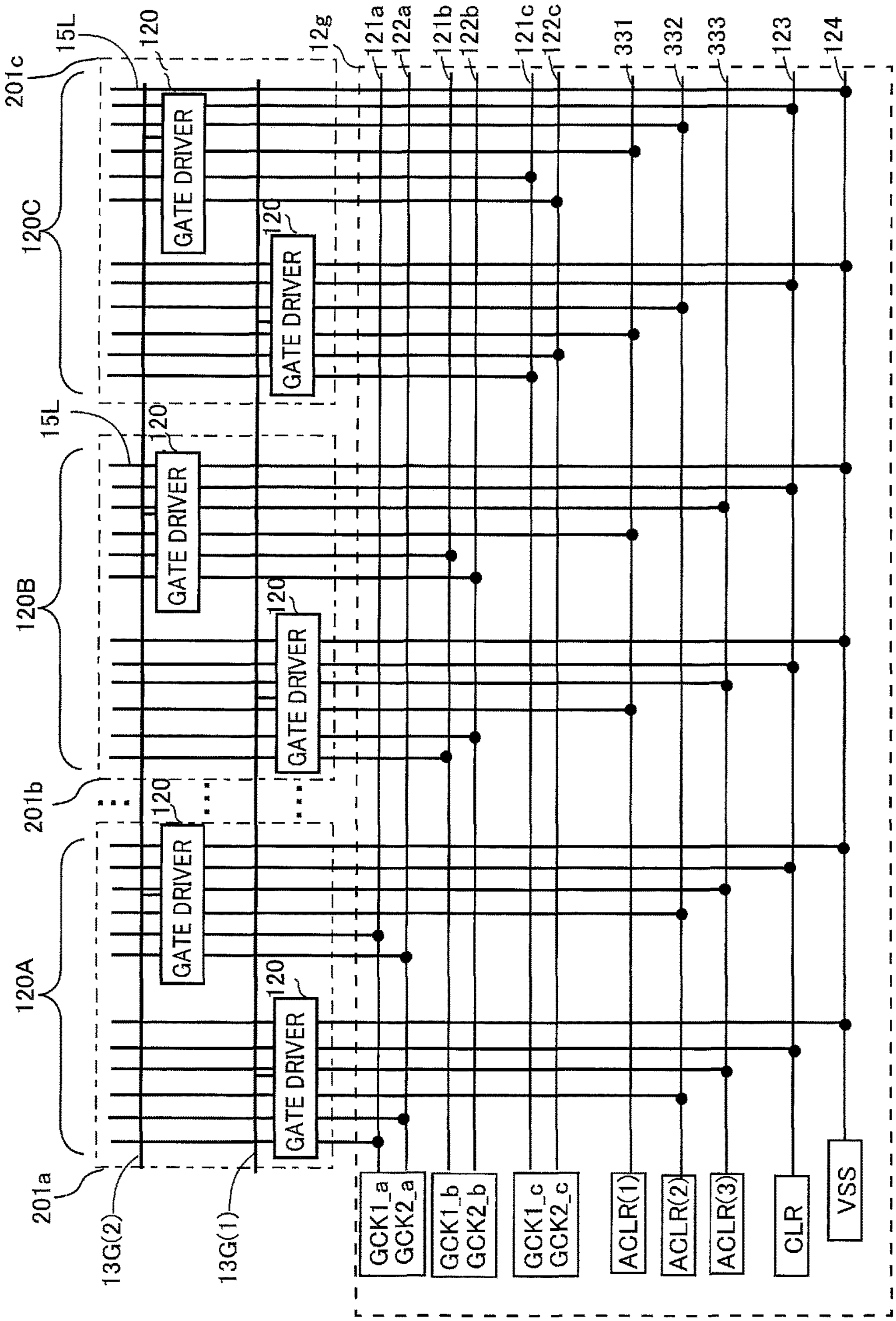
FIG. 27 is a schematic diagram illustrating an example of the structure of a terminal unit in the active-matrix substrate illustrated in FIG. 26.

FIG. 27 is a schematic diagram illustrating an example of the structure of the terminal unit 12*g* illustrated in FIG. 26. The terminal unit 12*g* is connected to the display control circuit 4 and the power supply 5 (see FIG. 3) as in the first embodiment, although not illustrated in FIG. 27. As illustrated in FIG. 27, the terminal unit 12*g* has the lines 123 and 124, the lines 121*a* and 122*a* for respectively supplying the control signals GCK1_*a* and GCK2_*a*, the lines 121*b* and 122*b* for respectively supplying the control signals GCK1_*b* and GCK2_*b*, and the lines 121*c* and 122*c* for respectively supplying the control signals GCK1_*c* and GCK2_*c*. The terminal unit 12*g* also has lines 331 to 333 for respectively supplying control signals ACLR(1) to ACLR(3).

The control signals GCK1_*a*, GCK2_*a*, GCK1_*b*, GCK2_*b*, GCK1_*c*, and GCK2_*c* and the control signals ACLR(1) to ACLR(3) are supplied to the respective lines by the display control circuit 4 (see FIG. 3). In the following description, in the case of not distinguishing the control signals ACLR(1) to ACLR(3) from each other, these control signals are referred to as control signals ACLR.

The gate driver group 120A is connected to the lines 121*a* and 122*a* and the lines 332 and 333 via lines 15L. The gate driver group 120B is connected to the lines 121*b* and 122*b* and the lines 331 and 333 via lines 15L. The gate driver group 120C is connected to the lines 121*c* and 122*c* and the lines 331 and 332 via lines 15L.

The lines 121*c* and 122*c* are supplied with the clock signals CKA and CKB illustrated in FIG. 5 or the operation stop signal whose potential is L level as the control signals GCK1_*c* and GCK2_*c*, as with the aforementioned control signals GCK1 and GCK2.

The control signals ACLR(1) to ACLR(3) are each a control signal indicating L level potential or H level potential. In detail, the control signal ACLR(1) is a signal that has H level potential in the operating period of the gate driver group 120A and L level potential in the non-operating period of the gate driver group 120A. The control signal ACLR(2) is a signal that has H level potential in the operating period of the gate driver group 120B and L level potential in the non-operating period of the gate driver group 120B. The control signal ACLR(3) is a signal that has H level potential in the operating period of the gate driver group 120C and L level potential in the non-operating period of the gate driver group 120C.

Figure 28:
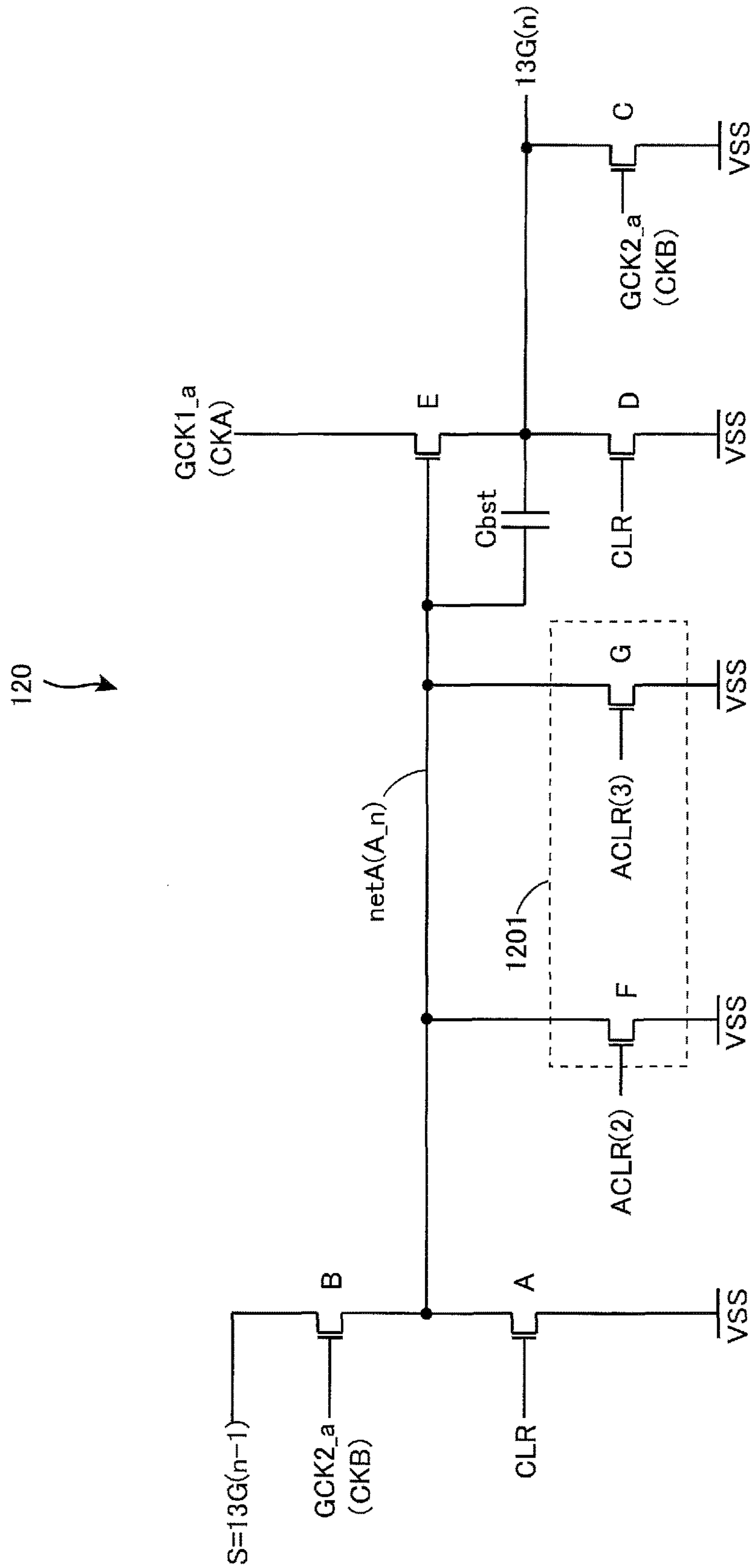
FIG. 28 is a diagram illustrating an example of an equivalent circuit of a gate driver in the sixth embodiment.

The following describes the structure of each gate driver 120. FIG. 28 is a diagram illustrating an equivalent circuit of the gate driver 120 in the gate driver group 120A. The gate driver 120 (hereafter, gate driver 120(A_n)) for driving the gate line 13G(n) in the gate driver group 120A is illustrated in this example.

As illustrated in FIG. 28, the gate driver 120(A_n) includes a circuit unit 1201 connected to the netA (hereafter, netA(A_n)) in the gate driver 120, in addition to the elements of the gate driver 11 illustrated in FIG. 6.

The circuit unit 1201 includes TFTs designated as F and G (hereafter, TFT-F and TFT-G). The TFT-F has a drain terminal connected to the netA(A_n), a gate terminal supplied with the control signal ACLR(2), and a source terminal supplied with the power supply voltage signal VSS. The TFT-G has a drain terminal connected to the netA(A_n), a gate terminal supplied with the control signal ACLR(3), and a source terminal supplied with the power supply voltage signal VSS.

In the case of the gate driver 11 in the first embodiment, when the gate line 13G(n) is switched to the selected state by another gate driver 11, an increase in potential of the gate line 13G(n) causes the potential of the netA(A_n) to be upthrusted via the capacitor Cbst. The L level potential of the clock signal supplied to the drain terminal of the TFT-E is then supplied to the gate line 13G(n). In this embodiment, the circuit unit 1201 is connected to the netA(A_n), and the control signal ACLR of H level is supplied to the circuit unit 1201 in the non-operating period of the gate driver 120 (A_n). In the non-operating period of the gate driver 120

(A_n), one of the TFT-F and TFT-G in the circuit unit 1201 is on, and the netA(A_n) is controlled to the power supply voltage VSS (L level). Accordingly, the L level potential of the clock signal supplied to the drain terminal of the TFT-E in the gate driver 120(A_n) is kept from being supplied to the gate line 13G(n) in the non-operating period of the gate driver 120(A_n), and so the gate driver 120(A_n) is prevented from malfunctioning.

Figure 29A:
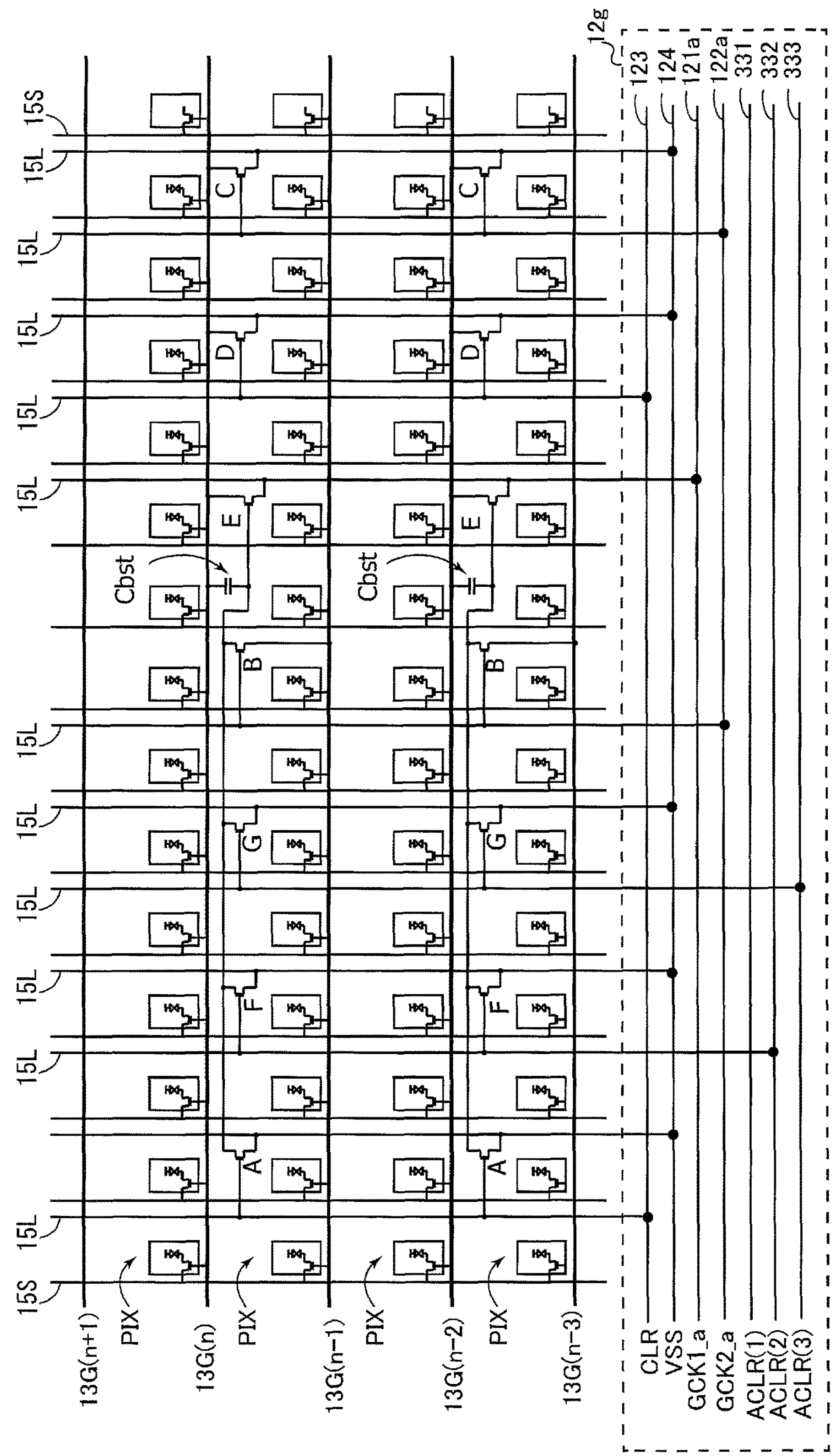
FIG. 29A is a schematic diagram illustrating an example of the arrangement and wiring of gate drivers illustrated in FIG. 28 in a display region.
Figure 29B:
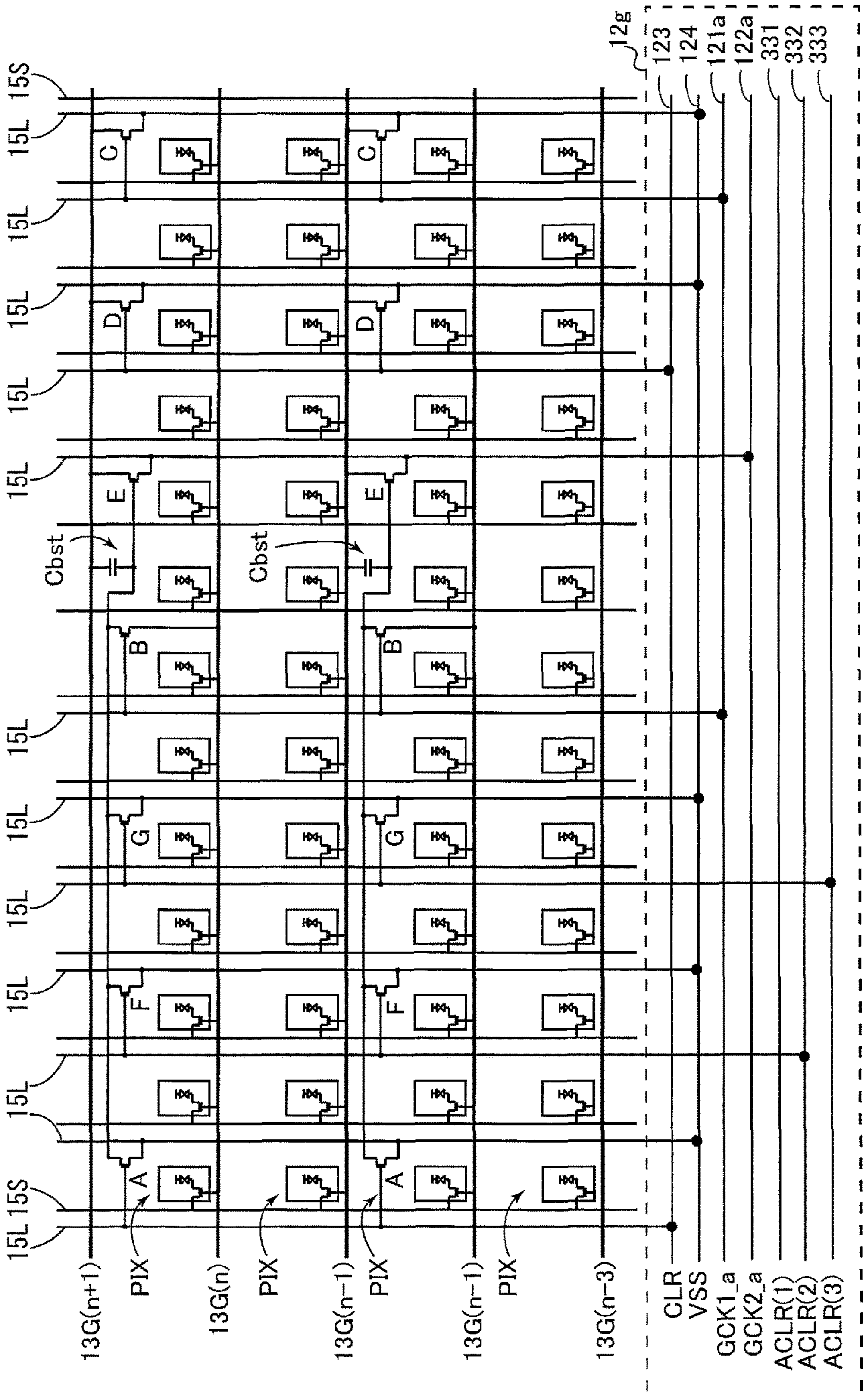
FIG. 29B is a schematic diagram illustrating an example of the arrangement and wiring of gate drivers illustrated in FIG. 28 in a display region.

FIGS. 29A and 29B are each a schematic diagram illustrating an example of the arrangement of the gate driver group 120A in the display region. Although only the alphabet letters A to G are shown without "TFT-" in FIGS. 29A and 29B for the sake of convenience, A to G correspond to TFT-A to TFT-G in FIG. 28. FIG. 29A illustrates an example of the arrangement of the gate drivers 120 for driving the gate lines 13G(n−2) and 13G(n). FIG. 29B illustrates an example of the arrangement of the gate drivers 120 for driving the gate lines 13G(n−1) and 13G(n+3).

As illustrated in FIG. 29A, the gate terminals of the TFT-B and TFT-C in each of the respective gate drivers 120 for driving the gate lines 13G(n−2) and 13G(n) are supplied with the control signal GCK2_*a*, and the drain terminal of the TFT-E in each of these gate drivers 120 is supplied with the control signal GCK1_*a*. As illustrated in FIG. 29B, the gate terminals of the TFT-B and TFT-C in each of the respective gate drivers 120 for driving the gate lines 13G (n−1) and 13G(n+3) are supplied with the control signal GCK1_*a*, and the drain terminal of the TFT-E in each of these gate drivers 120 is supplied with the control signal GCK2_*a*. The gate terminals of the TFT-F and TFT-G in each gate driver 120 in the gate driver group 120A illustrated in each of FIGS. 29A and 29B are supplied respectively with the control signals ACLR(2) and ACLR(3).

The arrangement of each of the gate driver groups 120B and 120C is the same as that of the gate driver group 120A, but the control signals supplied to the circuit unit 1201 are different. In detail, the gate terminals of the TFT-F and TFT-G in each gate driver 120 in the gate driver group 120B are supplied respectively with the control signals ACLR(1) and ACLR(3), and the gate terminals of the TFT-F and TFT-G in each gate driver 120 in the gate driver group 120C are supplied respectively with the control signals ACLR(1) and ACLR(2).

Figure 30:
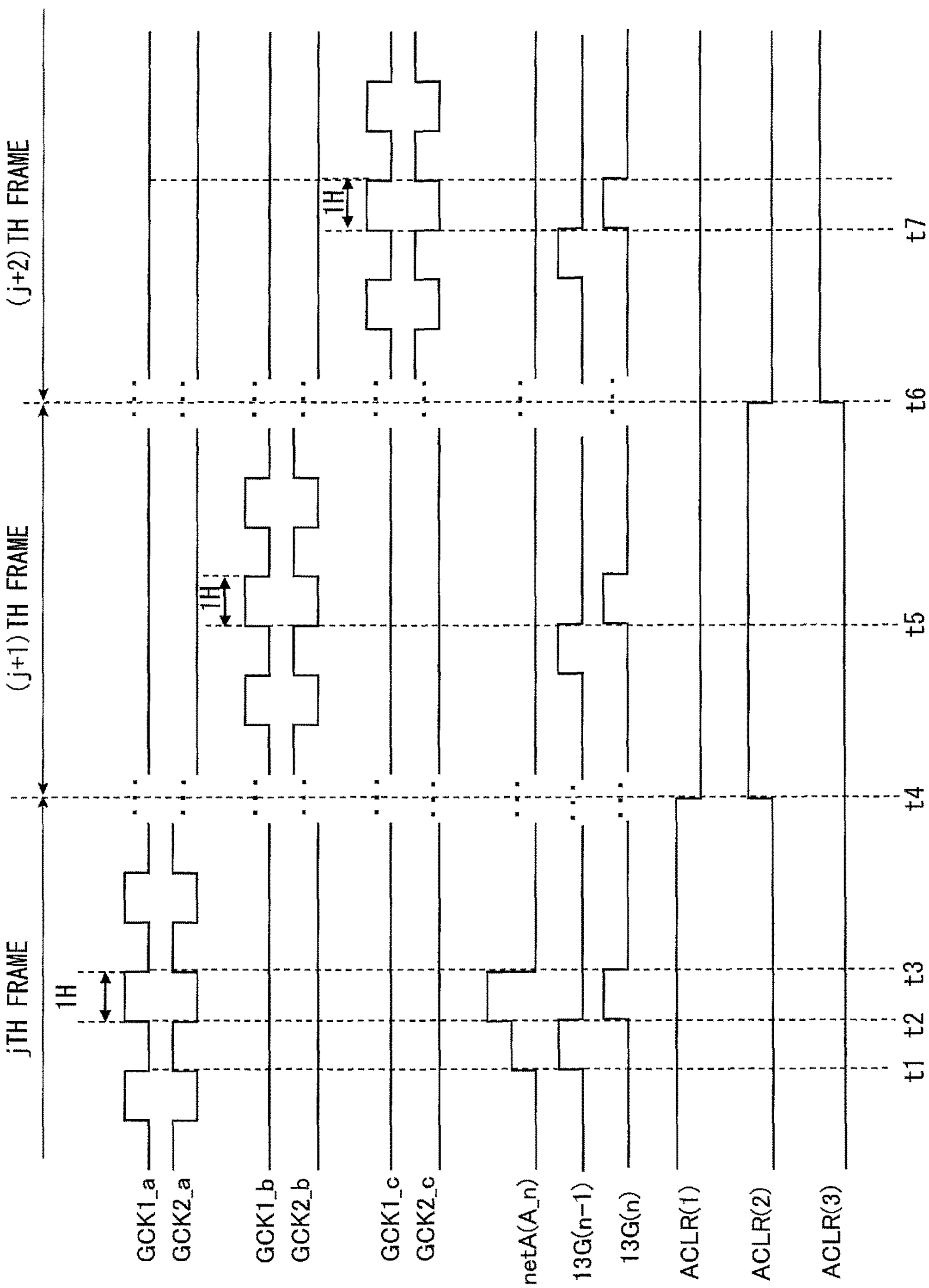
FIG. 30 is a timing chart illustrating the timings of driving gate lines by gate drivers in the sixth embodiment.

The following describes the method of driving each gate line 13G. FIG. 30 is a timing chart illustrating the timing of driving the gate line 13G(n) in this embodiment. In this example, the gate driver groups 120A to 120C are operated one by one in this order every frame, to sequentially drive the gate lines 13G(1) to 13G(M). An example of the operation of the gate driver 120(A_n) is described below.

During the j-th frame in FIG. 30, the display control circuit 4 (see FIG. 3) supplies the clock signals CKA and CKB as the control signals GCK1_*a* and GCK2_*a*. The display control circuit 4 (see FIG. 3) also supplies the operation stop signal whose potential is L level as the control signals GCK1_*b* and GCK2_*b* and the control signals GCK1_*c* and GCK2_*c*. The display control circuit 4 further supplies the control signal ACLR(1) of H level and the control signals ACLR(2) and ACLR(3) of L level.

As a result, each gate driver 120 in the gate driver groups 120B and 120C stops operation. The TFT-B, TFT-C, and TFT-E in each gate driver 120 in the gate driver group 120A operate in response to the supplied clock signals CKA and CKB, and the TFT-F and TFT-G operate in response to the supplied control signals ACLR(2) and ACLR(3).

At time t1 in the jth frame, the H level potential of the gate line 13G(n−1) is supplied to the drain terminal of the TFT-B in the gate driver 120(A_n), and the H level potential of the control signal GCK2_*a* (CKB) is supplied to the gate terminal of the TFT-B. Moreover, the L level potential of the control signal GCK1_*a* (CKA) is supplied to the drain terminal of the TFT-E in the gate driver 120(A_n), and the H level potential of the control signal GCK2_*a* (CKB) is supplied to the gate terminal of the TFT-C. Further, the L level potentials of the control signals ACLR(2) and ACLR (3) are supplied to the gate terminals of the TFT-F and TFT-G in the gate driver 120(A_n). As a result, the TFT-B and TFT-C are turned on and the TFT-F and TFT-G are turned off, and the netA(A_n) of the gate driver 120(A_n) is precharged.

At time t2, the L level potential of the control signal GCK2_*a* (CKB) is supplied to the gate terminals of the TFT-B and TFT-C in the gate driver 120(A_n). Moreover, the H level potential of the control signal GCK1_*a* (CKA) is supplied to the drain terminal of the TFT-E in the gate driver 120(A_n). Further, the L level potentials of the control signals ACLR(2) and ACLR(3) are supplied to the gate terminals of the TFT-F and TFT-G in the gate driver 120 (A_n). As a result, the TFT-B and TFT-C are turned off, and the TFT-F and TFT-G are turned off. The netA(A_n) increases to a potential higher than the H level potential of the control signal GCK1_*a* (CKA), and the gate line 13G(n) is switched to the selected state.

From time t3 onward, the gate lines 13G are sequentially driven by the gate drivers 120 in the gate driver group 120A in the same way as above.

After the jth frame, at start time t4 of the (j+1)th frame, the display control circuit 4 (see FIG. 3) supplies the operation stop signal whose potential is L level as the control signals GCK1_*a* and GCK2_*a* and the control signals GCK1_*c* and GCK2_*c*. The display control circuit 4 (see FIG. 3) also supplies the clock signals CKA and CKB as the control signals GCK1_*b* and GCK2_*b*. The display control circuit 4 further supplies the control signals ACLR(1) and ACLR(3) of L level and the control signal ACLR(2) of H level.

As a result, each gate driver 120 in the gate driver groups 120A and 120C stops operation, and each gate driver 120 in the gate driver group 120B operates to drive the gate line 13G. As illustrated in FIG. 30, the control signal ACLR(2) of H level is supplied to the TFT-F in the gate driver 120(A_n) during the (j+1)th frame, and so the TFT-F is on. Hence, when the gate line 13G(n) is switched to the selected state at time t5 in the (j+1)th frame, the potential of the netA(A_n) is controlled to the power supply voltage VSS (L level).

After the (j+1)th frame, at start time t6 of the (j+2)th frame, the display control circuit 4 (see FIG. 3) supplies the operation stop signal whose potential is L level as the control signals GCK1_*a* and GCK2_*a* and the control signals GCK1_*b* and GCK2_*b*. The display control circuit 4 (see FIG. 3) also supplies the clock signals CKA and CKB as the control signals GCK1_*c* and GCK2_*c*. The display control circuit 4 further supplies the control signals ACLR(1) and ACLR(2) of L level and the control signal ACLR(of H level.

As a result, each gate driver 120 in the gate driver groups 120A and 120B stops operation, and each gate driver 120 in the gate driver group 120C operates to drive the gate line 13G. As illustrated in FIG. 30, the control signal ACLR(3) of H level is supplied to the TFT-G in the gate driver 120(A_n) during the (j+2)th frame, and so the TFT-G is on. Hence, when the gate line 13G(n) is switched to the selected state at time t7 in the (j+2)th frame, the potential of the netA(A_n) is controlled to the power supply voltage VSS (L level).

In the sixth embodiment described above, the control signals ACLR are supplied to the TFT-F and TFT-G in the gate driver 120 so that the TFT-F and TFT-G are both off in the operating period of the gate driver 120 and one of the TFT-F and TFT-G is on in the non-operating period of the gate driver 120. Accordingly, the netA is controlled to L level in the non-operating period of the gate driver 120, so that the L level potential of the clock signal supplied to the drain terminal of the TFT-E is kept from being supplied to the gate line 13G.

Application 1 of Sixth Embodiment

The sixth embodiment describes an example where the TFT-F and TFT-G whose source terminals are grounded to the power supply voltage VSS are provided in the gate driver 120 as the circuit unit 1201 for controlling the potential of the netA to L level. Alternatively, the circuit unit 1201 may have the following structure.

Figure 31:
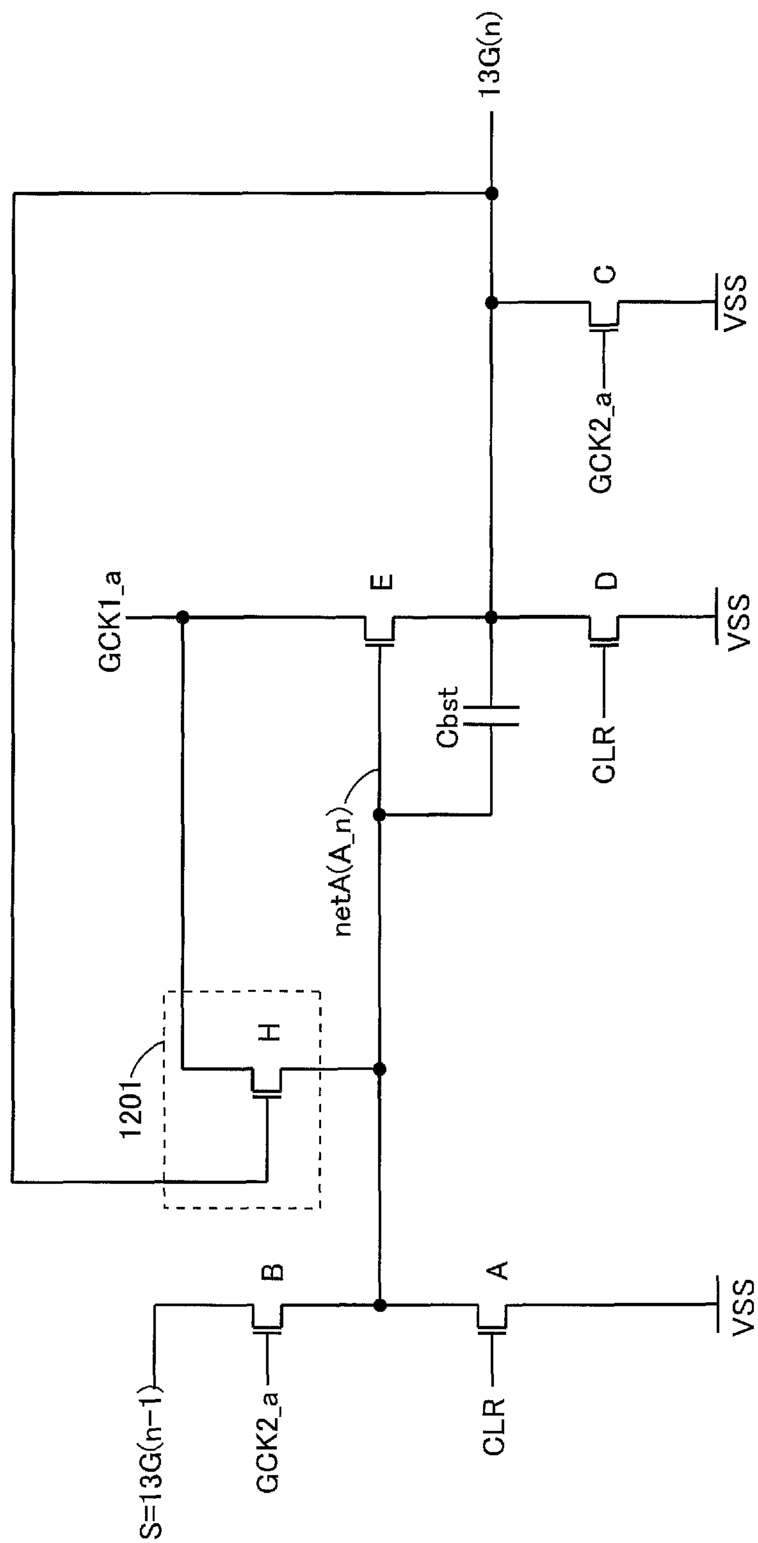
FIG. 31 is a diagram illustrating an example of an equivalent circuit of a gate driver in Application 1 of the sixth embodiment.

FIG. 31 is a diagram illustrating an equivalent circuit of the gate driver 120(A_n) in this embodiment. As illustrated in FIG. 31, the circuit unit 1201 in the gate driver 120(A_n) only includes a TFT designated as H (hereafter, TFT-H). The TFT-H has a gate terminal connected to the gate line 13G(n), a source terminal connected to the netA(A_n), and a drain terminal connected to the drain terminal of the TFT-E and supplied with the control signal GCK1.

Figure 32A:
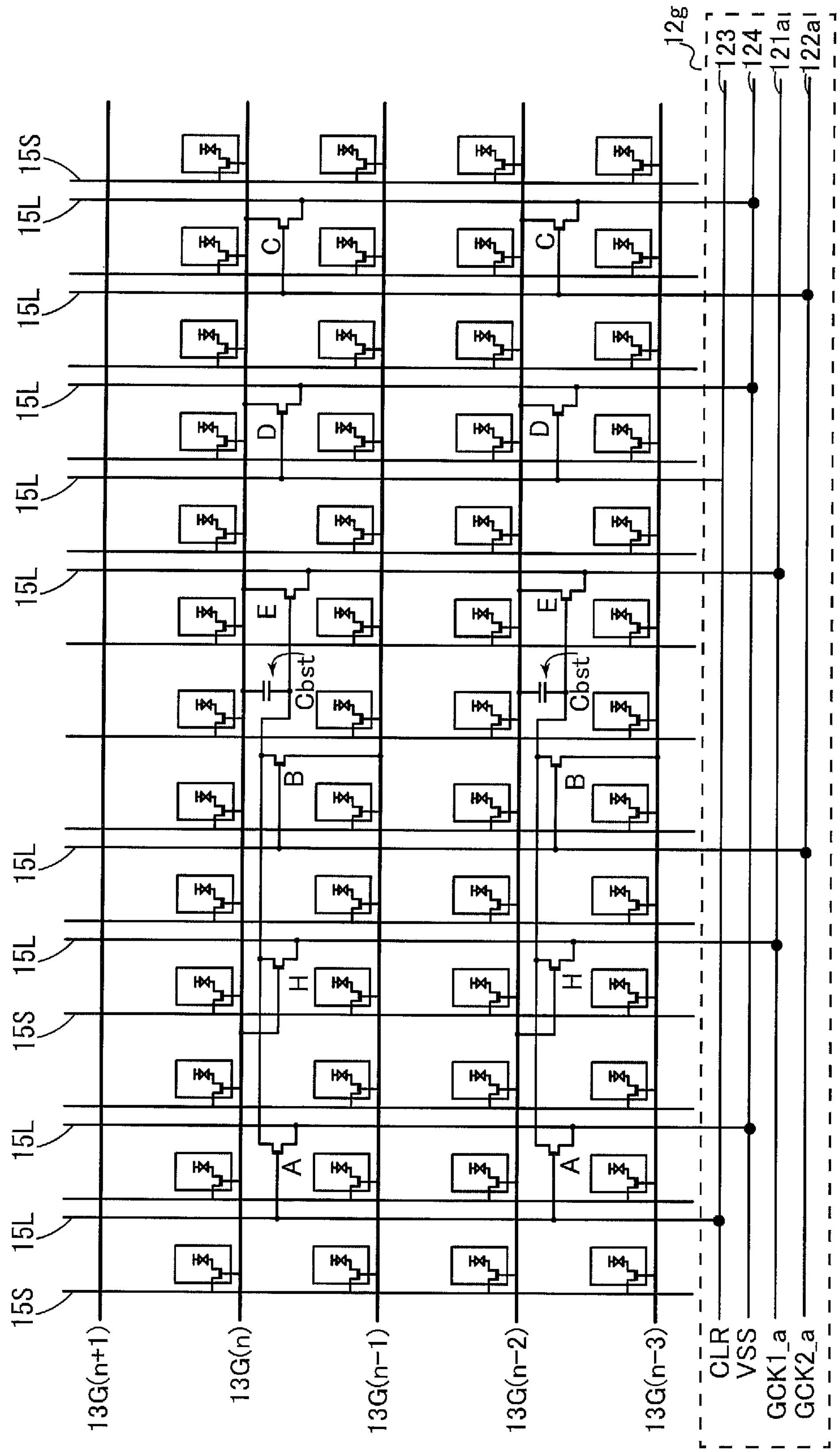
FIG. 32A is a schematic diagram illustrating an example of the arrangement and wiring of gate drivers illustrated in FIG. 31 in a display region.
Figure 32B:
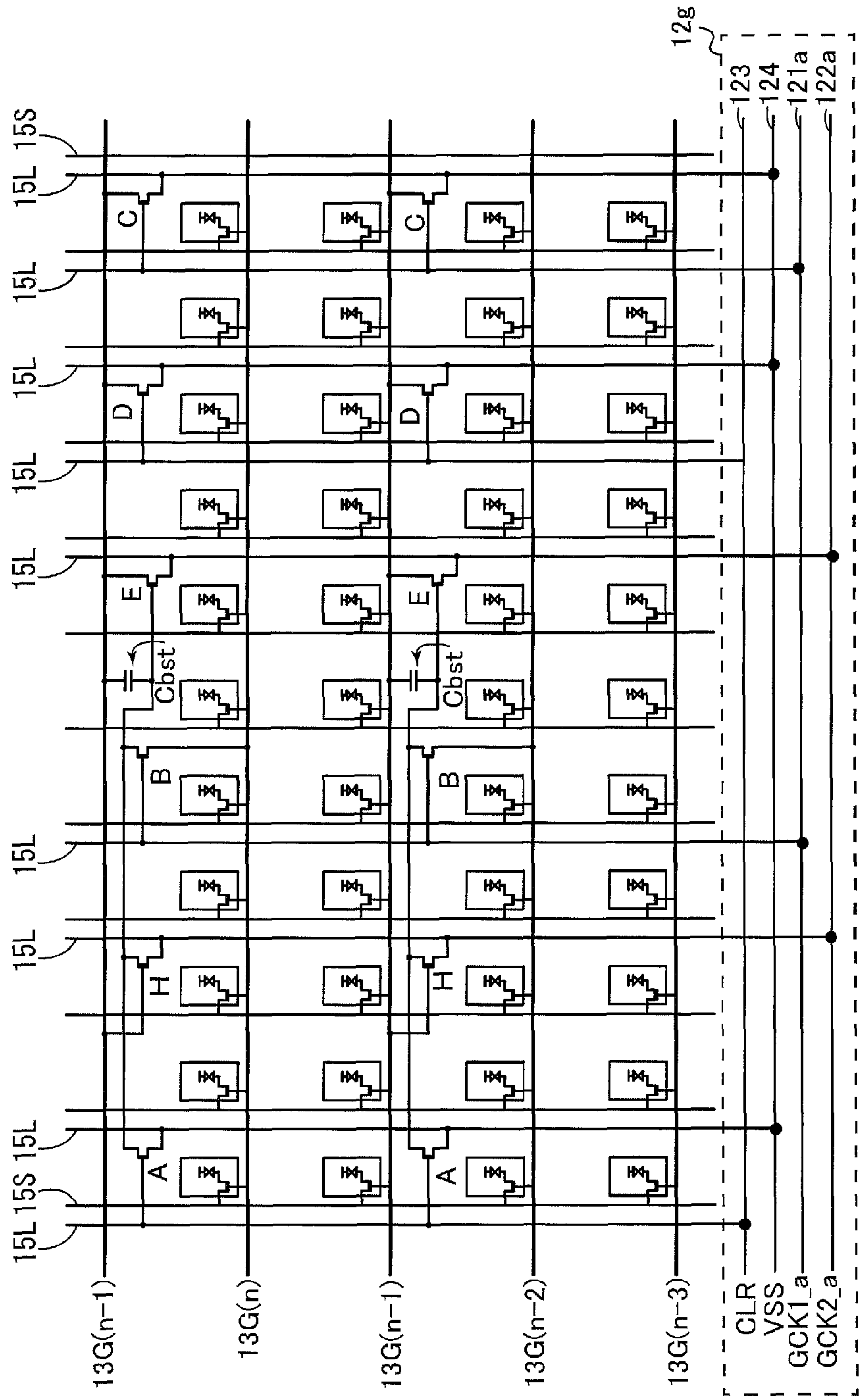
FIG. 32B is a schematic diagram illustrating an example of the arrangement and wiring of gate drivers illustrated in FIG. 31 in a display region.

FIGS. 32A and 32B are each a schematic diagram illustrating an example of the arrangement of gate drivers 120 in the display region in this embodiment. Although only the alphabet letters A to E and H are shown without "TFT-" in FIGS. 32A and 32B for the sake of convenience, A to E and H correspond to TFT-A to TFT-E and TFT-H in FIG. 31.

FIG. 32A illustrates an example of the arrangement of the gate drivers 120 for driving the gate lines 13G(n−2) and 13G(n). FIG. 32B illustrates an example of the arrangement of the gate drivers 120 for driving the gate lines 13G(n−1) and 13G(n+3). As illustrated in FIG. 32A, the gate terminals of the TFT-B and TFT-C in each of the respective gate drivers 120 for driving the gate lines 13G(n−2) and 13G(n) are supplied with the control signal GCK2_*a*, and the drain terminals of the TFT-E and TFT-H in each of these gate drivers 120 are supplied with the control signal GCK1_*a*. As illustrated in FIG. 32B, the gate terminals of the TFT-B and TFT-C in each of the respective gate drivers 120 for driving the gate lines 13G(n−1) and 13G(n+3) are supplied with the control signal GCK1_*a*, and the drain terminals of the TFT-E and TFT-H in each of these gate drivers 120 are supplied with the control signal GCK2_*a*.

Figure 33:
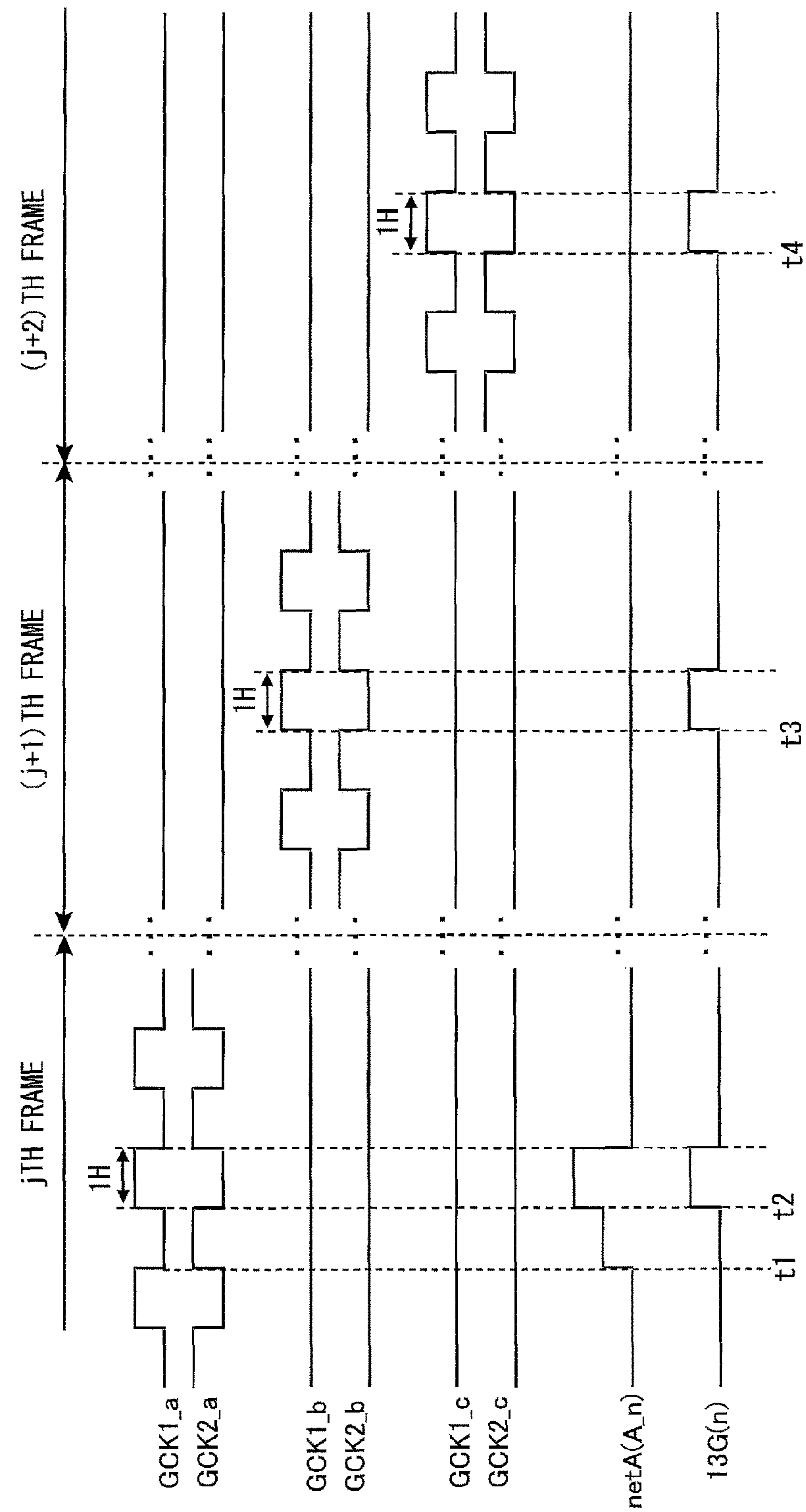
FIG. 33 is a timing chart illustrating the timings of driving gate lines by gate drivers illustrated in FIG. 31.

The following describes the method of driving each gate line 13G. FIG. 33 is a timing chart illustrating the timing of driving the gate line 13G(n) in this embodiment. In this example, the gate driver groups 120A to 120C are operated one by one in this order every frame, to drive the gate lines 13G. The operation of the gate driver 120(A_n) different from that in the foregoing sixth embodiment is described below.

As illustrated in FIG. 33, in the operating period of the gate driver group 120A, i.e. in the jth frame, the netA(A_n) of the gate driver 120(A_n) is precharged at time t1. Next, at time t2, the H level potential of the control signal GCK1_*a* is supplied to the drain terminals of the TFT-E and TFT-H in the gate driver 120(A_n), and the potential of the gate line 13G(n) is supplied to the gate terminal of the TFT-H in the gate driver 120(A_n).

At time t2, the H level potential of the control signal GCK1_*a* (CKA) is supplied to the gate line 13G(n), and the potential of the netA(A_n) is supplied to the source terminal of the TFT-H. Since the potential of the netA(A_n) is higher than the H level potential of the gate line 13G(n) and control signal GCK1_*a* supplied to the gate terminal and drain terminal of the TFT-H, the TFT-H is turned off.

Next, at time t3 in the (j+1)th frame which is the non-operating period of the gate driver group 120A, the gate line 13G(n) is switched to the selected state. As in the jth frame, the potential of the gate line 13G(n) is supplied to the gate terminal of the TFT-H in the gate driver 120(A_n), and the TFT-H is turned on. During the (j+1)th frame, the operation stop signal whose potential is L level is supplied to the drain terminal of the TFT-H. Accordingly, at time t3 when the gate line 13G(n) is switched to the selected state, L level potential is supplied to the netA(A_n).

In the (j+2)th frame as in the (j+1)th frame, at time t4 the gate line 13G(n) is switched to the selected state, and the TFT-H is turned on. During the (j+2)th frame, the operation stop signal whose potential is L level is supplied to the drain terminal of the TFT-H. Accordingly, L level potential is supplied to the netA(A_n) at time t4.

In the foregoing sixth embodiment, the TFT-F and TFT-G in the circuit unit 1201 are turned on during two frames out of three frames. In Application 1 described above, on the other hand, the TFT-H is turned on only twice in three frames. This reduces TFT degradation in the circuit unit 1201 as compared with the sixth embodiment, and enables the circuit unit 1201 to be operated with a wider operation margin.

Variation of Application 1

In the foregoing Application 1, a plurality of gate driver groups may be operated synchronously every frame as in the third embodiment.

Figure 34:
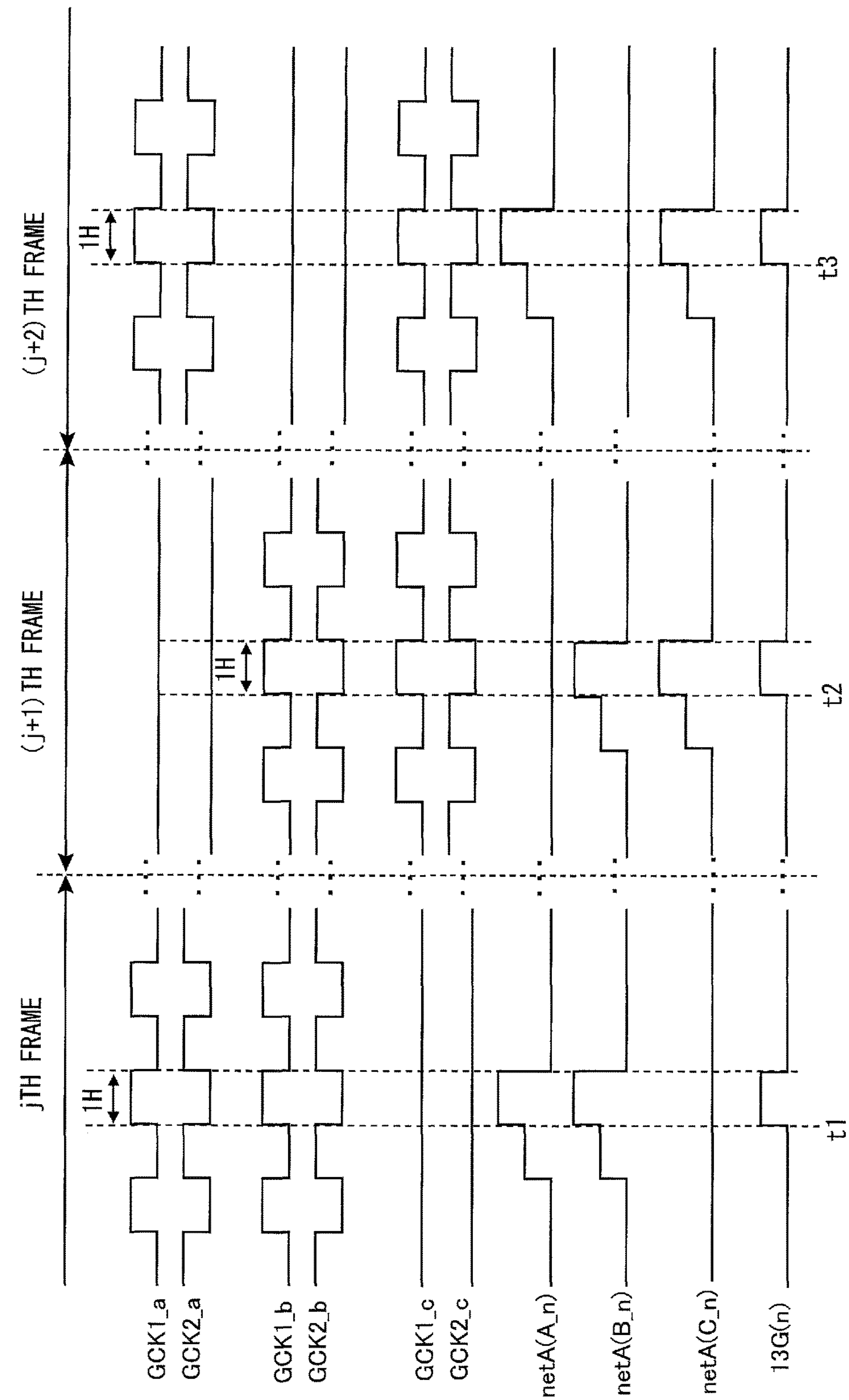
FIG. 34 is a timing chart illustrating the timings of driving gate lines by gate drivers in a variation of Application 1.

FIG. 34 is a timing chart illustrating the timing of driving the gate line 13G(n) in this embodiment. FIG. 34 illustrates an example of synchronously operating the gate drivers of the pair of gate driver groups 120A and 120B, the gate drivers of the pair of gate driver groups 120B and 120C, and the gate drivers of the pair of gate driver groups 120A and 120C every frame. The respective gate drivers 120 for driving the gate line 13G(n) in the gate driver groups 120B and 120C are hereafter referred to as gate drivers 120(B_n) and 120(C_n).

As illustrated in FIG. 34, in the jth frame, the clock signals CKA and CKB are supplied as the control signals GCK1_*a* and GCK2_*a* and the control signals GCK1_*b* and GCK2_*b*, and the operation stop signal whose potential is L level is supplied as the control signals GCK1_*c* and GCK2_*c*. As in Application 1, at time t1, the H level potential of the control signal GCK1 (CKA) is supplied to the gate line 13G(n). The potentials of the netA(A_n) and the netA(n) (hereafter, netA(B_n)) in the gate driver 120(B_n) are supplied respectively to the source terminal of the TFT-H in the gate driver 120(A_n) and the source terminal of the TFT-H in the gate driver 120(B_n). The potential of each of the netA(A_n) and netA(B_n) is higher than the H level potential of the gate line 13G(n) and clock signal CKA supplied to the gate terminal and drain terminal of the TFT-H. Accordingly, the TFT-H is turned off.

In the (j+1)th frame, the clock signals are supplied as the control signals GCK1_*b* and GCK2_*b* and the control signals GCK1_*c* and GCK2_*c*, and the operation stop signal whose potential is L level is supplied as the control signals GCK1_*a* and GCK2_*a*. As in the jth frame, at time t2, the H level potential of the gate line 13G(n) is supplied to the gate terminal of the TFT-H in the gate driver 120(A_n), and the operation stop signal whose potential is L level is supplied to the drain terminal of the TFT-H. Hence, L level potential is supplied to the netA(A_n) at time t2.

In the (j+2)th frame, the clock signals CKA and CKB are supplied as the control signals GCK1_*a* and GCK2_*a* and the control signals GCK1_*c* and GCK2_*c*, and the operation stop signal whose potential is L level is supplied as the control signals GCK1_*b* and GCK2_*b*. As in the jth frame, at time t3, the potentials of the netA(A_n) and the netA(n) (hereafter, netA(C_n)) in the gate driver 120(C_n) are supplied respectively to the source terminal of the TFT-H in the gate driver 120(A_n) and the source terminal of the TFT-H in the gate driver 120(C_n). The potential of each of the netA(A_n) and netA(C_n) is higher than the H level potential of the gate line 13G(n) and control signal GCK1_*a* (CKA) supplied to the gate terminal and drain terminal of the TFT-H. Accordingly, the netA(A_n) and the TFT-H in the gate driver 120(C_n) are turned off.

In the foregoing Application 1, one gate line 13G is driven by one gate driver 120. In this variation, on the other hand, one gate line 13G is driven by two gate drivers 120. Thus, the load of driving the gate line 13G can be distributed in this variation, as compared with Application 1. The channel width of the TFT-E functioning as an output buffer can be reduced in this way.

Application 2 of Sixth Embodiment

The foregoing sixth embodiment describes an example where the clock signals CKA and CKB of two phases are supplied to the gate driver 120. Alternatively, in the case where clock signals of four phases (see FIG. 13) are supplied as in the foregoing second embodiment, the circuit unit 1201 in the gate driver 120 may have the following structure.

Figure 35:
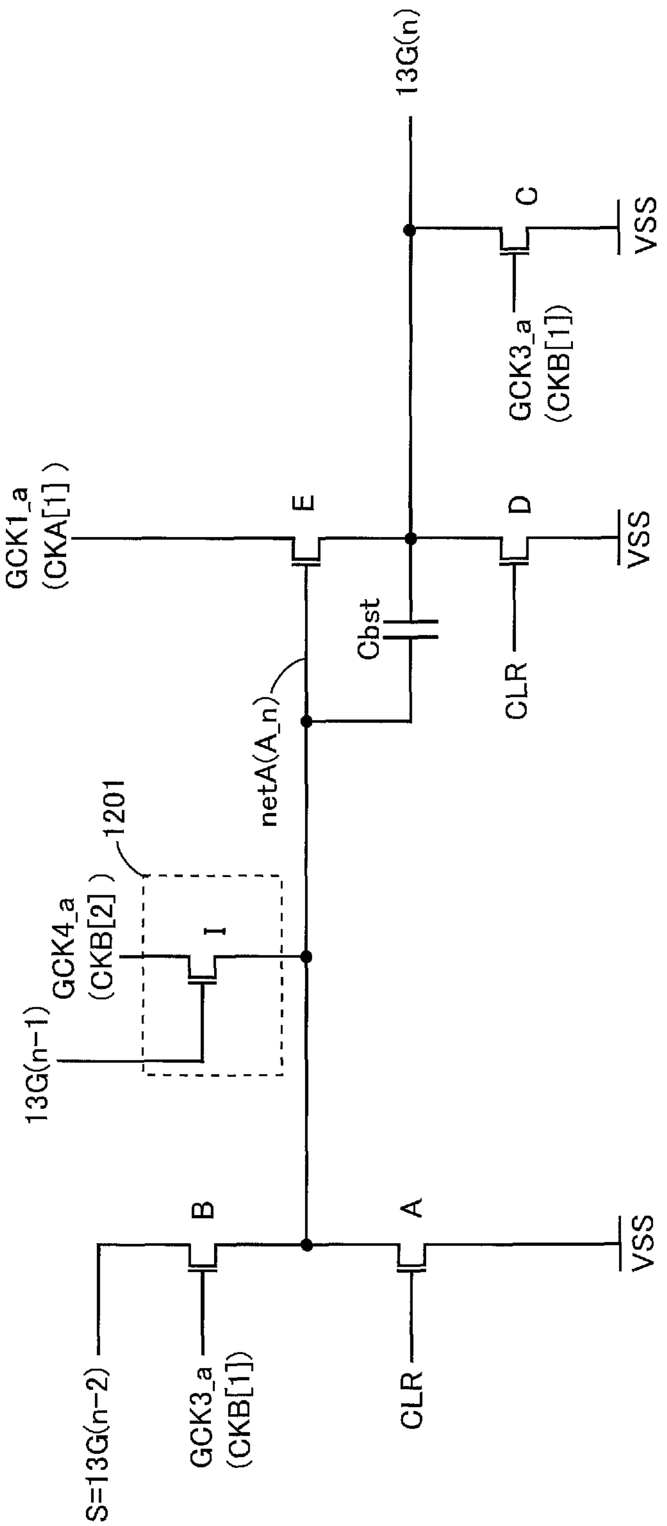
FIG. 35 is a diagram illustrating an example of an equivalent circuit of a gate driver in Application 2 of the sixth embodiment.

FIG. 35 is a diagram illustrating an equivalent circuit of the gate driver 120 in the gate driver group 120A in this embodiment. As illustrated in FIG. 35, the gate driver 120 has the same structure as the gate driver 11 illustrated in FIG. 14, except that the circuit unit 1201 is provided in the netA(A_n). The circuit unit 1201 includes a TFT designated as I (hereafter, TFT-I). The TFT-I has a gate terminal connected to the gate line 13G(n−1), a source terminal connected to the netA(A_n), and a drain terminal supplied with the control signal GCK4_*a* (CKB[2]).

Figure 36A:
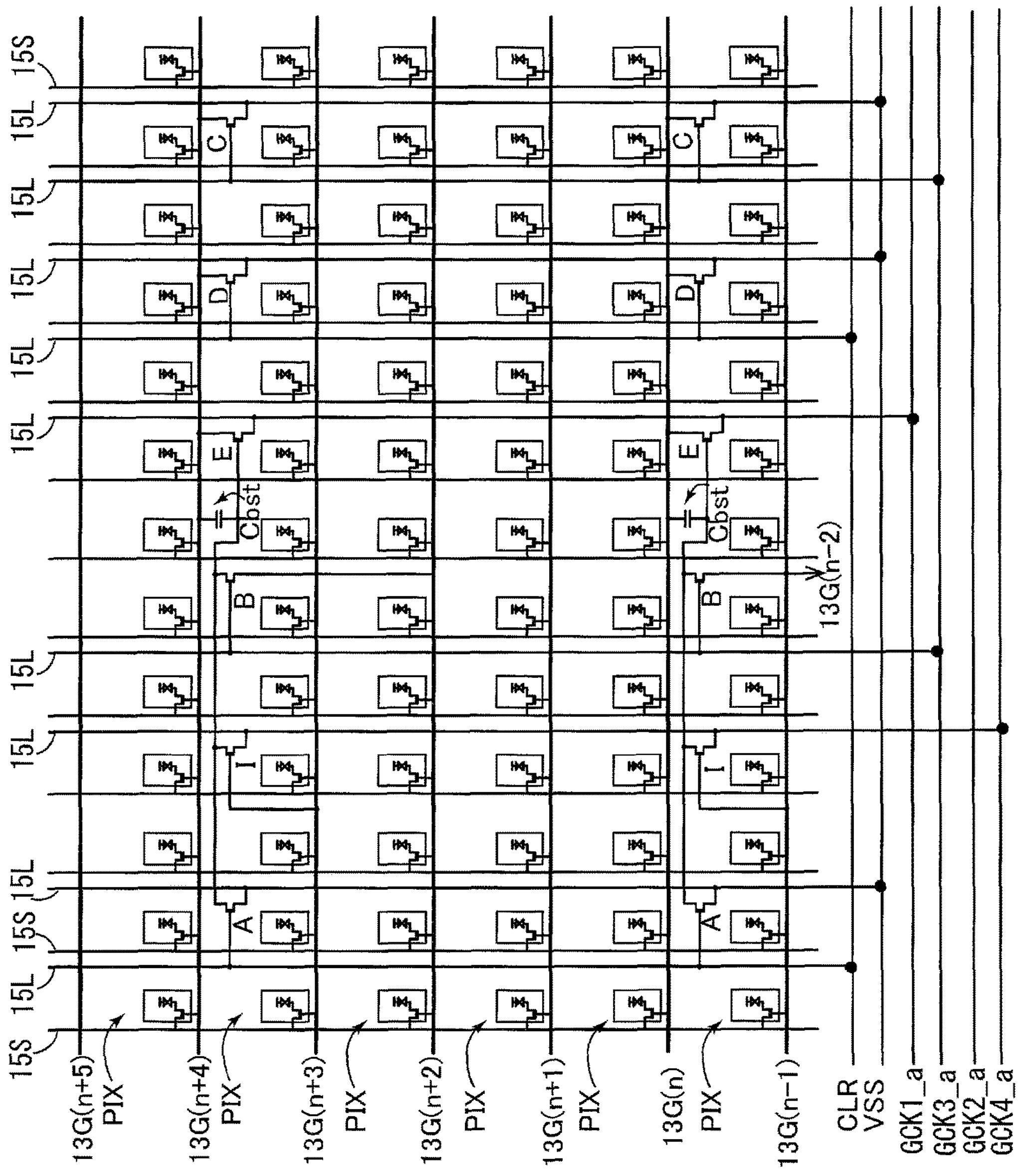
FIG. 36A is a schematic diagram illustrating an example of the arrangement and wiring of gate drivers illustrated in FIG. 35 in a display region.

FIGS. 36A to 36D are each a schematic diagram illustrating an example of the arrangement of gate drivers 120 in the display region in this embodiment. FIG. 36A illustrates an example of the arrangement of the gate drivers 120 (hereafter, gate drivers 120(*n*) and 120(*n*+4)) for driving the gate lines 13G(n) and 13G(n+4). As illustrated in FIG. 36A, the gate terminals of the TFT-B and TFT-C in each of the gate drivers 120(*n*) and 120(*n*+4) are supplied with the control signal GCK3_*a*, the drain terminal of the TFT-E in each of these gate drivers is supplied with the control signal GCK1_*a*, and the drain terminal of the TFT-I in each of these gate drivers is supplied with the control signal GCK4_*a*.

Figure 36B:
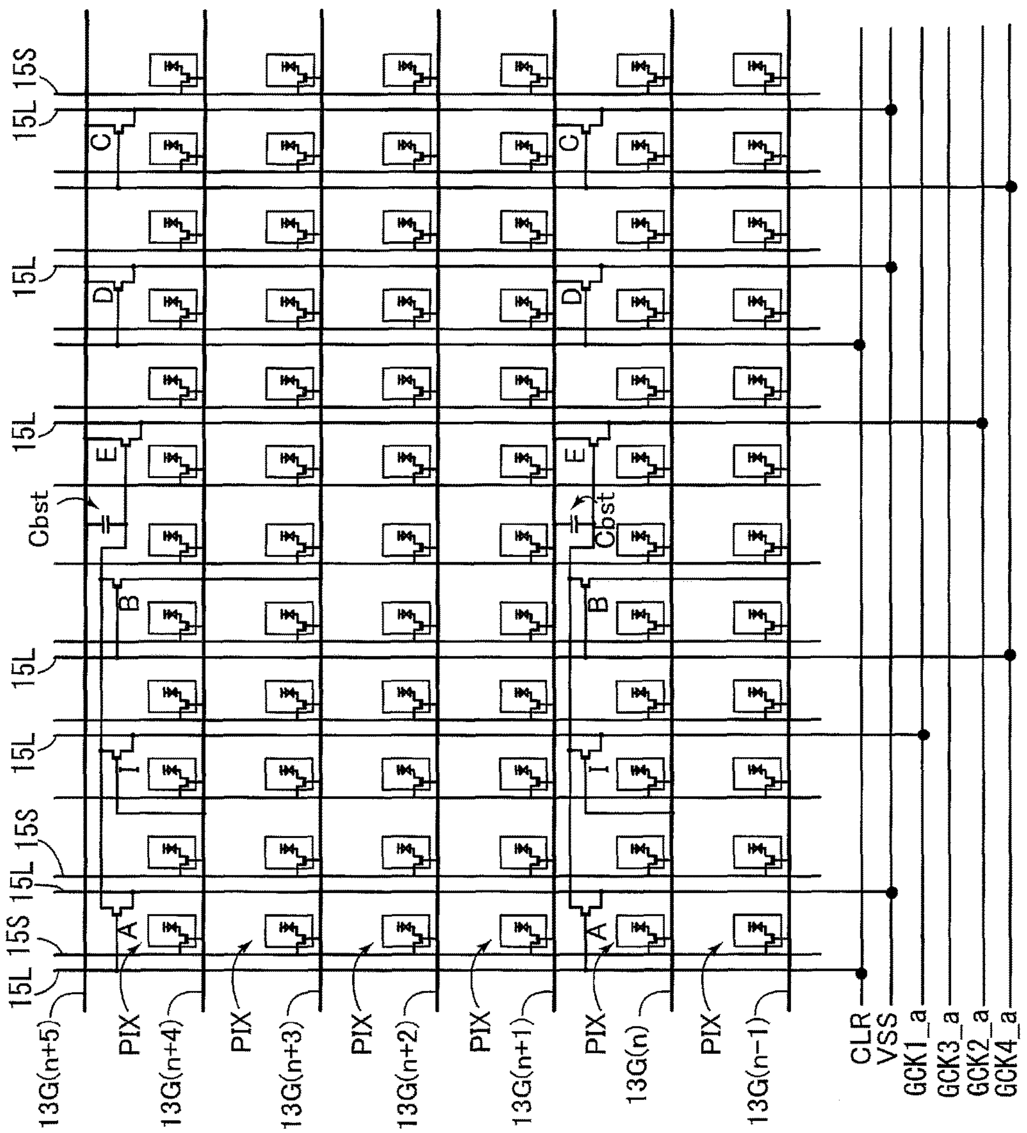
FIG. 36B is a schematic diagram illustrating an example of the arrangement and wiring of gate drivers illustrated in FIG. 35 in a display region.

FIG. 36B illustrates an example of the arrangement of the gate drivers 120 (hereafter, gate drivers 120(*n*+1) and 120(*n*+5)) for driving the gate lines 13G(n+1) and 13G(n+5). As illustrated in FIG. 36B, the gate terminals of the TFT-B and TFT-C in each of the gate drivers 120(*n*+1) and 120(*n*+5) are supplied with the control signal GCK4_*a*, the drain terminal of the TFT-E in each of these gate drivers is supplied with the control signal GCK2_*a*, and the drain terminal of the TFT-I in each of these gate drivers is supplied with the control signal GCK1_*a*.

Figure 36C:
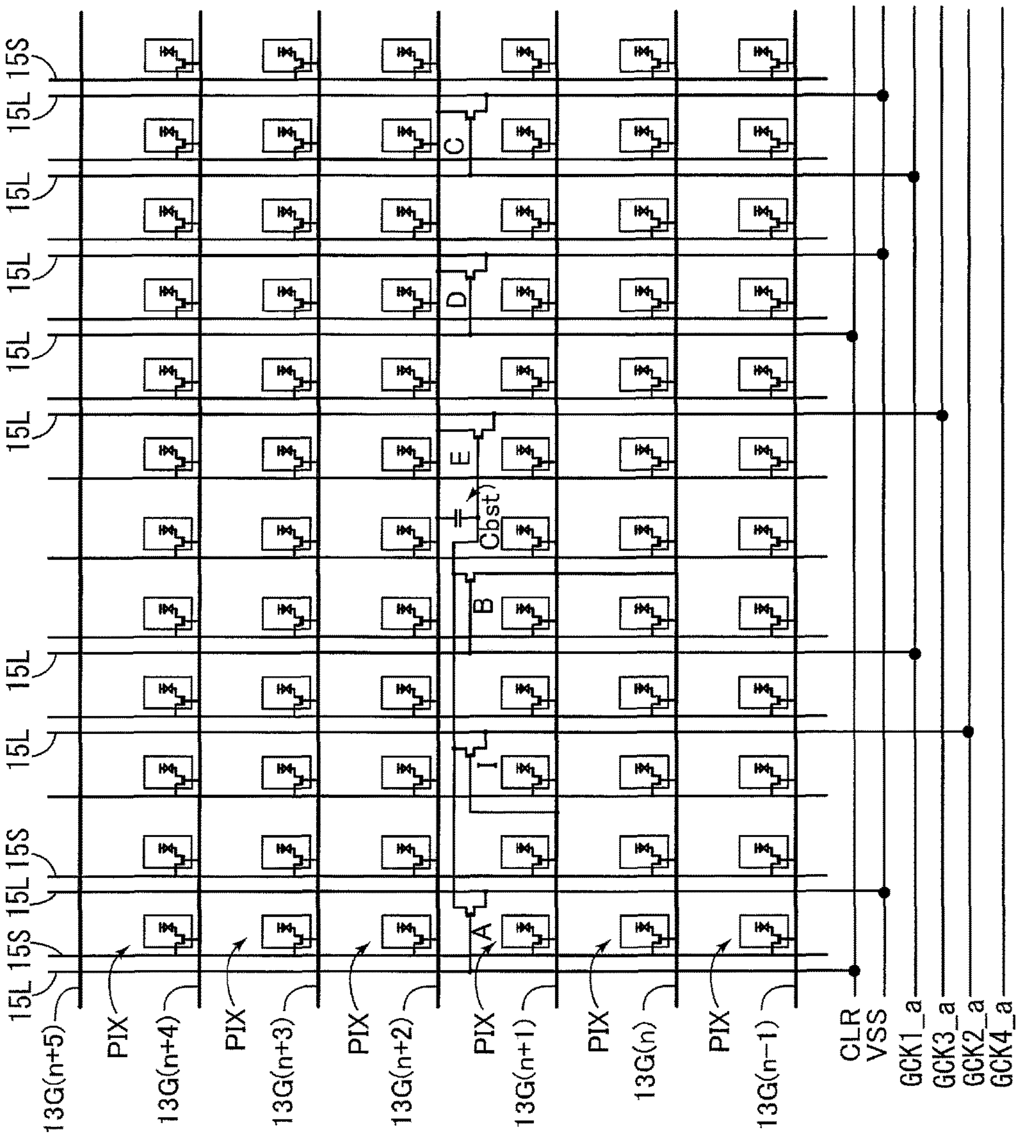
FIG. 36C is a schematic diagram illustrating an example of the arrangement and wiring of gate drivers illustrated in FIG. 35 in a display region.

FIG. 36C illustrates an example of the arrangement of the gate driver 120 (hereafter, gate driver 120(*n*+2)) for driving the gate line 13G(n+2). As illustrated in FIG. 36C, the gate terminals of the TFT-B and TFT-C in the gate driver 120(*n*+2) are supplied with the control signal GCK1_*a*, the drain terminal of the TFT-E in the gate driver is supplied with the control signal GCK3_*a*, and the drain terminal of the TFT-I in the gate driver is supplied with the control signal GCK2_*a*.

Figure 36D:
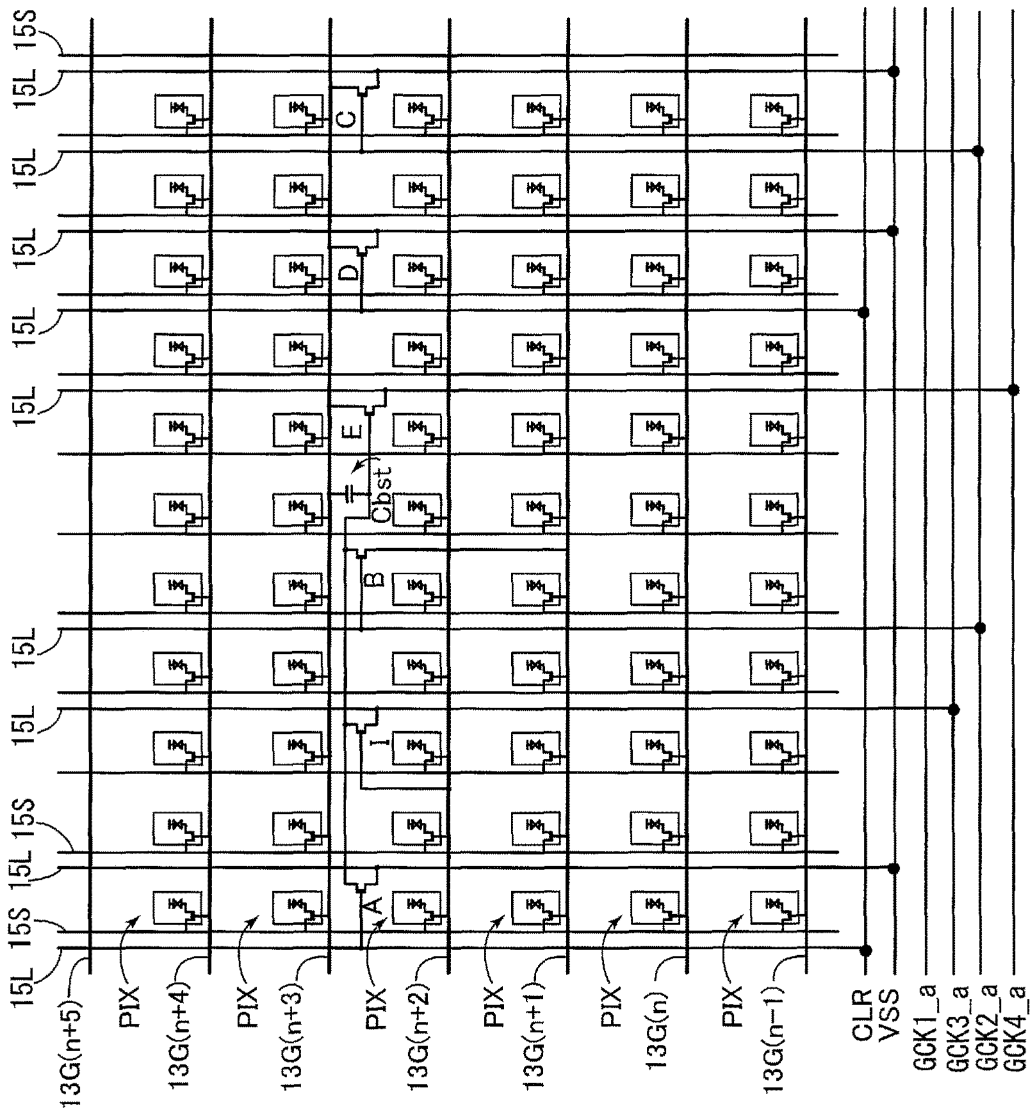
FIG. 36D is a schematic diagram illustrating an example of the arrangement and wiring of gate drivers illustrated in FIG. 35 in a display region.

FIG. 36D illustrates an example of the arrangement of the gate driver 120 (hereafter, gate driver 120(*n*+3)) for driving the gate line 13G(n+3). As illustrated in FIG. 36D, the gate terminals of the TFT-B and TFT-C in the gate driver 120(*n*+3) are supplied with the control signal GCK2_*a*, the drain terminal of the TFT-E in the gate driver is supplied with the control signal GCK4_*a*, and the drain terminal of the TFT-I in the gate driver is supplied with the control signal GCK3_*a*.

Figure 37:
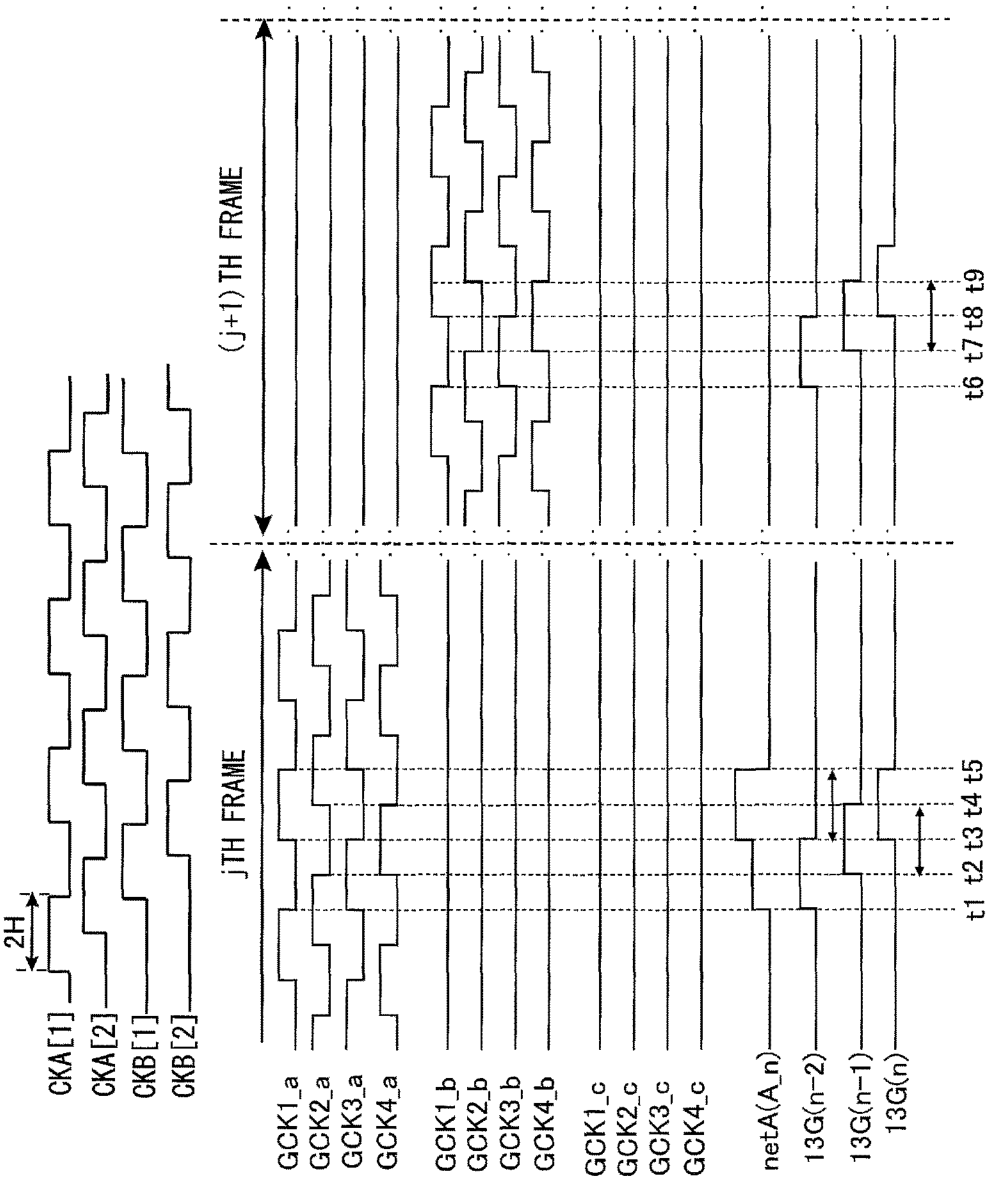
FIG. 37 is a timing chart illustrating the timings of driving gate lines by gate drivers illustrated in FIG. 35.

The following describes the method of driving each gate line 13G. FIG. 37 is a timing chart illustrating the timing of driving the gate line 13G(n) in this embodiment. In this example, the gate driver groups 120A and 120B are operated alternately every frame to drive the gate line 13G. The operation of the gate driver 120(A_n) (see FIG. 35) different from the foregoing sixth embodiment is described below.

At time t1 in the jth frame in which the gate driver group 120A is to be operated, the gate line 13G(n−2) is switched to the selected state. The H level potential of the gate line 13G(n−2) is then supplied to the drain terminal of the TFT-B in the gate driver 120(A_n), and the H level potential of the control signal GCK3_*a* (CKB[1]) is supplied to the gate terminal of the TFT-B. Here, the potential of the control signal GCK1_*a* (CKA[1]) is L level, and the potential of the control signal GCK3_*a* (CKB[1]) is H level. Accordingly, the netA(A_n) is precharged to a potential that is ((H level potential)−(threshold voltage of TFT-B)).

Next, at time t2, the gate line 13G(n−1) is switched to the selected state. The H level potential of the gate line 13G(n−1) is then supplied to the gate terminal of the TFT-I in the gate driver 120(A_n), the H level potential of the control signal GCK4_*a* (CKB[2]) is supplied to the drain terminal of the TFT-I in the gate driver 120(A_n), and the potential of the netA(A_n) is supplied to the source terminal of the TFT-I. Here, the potential of the control signal GCK1_*a* is L level, and the potential of the control signal GCK3_*a* (CKB[1]) is H level. Accordingly, the netA(A_n) maintains the potential ((H level potential)−(threshold voltage of TFT-B)).

Next, at time t3, the control signal GCK1_*a* (CKA[1]) transitions to H level, and the control signal GCK3_*a* (CKB[1]) transitions to L level. The H level potential of the control signal GCK1_*a* is then supplied to the drain terminal of the TFT-E in the gate driver 120(A_n). As a result, the netA(A_n) is charged to a potential higher than the H level of the control signal GCK1_*a*. The potential of the netA (A_n) higher than the H level is supplied to the source terminal of the TFT-I in the gate driver, and so the TFT-I is turned off. Since the TFT-C in this gate driver is off, the H level potential of the control signal GCK1_*a* is supplied to the gate line 13G(n).

From time t4 to t5, the TFT-I is off, and the potential of the control signal GCK1_a (CKA[1]) maintains H level and the potential of the control signal GCK3_a (CKB[1]) maintains L level. Accordingly, the gate line 13G(n) maintains H level potential.

At time t6 in the (j+1)th frame in which the gate driver group 120A is in the non-operating period, the gate line 13G(n−2) is switched to the selected state. The operation stop signal whose potential is L level is supplied to the gate driver 120(A_n) as the control signals GCK1_a to GCK4_a. Accordingly, the netA(A_n) maintains L level.

At time t7, the gate line 13G(n−1) is switched to the selected state. The H level of the gate line 13G(n−1) is then supplied to the gate terminal of the TFT-I, as a result of which the TFT-I is turned on. The L level potential of the control signal GCK4_a (CKB[2]) is supplied to the drain terminal of the TFT-I, and then this L level potential is supplied to the netA(A_n).

From time t7 to t9, the TFT-I remains on. During the (j+1)th frame, the L level potential of the control signal GCK4_a (CKB[2]) is supplied to the drain terminal of the TFT-I. Hence, the netA(A_n) can be maintained at L level potential during the drive period of the gate line 13G(n).

In Application 2 described above, clock signals of four phases are supplied to the gate driver groups 120A and 120B alternately every frame. The clock signal frequency can therefore be decreased as compared with the sixth embodiment. In addition, the potential of the netA in the gate driver 120 in the non-operating period can be maintained at L level by the circuit unit 1201. The gate driver 120 is thus prevented from malfunctioning when the gate line 13G is driven.

Seventh Embodiment

The foregoing first to sixth embodiments describe an example where the lines for supplying control signals to each gate driver are provided in the terminal unit 12g for each gate driver group. For example, the terminal unit 12g illustrated in FIG. 4 has two lines for supplying the control signals GCK1 and GCK2, for each of the gate driver groups 11A and 11B. This means H×K lines are necessary, where H is the number of lines for control signals for each gate driver group (H is a natural number such that H≥2) and K is the number of gate driver groups (K is a natural number such that K≥1). A larger number of lines requires a larger picture frame region in which the terminal unit 12g is located. In view of this, lines are branched using switches to reduce the picture frame width in this embodiment.

Figure 38A:
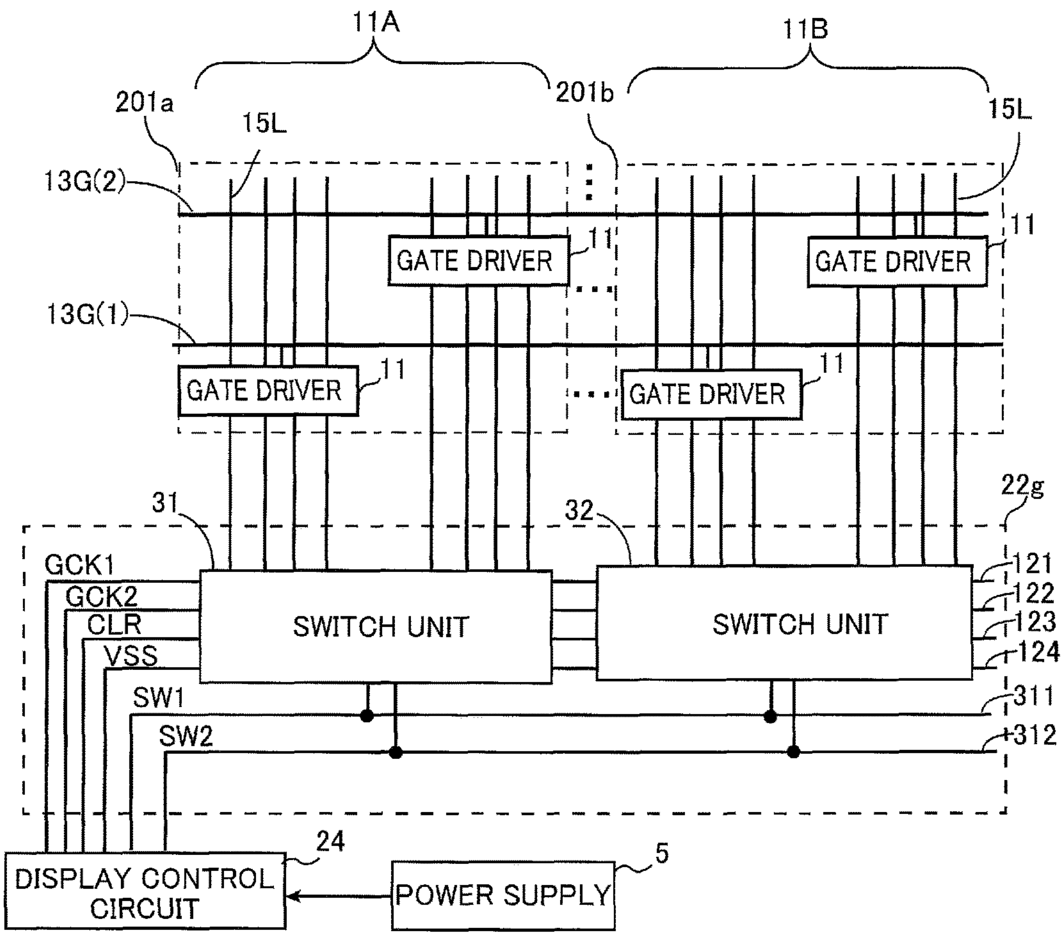
FIG. 38A is a schematic diagram illustrating an example of the structure of a terminal unit in an active-matrix substrate in a seventh embodiment.

FIG. 38A illustrates an example. As illustrated in FIG. 38A, a terminal unit 22g has the lines 121 to 124 for supplying the control signals GCK1 and GCK2, reset signal CLR, and power supply voltage signal VSS, and lines 311 and 312 for respectively supplying switch signals SW1 and SW2.

Figure 38B:
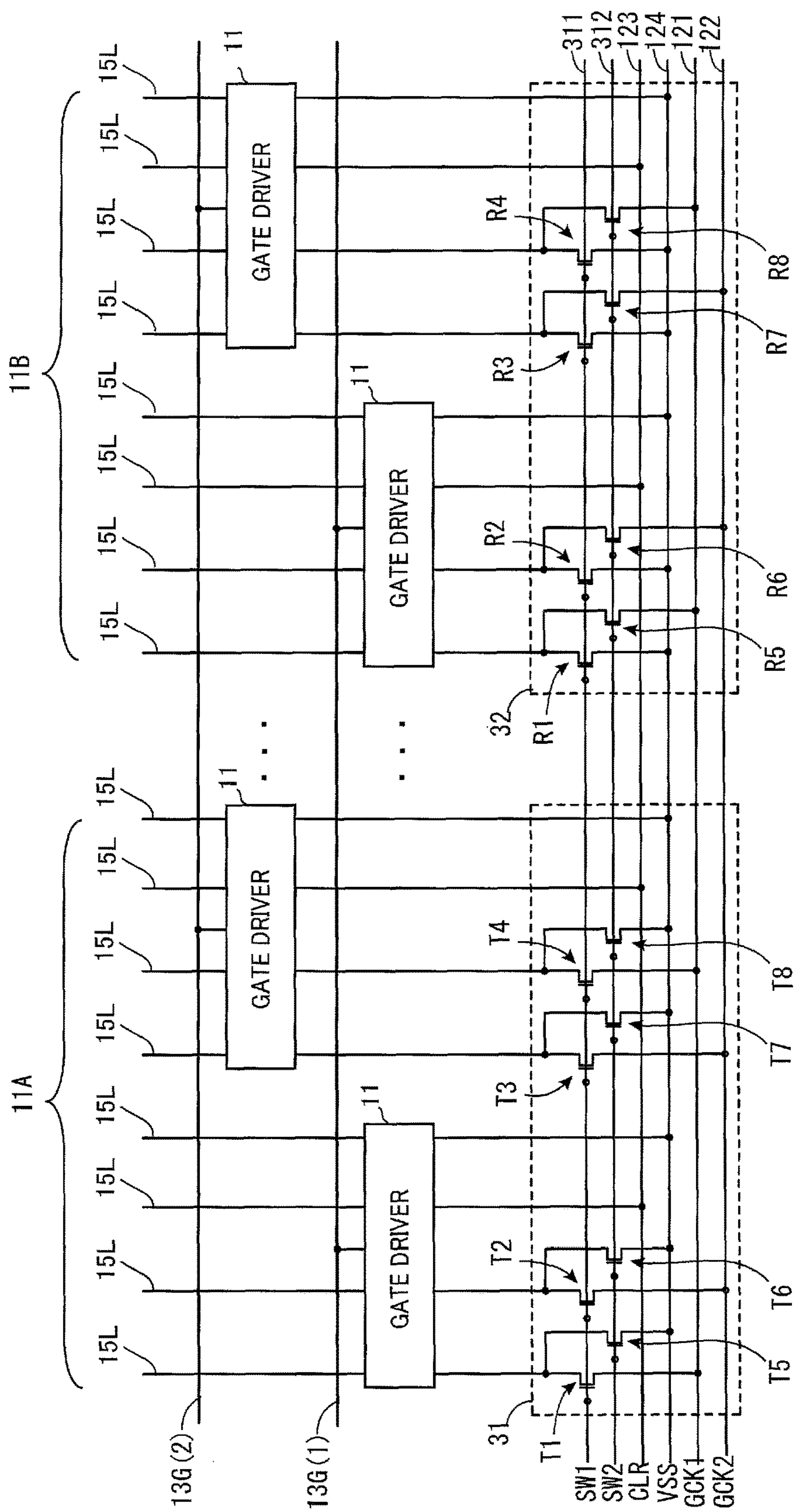
FIG. 38B is a schematic diagram illustrating an example of the structure of switch units illustrated in FIG. 38.

FIG. 38B is a schematic diagram illustrating an example of the structure of switch units 31 and 32 illustrated in FIG. 38A. As illustrated in FIG. 38B, the switch unit 31 is connected to the gate driver group 11A and the lines 311 and 312. The switch unit 32 is connected to the gate driver group 11B and the lines 311 and 312. The switch unit 31 includes switching elements T1 to T8 for connecting the gate driver group 11A and the lines 121, 122, and 124. The switch unit 32 includes switching elements R1 to R8 for connecting the gate driver group 11B and the lines 121, 122, and 124.

The switch unit 31 switches the state between the lines 15L for supplying the control signals GCK1 and GCK2 to the gate driver group 11A and the lines 121 and 122 to the conducting state via the switching elements T1 to T4, in the case of being supplied with the switch signal SW1 of H level. The switch unit 31 switches the state between the lines 15L and the lines 121 and 122 to the non-conducting state via the switching elements T1 to T4, in the case of being supplied with the switch signal SW1 of L level. The switch unit 31 also switches the state between the lines 15L for supplying the control signal VSS to the gate driver group 11A and the line 124 to the conducting state via the switching elements T5 to T8, in the case of being supplied with the switch signal SW2 of H level. The switch unit 31 switches the state between the lines 15L and the line 124 to the non-conducting state via the switching elements T5 to T8, in the case of being supplied with the switch signal SW2 of L level.

The switch unit 32 switches the state between the lines 15L for supplying the control signal VSS to the gate driver group 11B and the line 124 to the conducting state via the switching elements R1 to R4, in the case of being supplied with the switch signal SW1 of H level. The switch unit 32 switches the state between the lines 15L and the line 124 to the non-conducting state via the switching elements R1 to R4, in the case of being supplied with the switch signal SW1 of L level. The switch unit 32 also switches the state between the lines 15L for supplying the control signals GCK1 and GCK2 to the gate driver group 11B and the lines 121 and 122 to the conducting state via the switching elements R5 to R8, in the case of being supplied with the switch signal SW2 of H level. The switch unit 32 switches the state between the lines 15L and the lines 121 and 122 to the non-conducting state via the switching elements R5 to R8, in the case of being supplied with the switch signal SW2 of L level.

A display control circuit 24 supplies the switch signal SW1 of H level to the line 311 and the switch signal SW2 of L level to the line 312, in the operating period of the gate driver group 11A. The display control circuit 24 supplies the switch signal SW1 of L level to the line 311 and the switch signal SW2 of H level to the line 312, in the operating period of the gate driver group 11B.

Since the example in FIGS. 38A and 38B concerns the case of supplying clock signals of two phases, the number of lines is the same as that in the example in FIG. 4. In the case of supplying clock signals of four phases to each gate driver as in the second embodiment, four lines for supplying clock signals of four phases are needed for each gate driver group. If the number of gate driver groups is two, a total of eight lines for supplying clock signals are necessary. In such a structure as in the seventh embodiment, on the other hand, only four lines for supplying clock signals and two lines for supplying switch signals are necessary. The picture frame region in which the terminal unit 22g is provided in the active-matrix substrate 20a can thus be reduced in size.

Although the embodiments of the present invention have been described above, the foregoing embodiments are merely examples that may be used to carry out the present invention. The present invention is not limited to the foregoing embodiments, and can be carried out with appropriate modifications to or combinations of the foregoing embodiments without departing from the spirit of the present invention. Variations of the present invention are described below.

Variations (1) Although the foregoing first, second, and fifth embodiments describe an example where two gate drivers for driving each gate line 13G are provided, the number of gate drivers for driving one gate line 13G may be three or more. In the case where three or more gate drivers are provided, an operation of turning the switching element on is performed in any of the three gate drivers at predetermined time intervals, while keeping the switching elements in the other gate drivers off.

(2) Although the foregoing second embodiment describes an example where clock signals of four phases are supplied to each gate driver group, for instance, clock signals of eight phases different from each other may be supplied to each gate driver group. In this case, a clock signal supplied to a gate driver for driving a gate line 13G is out of phase by ⅛ period with a clock signal supplied to a gate driver for driving an adjacent gate line 13G preceding or succeeding the gate line 13G.

(3) Although the foregoing sixth embodiment describes an example where the three gate driver groups 120A, 120B, and 120C are provided, the circuit unit 1201 only needs to include the TFT-F or TFT-G in the case where two gate driver groups are provided. For example, in the case where the gate driver groups 120A and 120B are provided and the TFT-F is used as the circuit unit 1201, the control signal ACLR(2) is supplied to the gate terminal of the TFT-F in the gate driver 120(A_n), and the control signal ACLR(1) is supplied to the gate terminal of the TFT-F in the gate driver 120(B_n) in the gate driver group 120B.

(4) In the foregoing sixth embodiment and the like (the sixth embodiment, Application 1 and its variation, and Application 2), the gate drivers 120 may be located outside the display region. Regardless of whether or not the gate drivers 120 are located in the display region, when the potential of the gate line 13G enters the netA of the stopped gate driver 120 as noise as a result of driving the gate line 13G, the gate driver 120 malfunctions. For example, in the case where a plurality of gate drivers 120 are provided for each gate line 13G in the picture frame region at one end of the gate lines 13G, the picture frame region is large as compared with the foregoing sixth embodiment and the like, and so the TFTs are more likely to be affected by external air and the like. However, a malfunction of the gate driver 120 caused by driving the gate line 13G can still be prevented by the circuit unit 1201.

(5) Although the foregoing first embodiment describes an example where the power supply voltage signal VSS is supplied to the terminal unit 12*g* via the line 124 and the power supply voltage signal VSS is supplied from the terminal unit 12*g* to the gate driver 11 via the line 15L as illustrated in FIG. 4, the following structure is also possible.

Figure 39:
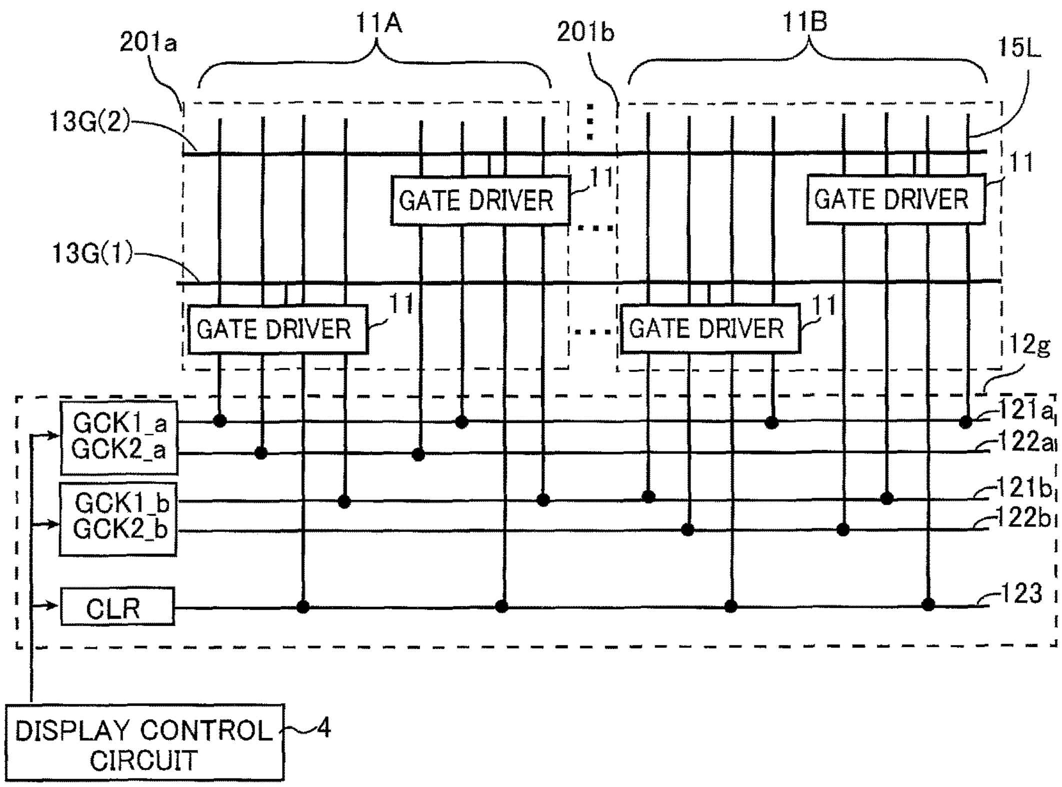
FIG. 39 is a schematic diagram illustrating the structure of a terminal unit in Variation (5).

FIG. 39 is a schematic diagram illustrating the structure of the terminal unit 12*g* in this variation. As illustrated in FIG. 39, in this variation, each gate driver 11 in the gate driver group 11A is connected to the line 121*b* instead of the line 124 (see FIG. 4), and each gate driver 11 in the gate driver group 11B is connected to the line 121*a* instead of the line 124. In other words, each gate driver 11 in the gate driver group 11A is supplied with the control signal GCK1_*b* instead of the power supply voltage signal VSS, and each gate driver 11 in the gate driver group 11B is supplied with the control signal GCK1_*a* instead of the power supply voltage signal VSS. This is described in detail below.

Figure 40A:
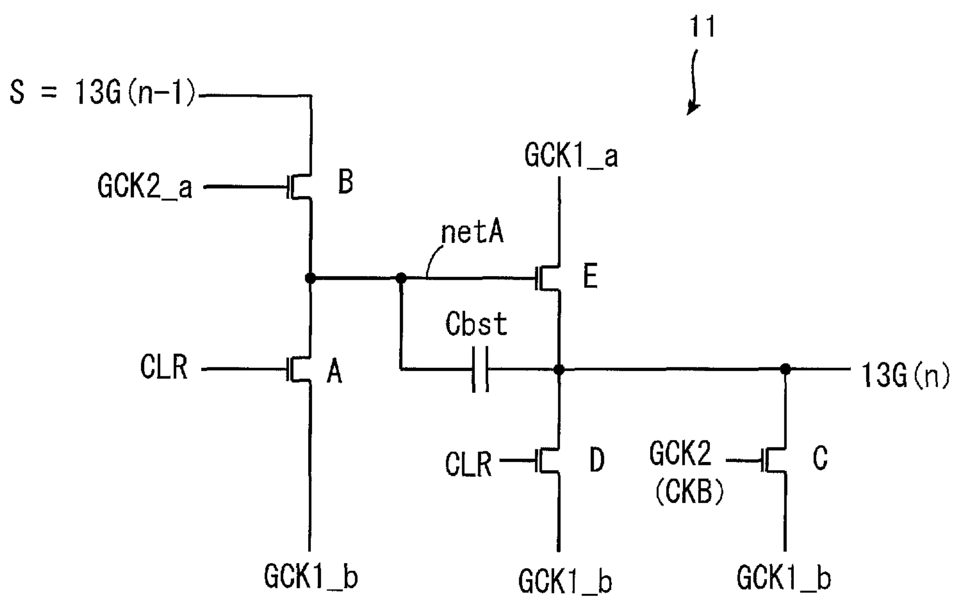
FIG. 40A is a diagram illustrating an equivalent circuit of a gate driver in Variation (5).
Figure 40B:
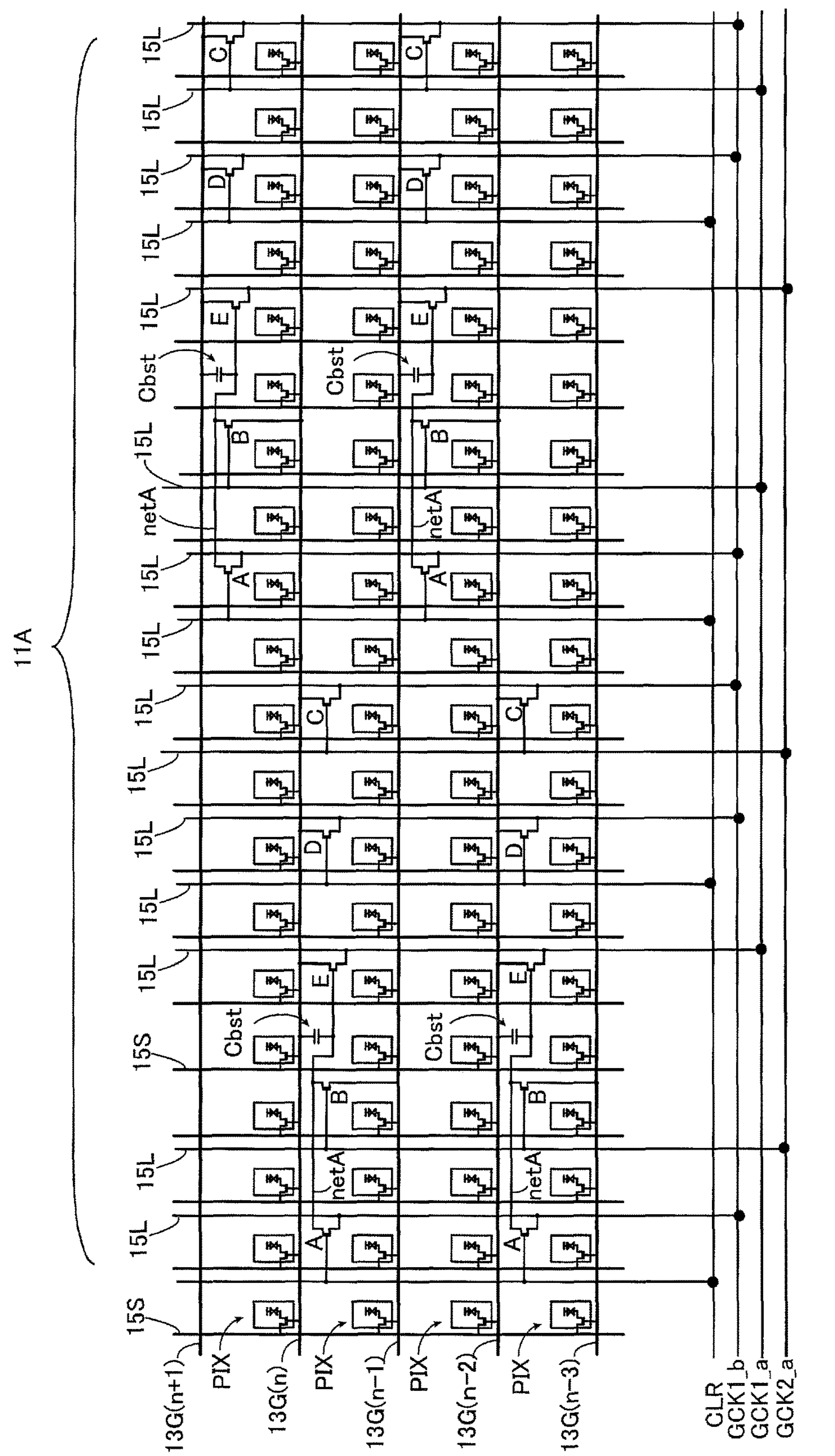
FIG. 40B is a schematic diagram illustrating an example of the arrangement and wiring of gate drivers illustrated in FIG. 40A in a display region.

FIG. 40A is a diagram illustrating an equivalent circuit of the gate driver 11(*n*) in the gate driver group 11A. FIG. 40B is a schematic diagram illustrating an example of the arrangement of part of the gate drivers 11 in the gate driver group 11A. As illustrated in FIGS. 40A and 40B, the gate driver 11 in the gate driver group 11A is the same as the gate driver 11 in the gate driver group 11A illustrated in FIGS. 6 and 7, except that the control signal GCK1_*b* is supplied to the source terminals of the TFT-A, TFT-D, and TFT-C.

In the aforementioned FIG. 9, the operation stop signal whose potential is L level is supplied as the control signals GCK1_*b* and GCK2_*b*, during the time when the clock signals are supplied as the control signals GCK1_*a* and GCK2_*a* (the first operating period, the third operating period). Hence, by supplying the control signal GCK1_*b* to the source terminals of the TFT-A, TFT-D, and TFT-C in the gate driver group 11A, a signal of the same potential as the power supply voltage signal VSS can be supplied to these TFTs in the operating period of the gate driver group 11A.

During the time when the operation stop signal is supplied as the control signals GCK1_*a* and GCK2_*a* (the second operating period, the fourth operating period), the clock signals are supplied as the control signals GCK1_*b* and GCK2_*b*. However, since the gate driver group 11A is not in operation during this time, it is not affected by potential changes of the control signals GCK1_*b* and GCK2_*b*.

On the other hand, the control signal GCK1_*a* is supplied to the source terminals of the TFT-A, TFT-D, and TFT-C in each gate driver 11 in the gate driver group 11B. In this way, a signal of the same potential as the power supply voltage signal VSS can be supplied to these TFTs in the operating period of the gate driver group 11B.

The above describes an example where the control signal GCK1_*b* is supplied to the source terminals of the TFT-A, TFT-D, and TFT-C in each gate driver 11 in the gate driver group 11A. Alternatively, the control signal GCK2_*b* may be supplied to the source terminals of these TFTs, for the same reason as the control signal GCK1_*b*. The above describes an example where the control signal GCK1_*a* is supplied to the source terminals of the TFT-A, TFT-D, and TFT-C in each gate driver 11 in the gate driver group 11B. Alternatively, the control signal GCK2_*a* may be supplied to the source terminals of these TFTs, for the same reason as the control signal GCK1_*a*.

In other words, the source terminals of the TFT-A, TFT-D and TFT-C in the gate driver 11 may be connected to any line that supplies such a control signal whose potential is L level in the operating period of the gate driver 11. With such a structure, the gate line 13G can be switched to the non-selected state at predetermined timing by the operating gate driver 11. This reduces the number of lines in the terminal unit 12*g*, and reduces the width of the picture frame region in which the terminal unit 12*g* is located.

Although this variation describes an example where a control signal whose potential is L level in the operating period of the gate driver 11 is supplied to the source terminals of all of the TFT-A, TFT-D and TFT-C in the gate driver 11, the present invention is not limited to this, and a control signal whose potential is L level in the operating period of the gate driver 11 may be supplied to the source terminal of at least one of these TFTs.

(6) In the foregoing second embodiment, the source terminal of the TFT-A, the drain terminal of the TFT-D, and the drain terminal of the TFT-C in each gate driver 11 may be connected to a line for supplying a control signal whose potential is L level in the operating period of the gate driver 11, as in Variation (5).

Figure 41A:
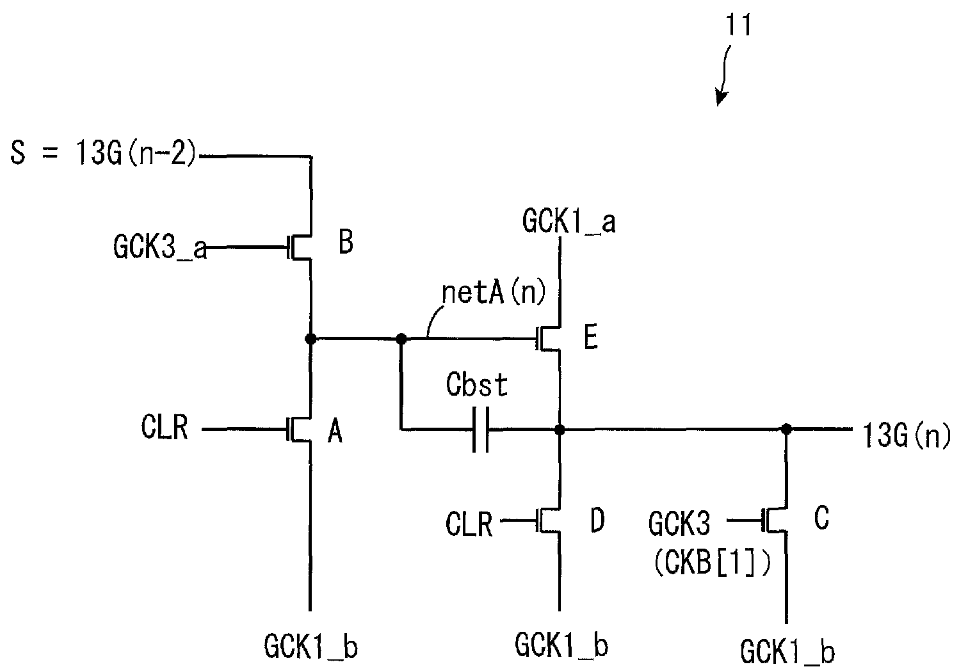
FIG. 41A is a diagram illustrating an equivalent circuit of a gate driver in Variation (6).
Figure 41B:
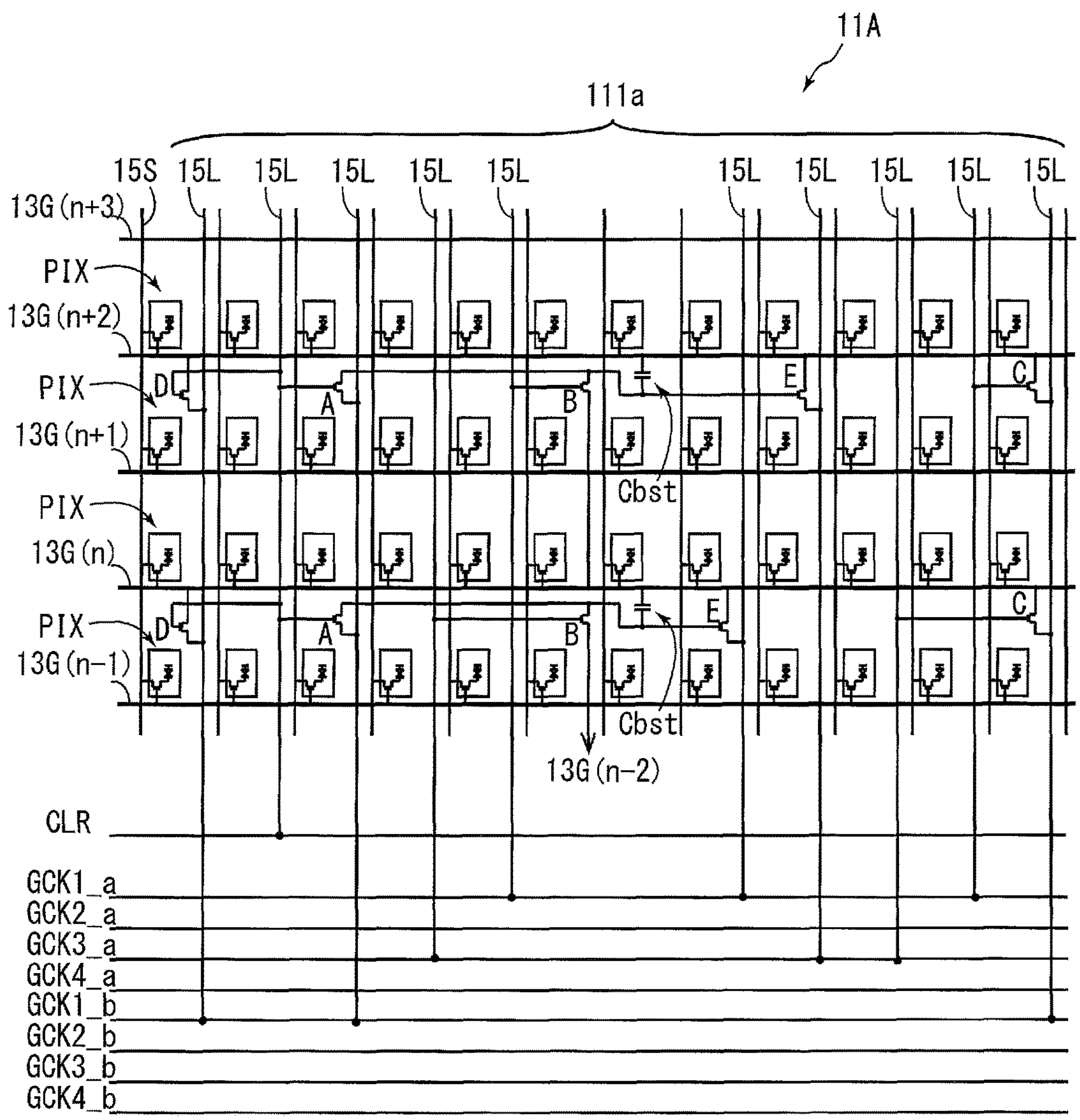
FIG. 41B is a schematic diagram illustrating an example of the arrangement and wiring of gate drivers illustrated in FIG. 41A in a display region.

For example, as illustrated in FIGS. 41A and 41B, the control signal GCK1_*b* may be supplied to the source terminals of the TFT-A, TFT-D and TFT-C in each gate driver 11 in the gate driver group 11A. In the aforementioned FIG. 16A, the operation stop signal is supplied as the control signals GCK1_*b* to GCK4_*b* in the operating period of the gate driver group 11A (the jth frame). Hence, a signal of the same potential as the power supply voltage signal VSS can be supplied to the source terminals of the TFT-A, TFT-D and TFT-C in each gate driver 11 in the gate driver group 11A.

On the other hand, the control signal GCK1_*a* may be supplied to the source terminals of the TFT-A, TFT-D, and TFT-C in each gate driver 11 in the gate driver group 11B. In the aforementioned FIG. 16B, the operation stop signal is supplied as the control signals GCK1_*a* to GCK4_*a* in the operating period of the gate driver group 11B (the (j+1)th frame). Hence, a signal of the same potential as the power supply voltage signal VSS can be supplied to these TFTs in the operating period of the gate driver group 11B by this structure.

The source terminals of the TFT-A, TFT-D and TFT-C in each gate driver 11 in the gate driver group 11A may be supplied with any of the control signals GCK1_*b* to GCK4_*b*. The source terminals of the TFT-A, TFT-D and TFT-C in each gate driver 11 in the gate driver group 11B may be supplied with any of the control signals GCK1_*a* to GCK4_*a*.

(7) In the foregoing third embodiment, the source terminals of the TFT-A, TFT-D, and TFT-C in each gate driver 11 may be connected to a line for supplying a control signal whose potential is L level in the operating period of the gate driver 11, as in Variation (5).

Figure 42:
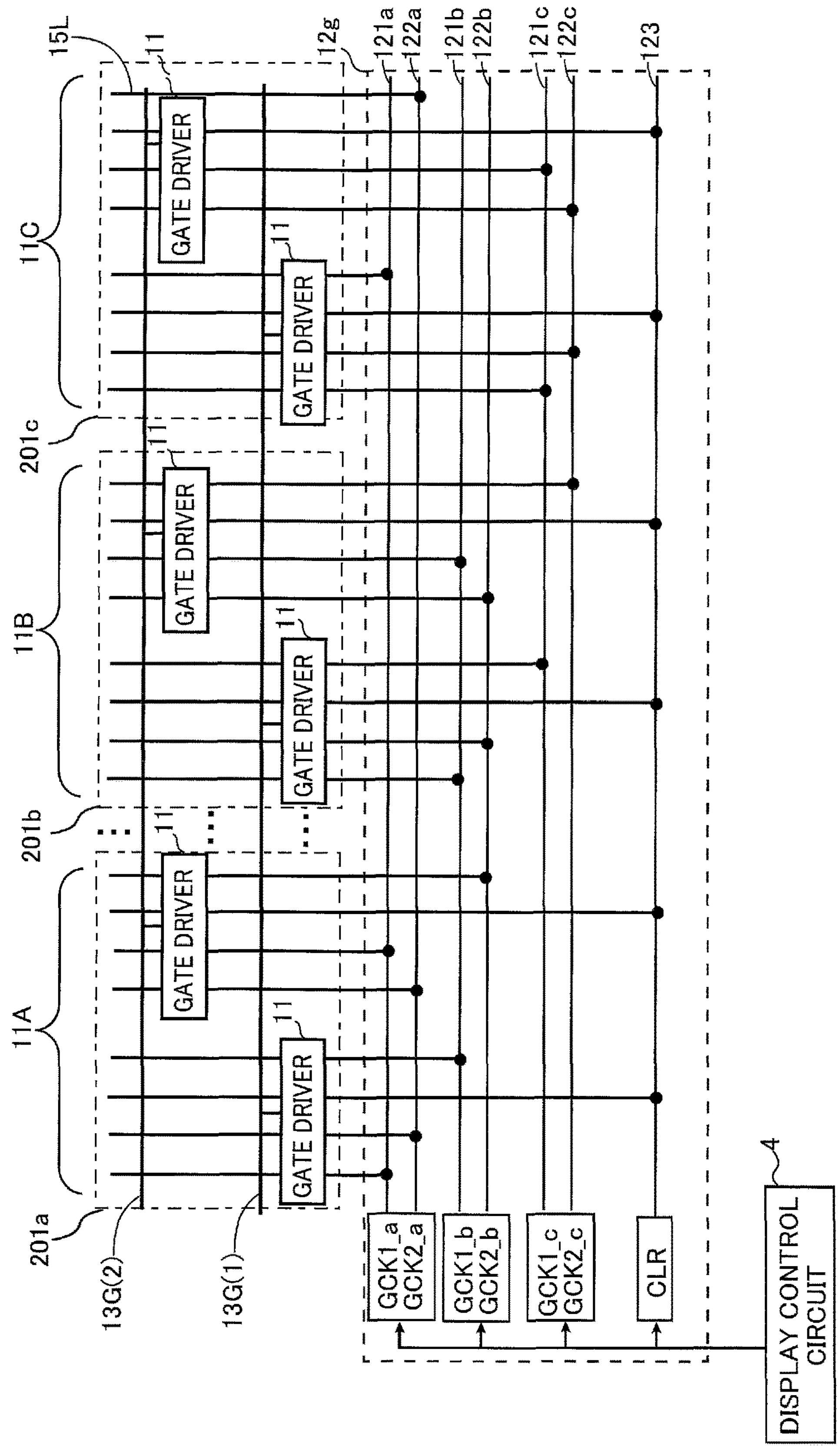
FIG. 42 is a diagram illustrating an example of the structure of a terminal unit in an active-matrix substrate in Variation (7).

In detail, each gate driver 11 in the gate driver group 11A is connected to the line 121*b* or 122*b* for supplying the control signal GCK1_*b* or GCK2_*b* as illustrated in FIG. 42, instead of the line 124 for supplying the power supply voltage signal VSS (see FIG. 18).

Each gate driver 11 in the gate driver group 11B is connected to the line 121*c* or 122*c* for supplying the control signal GCK1_*c* or GCK2_*c* as illustrated in FIG. 42, instead of the line 124 for supplying the power supply voltage signal VSS (see FIG. 18).

Each gate driver 11 in the gate driver group 11C is connected to the line 121*a* or 122*a* for supplying the control signal GCK1_*a* or GCK2_*a* as illustrated in FIG. 42, instead of the line 124 for supplying the power supply voltage signal VSS (see FIG. 18).

In the aforementioned FIG. 19, the operation stop signal is supplied to the lines 121*b* and 122*b* as the control signals GCK1_*b* and GCK2_*b* in the operating period of the gate driver groups 11A and 11C (the first operating period). The operation stop signal is supplied to the lines 121*c* and 122*c* as the control signals GCK1_*c* and GCK2_*c* in the operating period of the gate driver groups 11A and 11B (the second operating period). The operation stop signal is supplied to the lines 121*a* and 122*a* as the control signals GCK1_*a* and GCK2_*a* in the operating period of the gate driver groups 11B and 11C (the third operating period).

Therefore, with the structure illustrated in FIG. 42, a signal of the same potential as the power supply voltage signal VSS can be supplied to the source terminals of the TFT-A, TFT-D and TFT-C in each gate driver 11 in the gate driver group in the operating period of the gate driver group.

(8) In the foregoing fifth embodiment, the source terminals of the TFT-A, TFT-D, and TFT-C in each gate driver 110 in the gate driver groups 110A and 110B may be connected to a line for supplying a control signal whose potential is L level in the operating period of the gate driver 110, as in Variation (5).

Figure 43A:
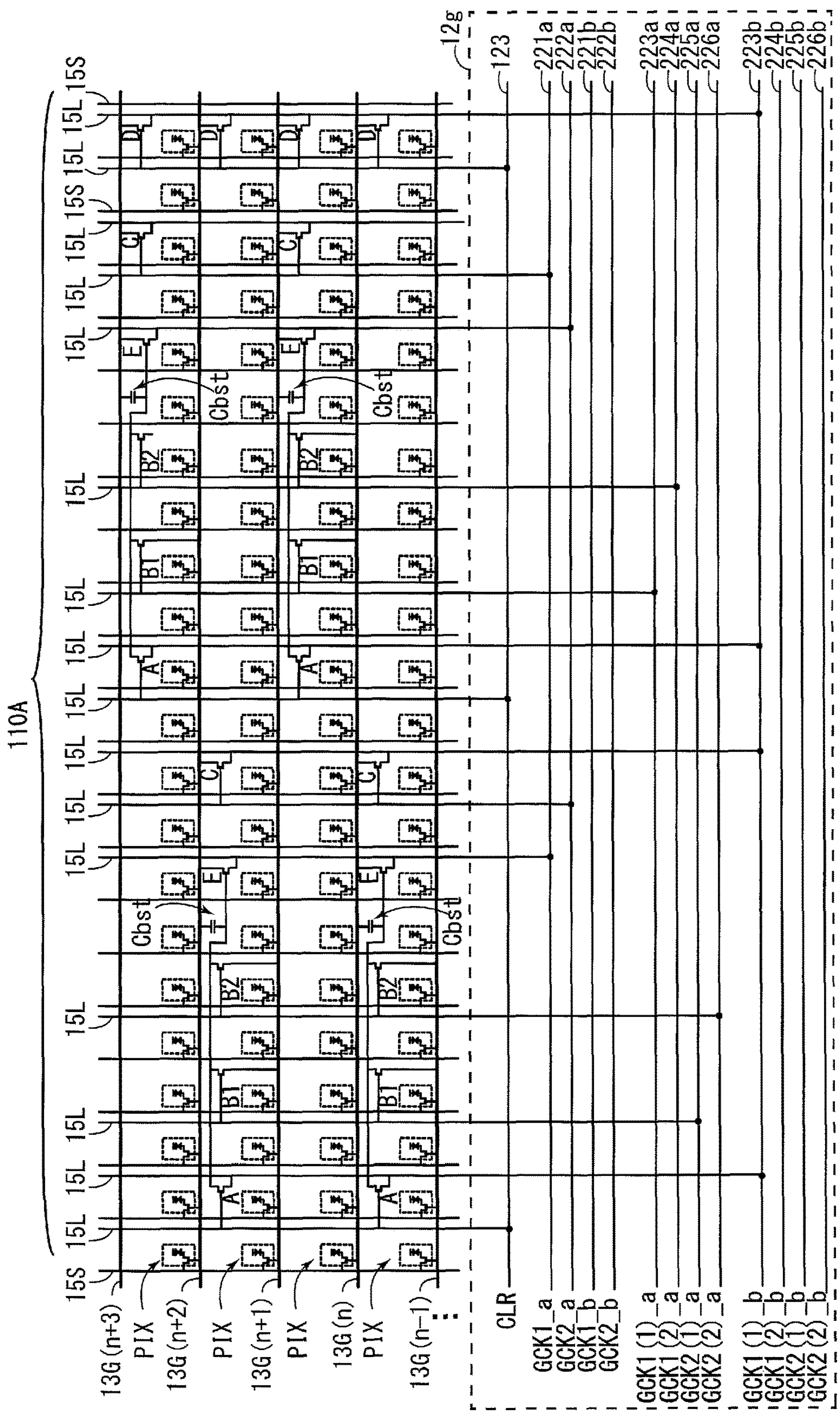
FIG. 43A is a schematic diagram illustrating an example of the arrangement and wiring of gate drivers in a display region in Variation (8).
Figure 43B:
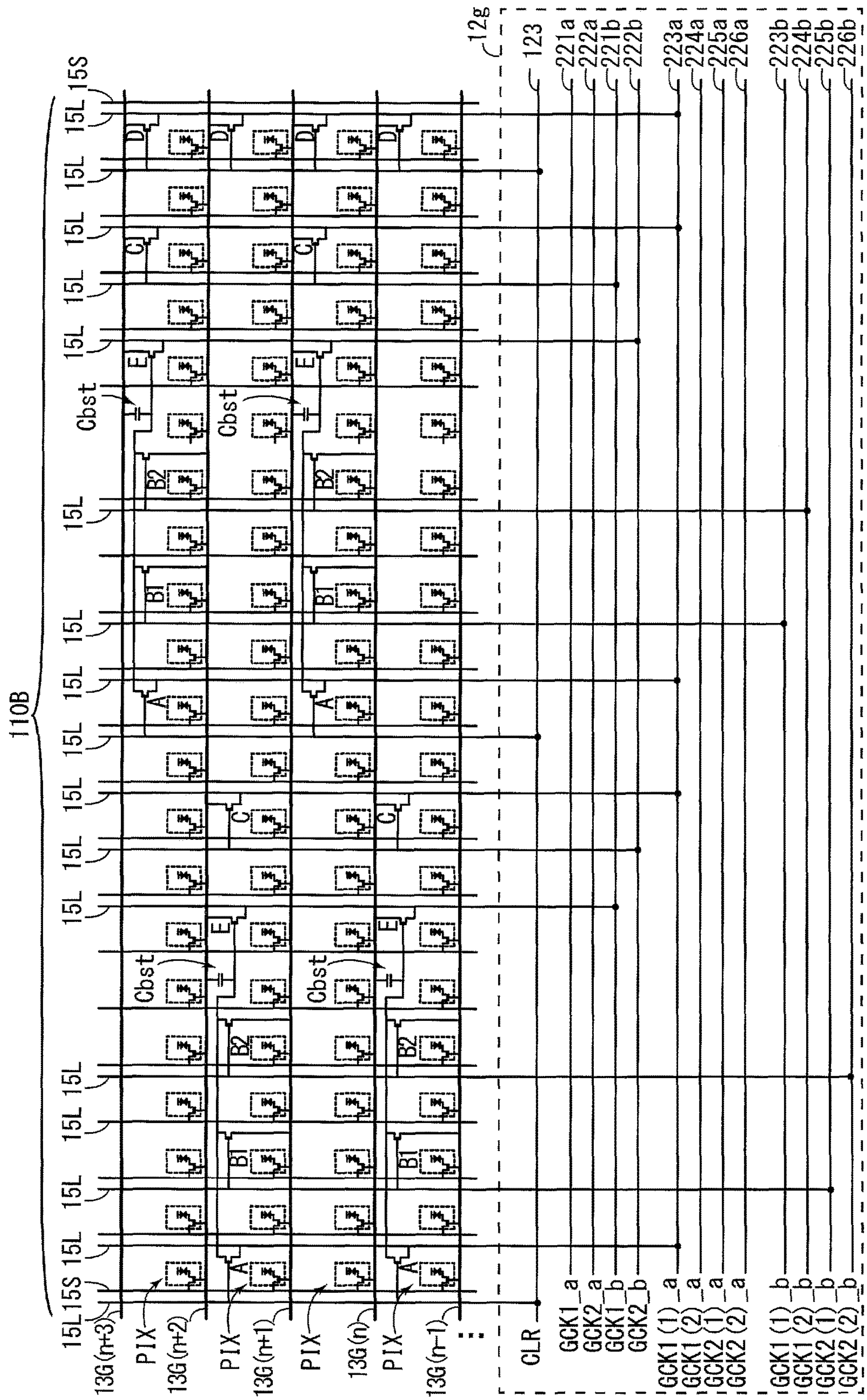
FIG. 43B is a schematic diagram illustrating an example of the arrangement and wiring of gate drivers in a display region in Variation (8).

As illustrated in FIG. 43A, the source terminals of the TFT-A, TFT-D and TFT-C in each gate driver 110 in the gate driver group 110A may be connected to, for example, the line 223*b* for supplying the control signal GCK1(1)_b. As illustrated in FIG. 43B, the source terminals of the TFT-A, TFT-D and TFT-C in each gate driver 110 in the gate driver group 110B may be connected to, for example, the line 223*a* for supplying the control signal GCK1(1)_a.

In the aforementioned FIGS. 25A and 25B, the control signal GCK1(1)_b is at L level potential in the operating period of the gate driver group 110A (the jth frame and the (j+1)th frame). Hence, a signal of the same potential as the power supply voltage signal VSS can be supplied to the source terminals of the TFT-A, TFT-D and TFT-C in each gate driver 110 in the gate driver group 110A in the operating period of the gate driver group 110A.

As with the control signal GCK1(1)_b, the control signals GCK1(2)_b, GCK2(1)_b, and GCK2(2)_b are at L level potential in the operating period of the gate driver group 110A, as illustrated in FIGS. 25A and 25B. Any of the control signals GCK1(1)_b, GCK1(2)_b, GCK2(1)_b, and GCK2(2)_b may therefore be supplied to the source terminals of the TFT-A, TFT-D and TFT-C in each gate driver 110 in the gate driver group 110A.

The control signals GCK1(1)_a, GCK1(2)_a, GCK2(1)_a, and GCK2(2)_a are at L level potential in the operating period of the gate driver group 110B (the (j+2)th frame and the (j+3)th frame), as illustrated in FIGS. 25C and 25D. Hence, a signal of the same potential as the power supply voltage signal VSS can be supplied to the source terminals of the TFT-A, TFT-D and TFT-C in each gate driver 110 in the gate driver group 110B in the operating period of the gate driver group 110B.

As with the control signal GCK1(1)_a, the control signals GCK1(2)_a, GCK2(1)_a, and GCK2(2)_a are at L level potential in the operating period of the gate driver group 110B, as illustrated in FIGS. 25C and 25D. Any of the control signals GCK1(1)_a, GCK1(2)_a, GCK2(1)_a, and GCK2(2)_a may therefore be supplied to the source terminals of the TFT-A, TFT-D and TFT-C in each gate driver 110 in the gate driver group 110B.

(9) In the foregoing sixth embodiment, the terminal of the TFT supplied with the power supply voltage signal VSS in each gate driver 120 may be connected to a line for supplying a control signal whose potential is L level in the operating period of the gate driver 120, as in Variation (5).

Figure 44A:
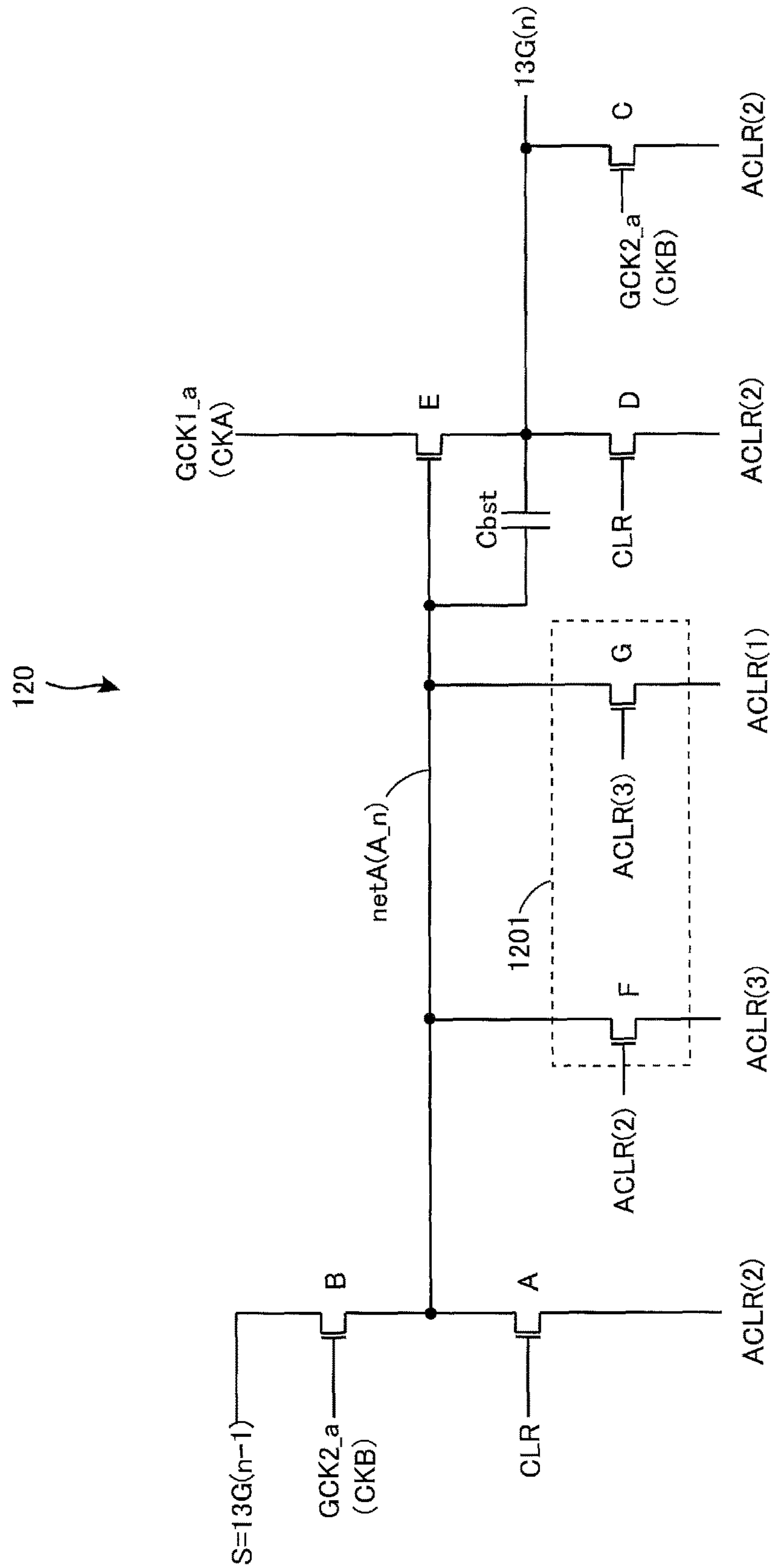
FIG. 44A is a diagram illustrating an equivalent circuit of a gate driver in Variation (9).
Figure 44B:
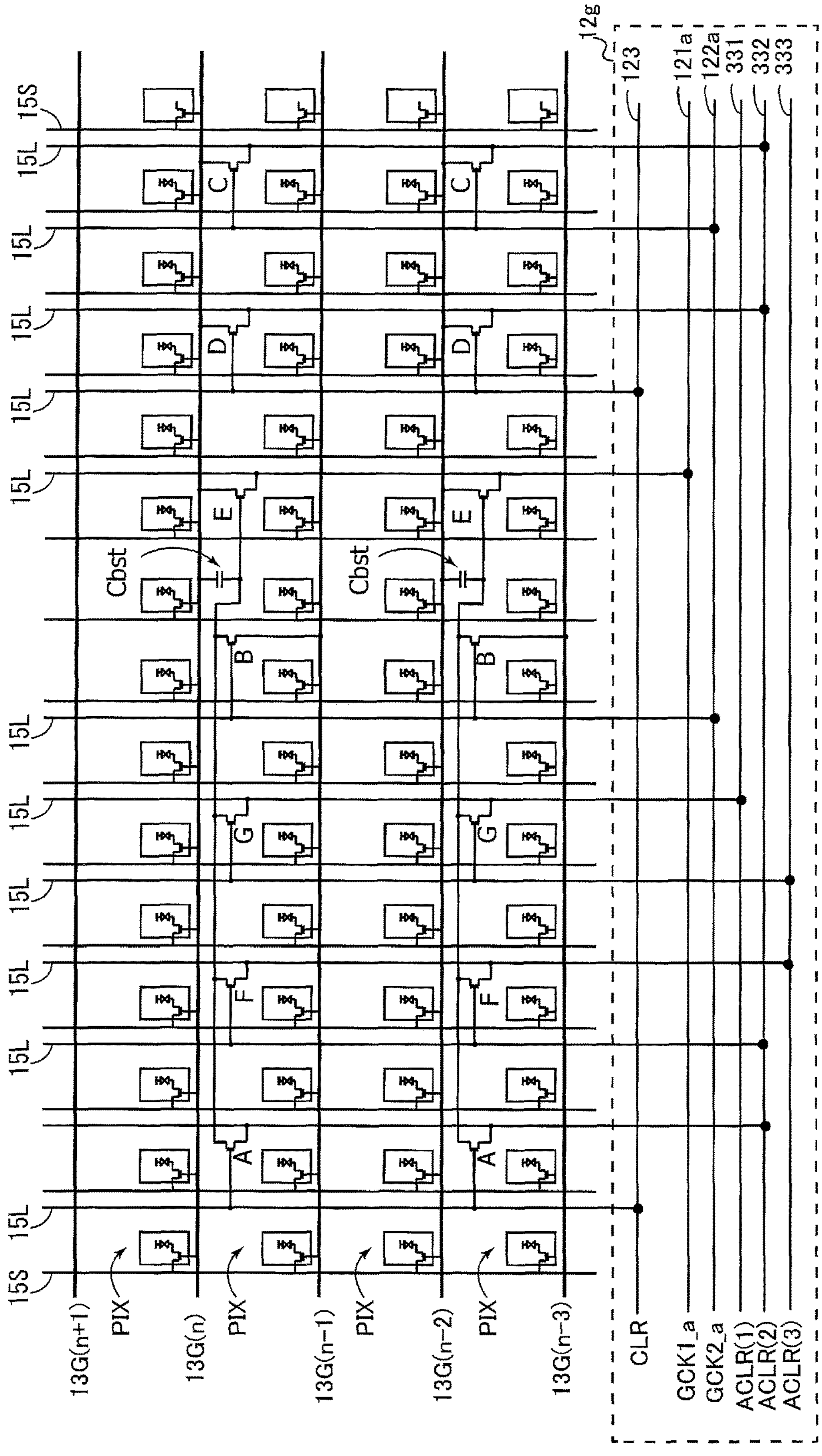
FIG. 44B is a schematic diagram illustrating an example of the arrangement and wiring of gate drivers in a display region in Variation (9).
Figure 44C:
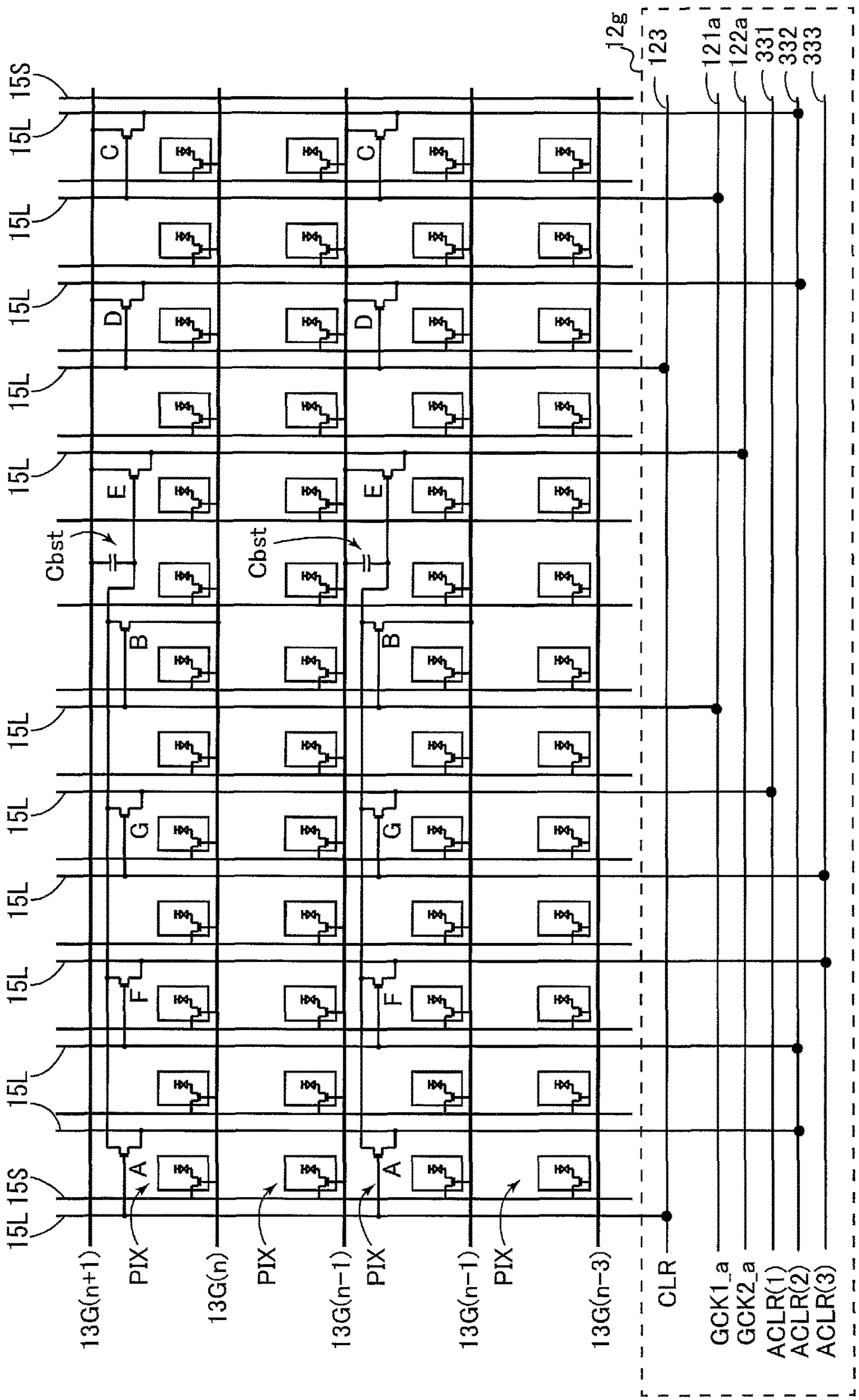
FIG. 44C is a schematic diagram illustrating an example of the arrangement and wiring of gate drivers in a display region in Variation (9).

For example, as illustrated in FIGS. 44A to 44C, the control signal ACLR(2) may be supplied to the source terminals of the TFT-A, TFT-D and TFT-C in each gate driver 120 in the gate driver group 120A. Moreover, the control signal ACLR(3) may be supplied to the drain terminal of the TFT-F, and the control signal ACLR(1) may be supplied to the drain terminal of the TFT-G.

In the aforementioned FIG. 30, the control signal ACLR(1) is at H level potential and the control signals ACLR(2) and ACLR(3) are at L level potential in the operating period of the gate driver group 120A (the jth frame). The control signal ACLR(2) is at H level potential and the control signals ACLR(1) and ACLR(3) are at L level potential in the operating period of the gate driver group 120B (the (j+1)th frame). The control signal ACLR(3) is at H level potential and the control signals ACLR(1) and ACLR(2) are at L level potential in the operating period of the gate driver group 120C (the (j+2)th frame).

Hence, a signal of the same potential as the power supply voltage signal VSS can be supplied to the source terminals of the TFT-A, TFT-D and TFT-C in each gate driver 120 in the gate driver group 120A in the operating period of the gate driver group 120A (the jth frame).

In the aforementioned FIG. 30, the TFT-F in each gate driver 120 in the gate driver group 120A is turned on by the control signal ACLR(2), in the operating period of the gate driver group 120B. The TFT-G in each gate driver 120 in the gate driver group 120A is turned on by the control signal ACLR(3), in the operating period of the gate driver group 120C. The control signal ACLR(3) or ACLR(1) is at L level potential in these operating periods. Hence, a signal of the same potential as the power supply voltage signal VSS can be supplied to the source terminals of the TFT-F and TFT-G in each gate driver 120 in the gate driver group 120A in the operating periods of the gate driver groups 120B and 120C.

In the aforementioned FIG. 30, the control signal ACLR (2) is also at L level potential in the operating period of the gate driver group 120A. The control signal ACLR(2) may therefore be supplied to the source terminals of the TFT-A, TFT-D and TFT-C in each gate driver 120 in the gate driver group 120A. In the aforementioned FIG. 30, the control signal ACLR(1) is also at L level potential in the operating period of the gate driver group 120B, i.e. the period during which the control signal ACLR(2) is at H level potential. The control signal ACLR(1) may therefore be supplied to the drain terminal of the TFT-F in each gate driver 120 in the gate driver group 120A. In the aforementioned FIG. 30, the control signal ACLR(2) is also at L level potential in the operating period of the gate driver group 120C, i.e. the period during which the control signal ACLR(3) is at H level potential. The control signal ACLR(2) may therefore be supplied to the source terminal of the TFT-G in each gate driver 120 in the gate driver group 120A.

In the aforementioned FIG. 30, the control signals GCK1_*b*, GCK2_*b*, GCK1_*c*, and GCK2_*c* are all at L level potential in the operating period of the gate driver group 120A. Any of these control signals may therefore be supplied to the source terminals of the TFT-A, TFT-D, TFT-C, TFT-F, and TFT-G in each gate driver 120 in the gate driver group 120A.

Although the gate drivers 120 in each of the gate driver groups 120B and 120C are not illustrated, the source terminals of the TFT-A, TFT-D, TFT-C, TFT-F, and TFT-G in each gate driver 120 in each of the gate driver groups 120B and 120C may be supplied with a control signal whose potential is L level in the operating period of the gate driver 120.

Although this variation describes an example where a control signal whose potential is L level in the operating period of the gate driver 120 is supplied to the source terminals of all of the TFT-A, TFT-D, TFT-C, TFT-F, and TFT-G in the gate driver 120, the present invention is not limited to this, and such a control signal may be supplied to the source terminal of at least one of these TFTs.

The invention claimed is:

1. An active-matrix substrate comprising:

a plurality of source lines;

a plurality of gate lines crossing the plurality of source lines;

a plurality of pixels defined by the plurality of source lines and the plurality of gate lines;

driving circuitry including a plurality of drive circuits for each of the plurality of gate lines, that switch each of the plurality of gate lines to a selected state by the plurality of drive circuits in response to a supplied control signal, the plurality of drive circuits being located in a portion of the plurality of pixels; and a display control circuit that supplies the control signal to the driving circuitry, wherein each of the plurality of drive circuits includes a plurality of switches that are turned on or off in response to the control signal, at predetermined time intervals, the display control circuit:

supplies, to at least one of the plurality of switches in at least one of the plurality of drive circuits, a stop signal that holds the at least one of the plurality of switches off as the control signal; and supplies, to each of the plurality of switches in the drive circuit other than the at least one of the plurality of switches supplied with the stop signal and the plurality of switches in each of the plurality of drive circuits other than the at least one of the plurality of drive circuits, a drive signal that turns the at least one of the plurality of switches on as the control signal, N drive circuits are provided for each of the plurality of gate lines, where N is a natural number such that N≥3, and at the predetermined time intervals, the display control circuit supplies the drive signal to the plurality of switches in each of n drive circuits out of the N drive circuits, where n is a natural number such that 2≤n<N.

2. The active-matrix substrate according to claim 1, wherein the display control circuit changes the drive circuit supplied with the stop signal, between the plurality of drive circuits provided for each of the plurality of gate lines.

3. The active-matrix substrate according to claim 1, wherein the drive signal is a signal whose potential alternates between a high (H) level and a low (L) level every 2 m horizontal scan intervals, where m is a natural number such that m≥1, and the drive signal to the plurality of drive circuits provided for one gate line and the drive signal to the plurality of drive circuits provided for another gate line adjacent to the one gate line are out of phase with each other by ¼m period.

4. The active-matrix substrate according to claim 1, wherein the plurality of switches include a first switch with a duty ratio not less than a predetermined value and a second switch with a duty ratio less than the predetermined value, and the display control circuit supplies the stop signal to the first switch and supplies the drive signal to the second switch, from among the plurality of switches in each of the plurality of drive circuits provided for each of the plurality of gate lines.

5. The active-matrix substrate according to claim 1, wherein the plurality of switches include a first switch that supplies, to the gate line, a selection voltage that switches the gate line to the selected state, each of the plurality of drive circuits further includes:

an internal line connected to a gate terminal of the first switch and the gate line; and a switching circuit connected to the internal line that controls a voltage of the internal line in response to a supplied potential control signal, and a first switching circuit in the at least one of the plurality of drive circuits supplied with the stop signal controls the voltage of the internal line to be lower than a threshold voltage of the first switch, and a second switching circuit in each of the other drive circuits other than the at least one of the plurality of drive circuits does not control the voltage of the internal line.

6. The active-matrix substrate according to claim 5, wherein the switching circuit includes a second switch including a drain terminal connected to the internal line, and the display control circuit:

supplies, to a gate terminal of the second switch in each of the other drive circuits other than the at least one of the plurality of drive circuits, a first voltage signal that turns the second switch off as the potential control signal; and supplies, to a gate terminal of the second switch in the at least one of the plurality of drive circuits supplied with the stop signal, a second voltage signal that turns the second switch on and supplies, to a source terminal of the second switch in the drive circuit, the first voltage signal.

7. The active-matrix substrate according to claim 6, wherein the plurality of switches include a third switch including a drain terminal connected to the gate line that supplies, to the gate line, a voltage that switches the gate line to a non-selected state, a voltage of the first voltage signal is a voltage that switches the gate line to the non-selected state, and the display control circuit further:

supplies, to a gate terminal of the third switch in each of the other drive circuits other than the at least one of the plurality of drive circuits, a voltage signal that turns the third switch on and supplies, to a source terminal of the third switch in each of the other drive circuits other than the at least one of the plurality of drive circuits, the first voltage signal; and supplies, to a gate terminal of the third switch in the at least one of the plurality of drive circuits supplied with the stop signal, a voltage signal that turns the third switch off.

8. The active-matrix substrate according to claim 1 wherein the display control circuit includes:

a control signal line provided outside a display region at one end in an extending direction of the plurality of source lines, and supplied with the control signal;

drive circuit connection lines that connect the plurality of drive circuits provided for the gate line to the control signal line; and a switch that selects a drive circuit connection line to be brought into connection with the control signal line from among the drive circuit connection lines, in response to a supplied switch signal.

9. A display device comprising:

the active-matrix substrate according to claim 1;

a counter substrate including a color filter; and a liquid crystal layer sandwiched between the active-matrix substrate and the counter substrate.

10. An active-matrix substrate comprising:

a plurality of source lines;

a plurality of gate lines crossing the plurality of source lines;

a plurality of pixels defined by the plurality of source lines and the plurality of gate lines;

driving circuitry including a plurality of drive circuits for each of the plurality of gate lines, that switch each of the plurality of gate lines to a selected state by the plurality of drive circuits in response to a supplied control signal, the plurality of drive circuits being located in a portion of the plurality of pixels; and a display control circuit that supplies the control signal to the driving circuitry, wherein each of the plurality of drive circuits includes a plurality of switches that are turned on or off in response to the control signal, at predetermined time intervals, the display control circuit:

supplies, to at least one of the plurality of switches in at least one of the plurality of drive circuits, a stop signal that holds the at least one of the plurality of switches off as the control signal; and supplies, to each of the plurality of switches in the drive circuit other than the at least one of the plurality of switches supplied with the stop signal and the plurality of switches in each of the plurality of drive circuits other than the at least one of the plurality of drive circuits, a drive signal that turns the at least one of the plurality of switches on as the control signal, the plurality of switches include a first switch with a duty ratio not less than a predetermined value and a second switch with a duty ratio less than the predetermined value, and the display control circuit supplies the stop signal to the first switch and supplies the drive signal to the second switch, from among the plurality of switches in each of the plurality of drive circuits provided for each of the plurality of gate lines.

11. The active-matrix substrate according to claim 10, wherein the display control circuit changes the drive circuit supplied with the stop signal, between the plurality of drive circuits provided for each of the plurality of gate lines.

12. The active-matrix substrate according to claim 10, wherein the drive signal is a signal whose potential alternates between a high (H) level and a low (L) level every 2 m horizontal scan intervals, where m is a natural number such that $m \geq 1$, and the drive signal to the plurality of drive circuits provided for one gate line and the drive signal to the plurality of drive circuits provided for another gate line adjacent to the one gate line are out of phase with each other by ¼m period.

13. The active-matrix substrate according to claim 10, wherein the plurality of switches include a third switch that supplies, to the gate line, a selection voltage that switches the gate line to the selected state, each of the plurality of drive circuits further includes:

an internal line connected to a gate terminal of the third switch and the gate line; and a switching circuit connected to the internal line that controls a voltage of the internal line in response to a supplied potential control signal, and a first switching circuit in the at least one of the plurality of drive circuits supplied with the stop signal controls the voltage of the internal line to be lower than a threshold voltage of the third switch, and a second switching circuit in each of the other drive circuits other than the at least one of the plurality of drive circuits does not control the voltage of the internal line.

14. The active-matrix substrate according to claim 13, wherein the switching circuit includes a fourth switch including a drain terminal connected to the internal line, and the display control circuit:

supplies, to a gate terminal of the fourth switch in each of the other drive circuits other than the at least one of the plurality of drive circuits, a first voltage signal that turns the fourth switch off as the potential control signal; and supplies, to a gate terminal of the fourth switch in the at least one of the plurality of drive circuits supplied with the stop signal, a second voltage signal that turns the fourth switch on and supplies, to a source terminal of the fourth switch in the drive circuit, the first voltage signal.

15. The active-matrix substrate according to claim 14, wherein the plurality of switches include a fifth switch including a drain terminal connected to the gate line that supplies, to the gate line, a voltage that switches the gate line to a non-selected state, a voltage of the first voltage signal is a voltage that switches the gate line to the non-selected state, and the display control circuit further:

supplies, to a gate terminal of the fifth switch in each of the other drive circuits other than the at least one of the plurality of drive circuits, a voltage signal that turns the fifth switch on and supplies, to a source terminal of the fifth switch in each of the other drive circuits other than the at least one of the plurality of drive circuits, the first voltage signal; and supplies, to a gate terminal of the fifth switch in the at least one of the plurality of drive circuits supplied with the stop signal, a voltage signal that turns the fifth switch off.

16. The active-matrix substrate according to claim 10, wherein the display control circuit includes:

a control signal line provided outside a display region at one end in an extending direction of the plurality of source lines, and supplied with the control signal;

drive circuit connection lines that connect the plurality of drive circuits provided for the gate line to the control signal line; and a switch that selects a drive circuit connection line to be brought into connection with the control signal line from among the drive circuit connection lines, in response to a supplied switch signal.

17. A display device comprising:

the active-matrix substrate according to claim 10;

a counter substrate including a color filter; and a liquid crystal layer sandwiched between the active-matrix substrate and the counter substrate.

* * * * *